(12) United States Patent
Tagome

(10) Patent No.: US 8,508,966 B2
(45) Date of Patent: Aug. 13, 2013

(54) POWER SOURCE SWITCH DEVICE AND POWER SOURCE SYSTEM PROVIDED WITH SAME

(75) Inventor: Masaki Tagome, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/635,979

(22) PCT Filed: Feb. 2, 2012

(86) PCT No.: PCT/JP2012/000706
§ 371 (c)(1),
(2), (4) Date: Sep. 19, 2012

(87) PCT Pub. No.: WO2012/105264
PCT Pub. Date: Aug. 9, 2012

(65) Prior Publication Data
US 2013/0009624 A1 Jan. 10, 2013

(30) Foreign Application Priority Data
Feb. 4, 2011 (JP) ................................ 2011-023023

(51) Int. Cl.
*H02P 3/14* (2006.01)
(52) U.S. Cl.
USPC ........................................... 363/132; 318/376
(58) Field of Classification Search
USPC .................... 363/17, 132; 318/376
See application file for complete search history.

(56) References Cited

U.S. PATENT DOCUMENTS

| 5,412,293 A * | 5/1995 | Minezawa et al. ............ 318/376 |
| 2001/0028571 A1 | 10/2001 | Hanada et al. |
| 2003/0184266 A1 | 10/2003 | Miyazaki |
| 2005/0073282 A1 | 4/2005 | Carrier et al. |

(Continued)

FOREIGN PATENT DOCUMENTS

| CN | 1864300 | 11/2006 |
| JP | 56-50499 | 11/1981 |

(Continued)

OTHER PUBLICATIONS

International Search Report issued May 1, 2012 in International (PCT) Application No. PCT/JP2012/000706.

(Continued)

*Primary Examiner* — Adolf Berhane
*Assistant Examiner* — Emily Pham
(74) *Attorney, Agent, or Firm* — Wenderoth, Lind & Ponack, L.L.P.

(57) ABSTRACT

Provided are semiconductor elements 107A, 107B, and 107C that allow a current to flow that is at most a maximum current determined by the level of control signals VGA, VGB, and VGC and that depends on the difference between the voltage of a DC power supply BA and the charging voltage of a capacitor 102, a controller 105 that outputs a control signal to each semiconductor element, and a temperature detection circuit that detects the temperature of each semiconductor element. Until a predetermined time elapses after the electric circuit is closed, the controller 105 adjusts the level of each control signal based on the temperature detected by the temperature detection circuit so that current through the electric circuit does not exceed a current limit, and after the predetermined time period elapses, the controller 105 adjusts the level of each control signal so that current through the electric circuit is allowed to exceed the current limit.

21 Claims, 35 Drawing Sheets

(56) References Cited

U.S. PATENT DOCUMENTS

| | | |
|---|---|---|
| 2005/0077878 A1 | 4/2005 | Carrier et al. |
| 2005/0202310 A1 | 9/2005 | Yahnker et al. |
| 2008/0003491 A1 | 1/2008 | Yahnker et al. |
| 2008/0180059 A1 | 7/2008 | Carrier et al. |
| 2008/0203995 A1 | 8/2008 | Carrier et al. |
| 2009/0108794 A1* | 4/2009 | Ochiai et al. .................. 318/760 |
| 2009/0128117 A1* | 5/2009 | Ochiai et al. .................. 323/299 |
| 2009/0146614 A1 | 6/2009 | Carrier et al. |
| 2009/0167216 A1* | 7/2009 | Soma et al. .................. 318/376 |

FOREIGN PATENT DOCUMENTS

| | | |
|---|---|---|
| JP | 7-236227 | 9/1995 |
| JP | 8-331756 | 12/1996 |
| JP | 10-135806 | 5/1998 |
| JP | 11-4539 | 1/1999 |
| JP | 2001-298861 | 10/2001 |
| JP | 2003-289620 | 10/2003 |
| JP | 2005-312156 | 11/2005 |
| JP | 2007-318849 | 12/2007 |
| JP | 2009-44914 | 2/2009 |
| JP | 2009-50079 | 3/2009 |

OTHER PUBLICATIONS

Written Opinion of the International Searching Authority issued May 1, 2012 in International (PCT) Application No. PCT/JP2012/000706.

* cited by examiner

| Control command signal Dg | Control signal Vg |
|---|---|
| Dg0 | Vg0 |
| Dg1 | Vg1 |
| Dg2 | Vg2 |
| Dg3 | Vg3 |
| Dg4 | Vg4 |
| Dg5 | Vg5 |
| Dg6 | Vg6 |
| Dg7 | Vg7 |
| Dg8 | Vg8 |

Table $t_3$

| Temperature $T_{sur}$ [deg] of current amount variation unit 306 | Control command signal Dg (control signal Vg) |
|---|---|
| — | Dg0 (Vg0) |
| $T_{sur} < T1$ | $DgT_0$ ($VgT_0$) |
| $T1 \leq T_{sur} < T2$ | $DgT_1$ ($VgT_1$) |
| $T2 \leq T_{sur} < T3$ | $DgT_2$ ($VgT_2$) |
| $T3 \leq T_{sur} < T4$ | $DgT_3$ ($VgT_3$) |
| $T4 \leq T_{sur} < T5$ | $DgT_4$ ($VgT_4$) |
| $T5 \leq T_{sur}$ | $DgT_5$ ($VgT_5$) |
| — | Dg7 (Vg7) |
| — | Dg8 (Vg8) |

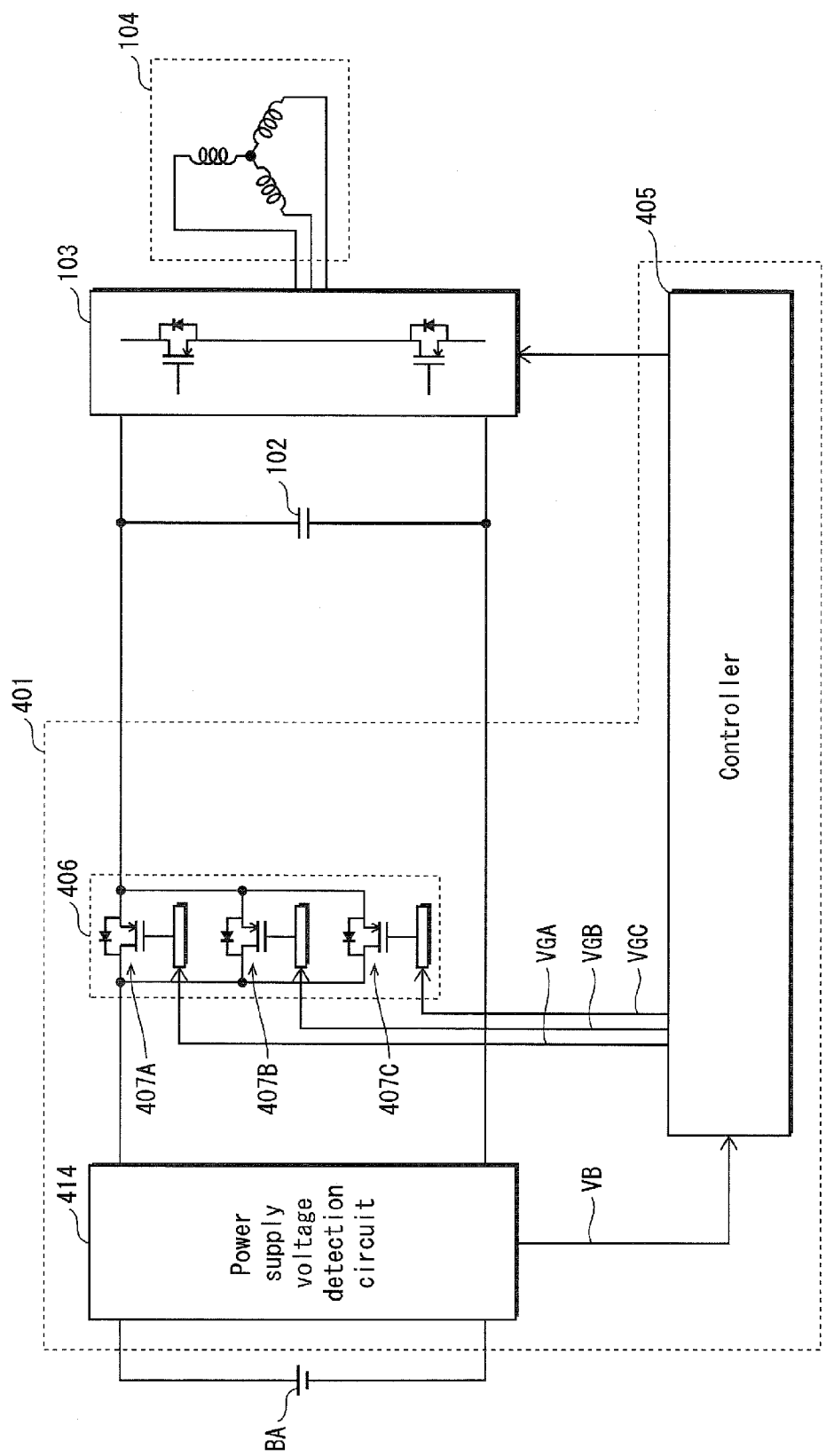

FIG. 15

Table t$_4$

| Voltage VB [V] of DC power supply BA | Control command signal Dg (control signal Vg) |
|---|---|
| — | Dg0 (Vg0) |
| ~199 | Dg1 (Vg1) |
| 200~249 | Dg2 (Vg2) |
| 250~299 | Dg3 (Vg3) |
| 300~349 | Dg4 (Vg4) |
| 350~399 | Dg5 (Vg5) |
| 400~ | Dg6 (Vg6) |
| — | Dg7 (Vg7) |
| — | Dg8 (Vg8) |

FIG. 18

Table t₅

| Voltage VC [V] of smoothing capacitor 502 | Control command signal Dg (control signal Vg) |
|---|---|
| − | Dg0 (Vg0) |
| 400~ | Dg1 (Vg1) |
| 350~399 | Dg2 (Vg2) |
| 300~349 | Dg3 (Vg3) |
| 250~299 | Dg4 (Vg4) |
| 200~249 | Dg5 (Vg5) |
| ~199 | Dg6 (Vg6) |
| − | Dg7 (Vg7) |
| − | Dg8 (Vg8) |

FIG. 20

Table $t_6$

| Difference Dif between voltage VB and voltage VC | Control command signal Dg (control signal Vg) |
|---|---|
| — | Dg0 (Vg0) |
| Dif<Dif1 | Dg1 (Vg1) |
| Dif1≤Dif<Dif2 | Dg2 (Vg2) |
| Dif2≤Dif<Dif3 | Dg3 (Vg3) |
| Dif3≤Dif<Dif4 | Dg4 (Vg4) |
| Dif4≤Dif<Dif5 | Dg5 (Vg5) |
| Dif5≤Dif | Dg6 (Vg6) |
| — | Dg7 (Vg7) |
| — | Dg8 (Vg8) |

FIG. 25

Table $t_8$

| Voltage VB [V] of DC power supply BA \ Temperature TA [deg] of semiconductor element 807A | TA<T1 | T1≤TA<T2 | T2≤TA<T3 | T3≤TA<T4 | T4≤TA<T5 | T5≤TA |
|---|---|---|---|---|---|---|
| ~199 | Dg1-T$_0$ (Vg1-T$_0$) | Dg1-T$_1$ (Vg1-T$_1$) | Dg1-T$_2$ (Vg1-T$_2$) | Dg1-T$_3$ (Vg1-T$_3$) | Dg1-T$_4$ (Vg1-T$_4$) | Dg1-T$_5$ (Vg1-T$_5$) |
| 200~249 | Dg2-T$_0$ (Vg2-T$_0$) | Dg2-T$_1$ (Vg2-T$_1$) | Dg2-T$_2$ (Vg2-T$_2$) | Dg2-T$_3$ (Vg2-T$_3$) | Dg2-T$_4$ (Vg2-T$_4$) | Dg2-T$_5$ (Vg2-T$_5$) |
| 250~299 | Dg3-T$_0$ (Vg3-T$_0$) | Dg3-T$_1$ (Vg3-T$_1$) | Dg3-T$_2$ (Vg3-T$_2$) | Dg3-T$_3$ (Vg3-T$_3$) | Dg3-T$_4$ (Vg3-T$_4$) | Dg3-T$_5$ (Vg3-T$_5$) |
| 300~349 | Dg4-T$_0$ (Vg4-T$_0$) | Dg4-T$_1$ (Vg4-T$_1$) | Dg4-T$_2$ (Vg4-T$_2$) | Dg4-T$_3$ (Vg4-T$_3$) | Dg4-T$_4$ (Vg4-T$_4$) | Dg4-T$_5$ (Vg4-T$_5$) |
| 350~399 | Dg5-T$_0$ (Vg5-T$_0$) | Dg5-T$_1$ (Vg5-T$_1$) | Dg5-T$_2$ (Vg5-T$_2$) | Dg5-T$_3$ (Vg5-T$_3$) | Dg5-T$_4$ (Vg5-T$_4$) | Dg5-T$_5$ (Vg5-T$_5$) |
| 400~ | Dg6-T$_0$ (Vg6-T$_0$) | Dg6-T$_1$ (Vg6-T$_1$) | Dg6-T$_2$ (Vg6-T$_2$) | Dg6-T$_3$ (Vg6-T$_3$) | Dg6-T$_4$ (Vg6-T$_4$) | Dg6-T$_5$ (Vg6-T$_5$) |

FIG. 30A

Table $t_{10}$

| Voltage VC [V] of smoothing capacitor 502 | Control command signal Dg (control signal Vg) |
|---|---|
| — | Dg0 (Vg0) |
| ~199 | Dg1 (Vg1) |
| 200~249 | Dg2 (Vg2) |
| 250~299 | Dg3 (Vg3) |
| 300~349 | Dg4 (Vg4) |
| 350~399 | Dg5 (Vg5) |
| 400~ | Dg6 (Vg6) |
| — | Dg7 (Vg7) |
| — | Dg8 (Vg8) |

FIG. 30B

Table $t_{11}$

| Control signal Vg input into switching element through which current flows during first period | Length Prd of first period |
|---|---|
| Vg6 | Prd1 |
| Vg5 | Prd2 |
| Vg4 | Prd3 |
| Vg3 | Prd4 |
| Vg2 | Prd5 |
| Vg1 | Prd6 |

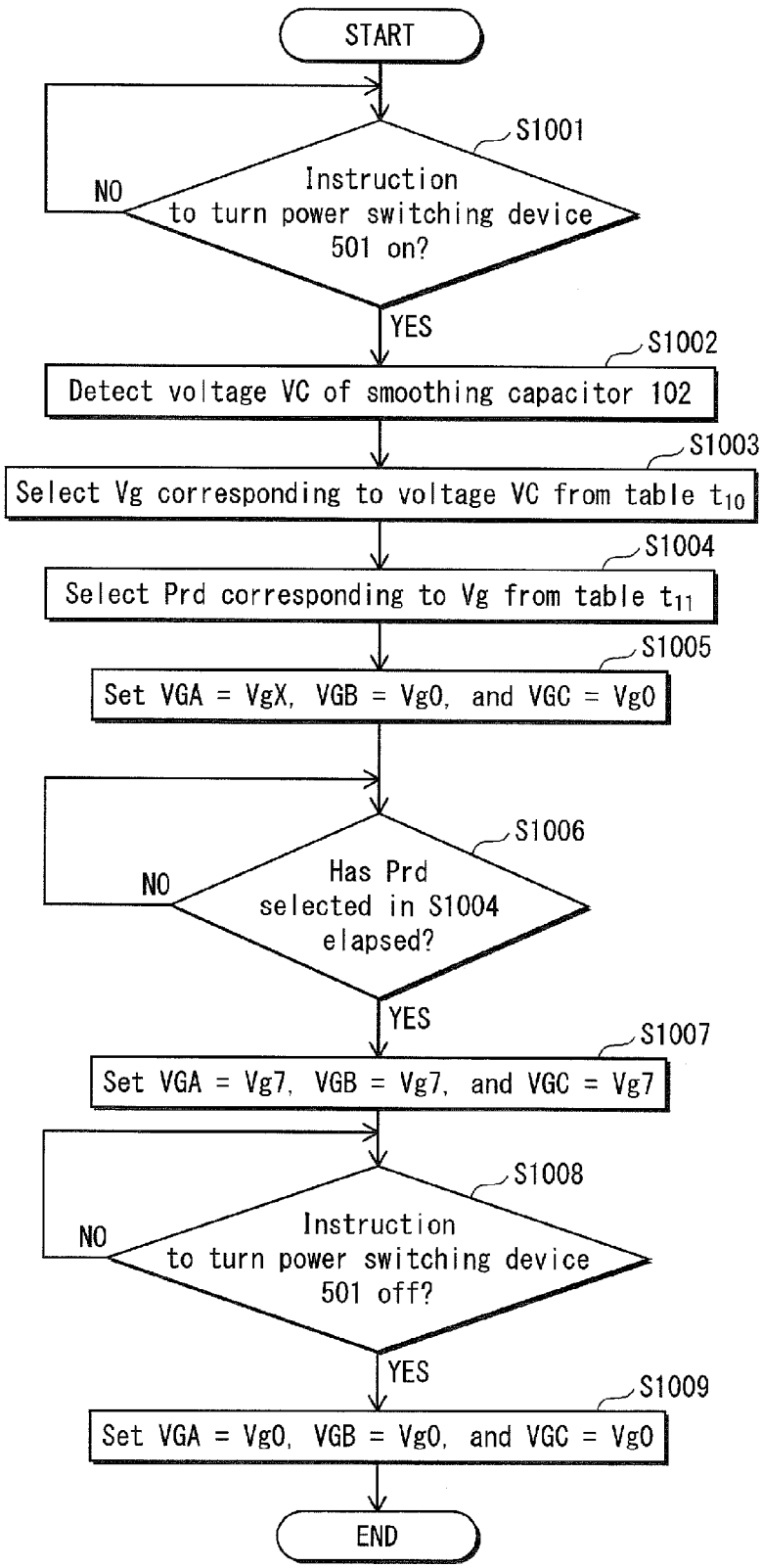

FIG. 32

Table $t_{12}$

| Voltage VC [V] of smoothing capacitor 502 | Length Prd of first period |
|---|---|
| 400~ | Prd1 |
| 350~399 | Prd2 |
| 300~349 | Prd3 |
| 250~299 | Prd4 |
| 200~249 | Prd5 |
| ~199 | Prd6 |

POWER SOURCE SWITCH DEVICE AND POWER SOURCE SYSTEM PROVIDED WITH SAME

TECHNICAL FIELD

The present invention relates to a power switching device that uses a precharging method to switch an electric circuit connecting a DC power supply and a capacitor, and to a power system provided with the power switching device.

BACKGROUND ART

A power system that supplies power from a battery or other DC power supply to a load, such as a motor, is mainly constituted by a capacitance element, a power switching device, and a power converter. The capacitance element is a smoothing capacitor or the like. The power switching device switches an electric circuit connecting the DC power supply and the capacitance element in response to commands. The power convertor converts DC power to AC power.

While not driving the load, the power switching device leaves the electric circuit connecting the DC power supply and the capacitance element in an open state (i.e. cuts off the electric circuit). Conversely, when driving the load, the power switching device places the electric circuit in a closed state (allows conduction between the power supply and the capacitance element). When placing the electric circuit into the closed state, it is necessary to first charge the capacitance element. Inrush current therefore flows along the electric circuit. Such inrush current may damage elements along the electric circuit between the power supply and the capacitance element, or may adversely affect other devices due to a temporary lowering in the power supply voltage. In order to solve this problem, a variety of power switching devices that use a precharging method are well known (for example, Patent Literature 1 and 2). Such devices restrict the inrush current when the electric circuit enters the closed state by charging the capacitance element via a resistor for a predetermined time period starting at the time a command to place the electric circuit into the closed state is received.

FIG. 34 illustrates the overall configuration of a power system 1000 that includes a power switching device that uses a precharging method according to Patent Literature 1.

The power system 1000 is provided with a power switching device 91, a capacitance element 92, and a power converter 93. The power switching device 91 is provided along an electric circuit connecting a DC power supply BA and the capacitance element 92 and switches the electric circuit in accordance with commands received from an external source. The capacitance element 92 is a smoothing capacitor. The power converter 93 is provided along an electrical circuit connecting the capacitance element 92 and a three-phase AC motor 94 (hereinafter simply referred to as a "motor"). The power converter 93 is an inverter that converts DC to three-phase AC.

In more detail, the power switching device 91 is provided with switches (system main relays SMR1 and SMR2, switching element 98) inserted along the electric circuit connecting the DC power supply BA and the capacitance element 92, a diode 99 for backflow prevention, and a controller 95 for turning the switches on and off. Whether the system main relays SMR1 and SMR2 are on or off is controlled by whether power is supplied to excitation circuits 96 and 97. Whether the switching element 98 is on or off is controlled by a control signal (gate voltage) to the gate terminal thereof. An element with a high on-resistance is used as the switching element 98 (see FIG. 4 of Patent Literature 1).

The controller 95 causes the switches to operate as follows. First, starting at the time a command to place the electric circuit into the closed state is received, the controller 95 turns on the switching element 98 for a predetermined time period, leaving the system main relay SMR1 off. After the predetermined time period has elapsed, the controller 95 turns the switching element 98 off and turns the system main relay SMR1 on. The system main relay SMR2 is on continually during these operations. As a result of these operations, immediately after power is supplied, current flows through the switching element 98, which has a high on-resistance. This prevents inrush current, since the current flowing along the electric circuit connecting the DC power supply BA and smoothing capacitor 92 does not grow excessively large.

[Citation List]

[Patent Literature]

Patent Literature 1: Japanese Patent Application Publication No. 2009-44914

Patent Literature 2: Japanese Patent Application Publication No. 2005-312156

SUMMARY OF INVENTION

Technical Problem

For the system main relays, the power switching device disclosed in Patent Literature 1 uses a so-called mechanical relay, which switches the contact via an electromagnetic effect caused by conduction in the excitation circuit. However, not only are the dimensions of such a mechanical relay large, but it is also necessary to provide a bypass circuit or the like to transfer an induced electromotive force generated by the coil. This leads to the problem of the power switching device becoming large scale.

The present invention has been conceived in light of the above problems, and it is an object thereof to provide a small-scale power switching device, as well as a power system provided with the power switching device.

Solution to Problem

In order to achieve the above object, a power switching device and the like disclosed in the present disclosure are a power switching device for switching an electric circuit connecting a DC power supply and a capacitance element in response to a command from an external source, the power switching device comprising: one or more semiconductor elements, inserted along the electric circuit, each allowing current to flow at or below a maximum current determined according to a level of an input control signal, the current corresponding to a difference between a voltage of the DC power supply and a charging voltage of the capacitance element; a controller outputting a control signal individually to each of the one or more semiconductor elements; and a temperature detection circuit detecting a temperature of the one or more semiconductor elements, wherein until a predetermined time period elapses after receipt of a command to place the electric circuit into a closed state, the controller adjusts the level of each control signal in accordance with the temperature detected by the temperature detection circuit so that current flowing through the electric circuit does not exceed a current limit, and after the predetermined time period elapses, the controller adjusts the level of each control signal so that the current flowing through the electric circuit is allowed to exceed the current limit.

Advantageous Effects of Invention

The power switching device and the like of the present disclosure allow for a reduction in scale.

BRIEF DESCRIPTION OF DRAWINGS

FIG. 14 illustrates the overall configuration of a power system 400 provided with a power switching device 401 according to Embodiment 4.

FIG. 15 illustrates a table $t_4$ stored in a memory of a controller 405.

FIG. 18 illustrates a table $t_5$ stored in a memory of a controller 505.

FIG. 20 illustrates a table $t_6$ stored in a memory of a controller 605.

FIG. 25 illustrates a table $t_s$ stored in a memory of a controller 805.

FIGS. 30A and 30B illustrate a table stored in the memory of a controller 505 according to Modification (27).

FIG. 31 is a flowchart of operations by the controller 505 according to Modification (27).

FIG. 32 illustrates a table stored in the memory of a controller 505 according to Modification (28).

DESCRIPTION OF EMBODIMENTS

Figure 1:
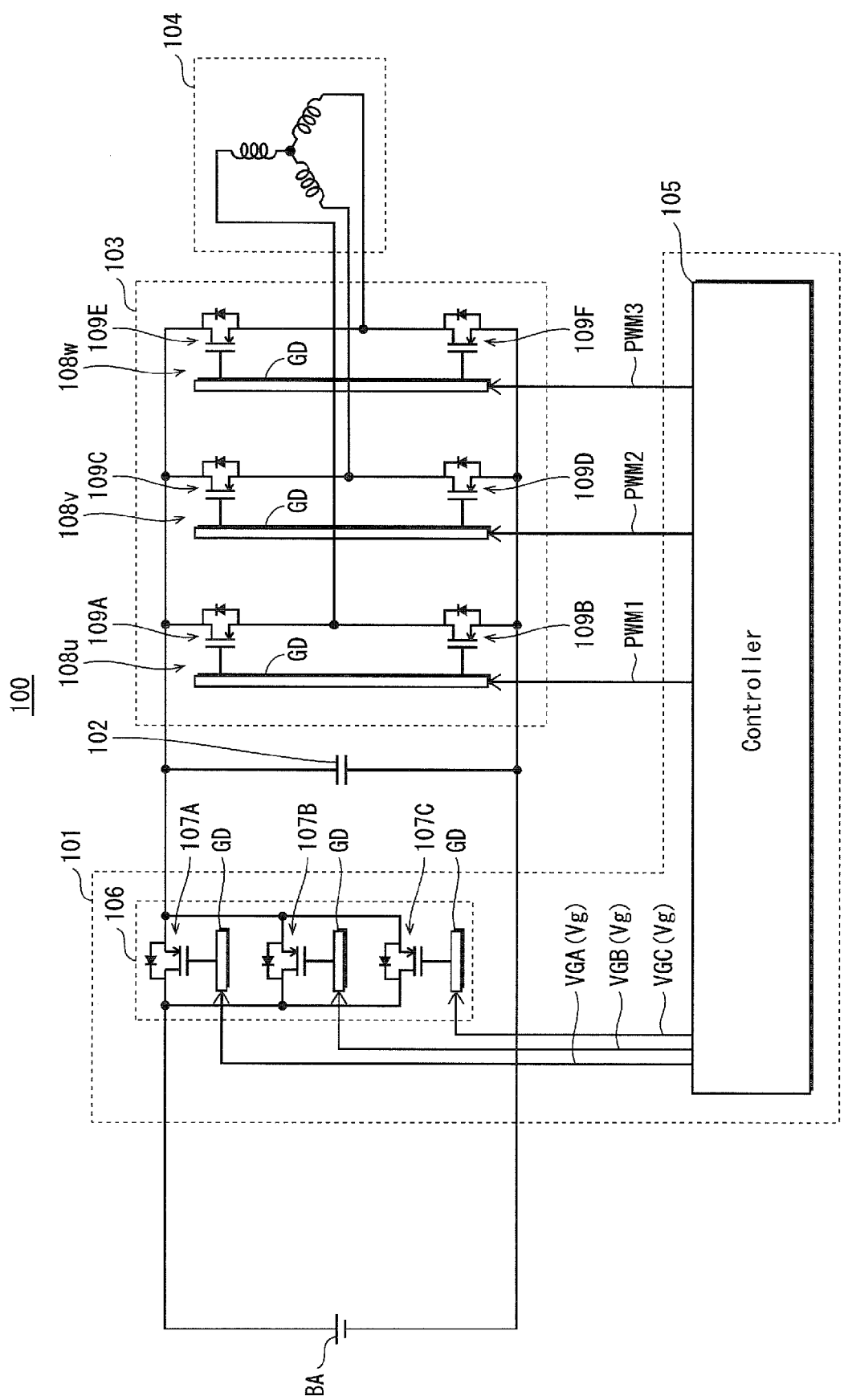
FIG. 1 illustrates the overall configuration of a power system 100 provided with a power switching device 101 according to Embodiment 1.

With the structure of the power switching device according to the present disclosure, the electric circuit connecting the DC power supply and the capacitance element is set to the open state by the controller adjusting the level of each control signal so that the maximum value of the current (maximum current) flowing through each semiconductor elements is 0 A. Furthermore, the electric circuit connecting the DC power supply and the capacitance element is set to the closed state by the controller adjusting the level of each control signal so that the maximum current becomes a finite current value that is not 0 A. Therefore, no induced electromotive force is produced in the present invention, since the electric circuit is switched without use of a mechanical relay. This eliminates the need for providing a bypass circuit or the like to transfer an induced electromotive force, thus reducing the size of the power switching device. Furthermore, other problems unique to mechanical relays (such as contact welding) also do not arise.

Furthermore, the period starting when a command to place the electric circuit into the closed state is received until a predetermined time elapses (precharging period), the current flowing in the electric circuit is controlled so as not to exceed a predetermined current limit by adjusting the level of the control signals. This allows for control of inrush current when the electric circuit is placed into the closed state. With this structure, a separate precharging path and system main relay need not be provided, as the semiconductor elements perform both of these functions. This structure thus allows for further reduction in size of the power switching device.

During the precharging period, it is desirable to be able to control the current flowing in the electric circuit (precharging current) precisely. If the power switching device were to include one semiconductor element with a large current capacity, it would be difficult to control the control signal in order for a small current, such as the precharging current, to flow through the electric circuit. Therefore, when the power switching device is configured with semiconductor elements, it is desirable to connect, in parallel, a plurality of semiconductor elements having a small current capacity to allow for easy control of small currents. Furthermore, in the case of temperature dependent semiconductor elements, in which the maximum current varies with temperature, it is necessary to use an even larger number of semiconductor elements in order to respond to a certain degree of temperature change. Therefore, even if the power switching device is configured only with semiconductor elements, the attempt to reduce size may not be effective due to an increased number of semiconductor elements included in the power switching device.

Since the power switching device of the present disclosure is provided with a temperature detection circuit, however, the power switching device can adjust the level of each control signal in response to the temperature detected by the temperature detection circuit. Therefore, even if the semiconductor elements are temperature dependent, excess semiconductor elements are not required in order to respond to temperature changes. Moreover, since the temperature detection circuit is small, providing the temperature detection circuit has little impact on the size of the power switching device as compared to the provision of excess semiconductor elements. Providing the temperature detection circuit thus allows for effective reduction in size when the power switching device is configured with semiconductor elements.

The following describes embodiments of the present invention with reference to the drawings.

Embodiment 1

Structure

FIG. 1 illustrates the overall configuration of a power system 100 provided with a power switching device according to Embodiment 1.

The power system 100 is connected to a DC power supply BA at the input side and to a motor 104 at the output side. The power system 100 is provided with a power switching device 101, a smoothing capacitor 102, and an inverter 103.

The DC power supply BA is either a DC power supply obtained by rectifying power from a power supply system, or a battery-type DC power supply (typically a nickel-metal hydride, lithium-ion, etc. secondary battery).

The motor 104 is a three-phase motor composed of three-phase coils that receive a supply of three-phase power.

The power switching device 101 opens and closes an electric circuit connecting the DC power supply BA and the smoothing capacitor 102 in response to commands. The power switching device 101 includes a controller 105 and a current amount variation unit 106.

The smoothing capacitor 102 smoothes DC power received from the DC power supply BA via the power switching device 101, and outputs the result to the inverter 103.

The inverter 103 converts DC power provided by the DC power supply BA into three-phase AC power made up of a U-phase, a V-phase, and a W-phase respectively shifted by 120° C. (2π/3 radians) and supplies the three-phase AC power to the motor 104.

The current amount variation unit 106 is provided with one or more semiconductor elements 107A, 107B, and 107C inserted along the electric circuit that connects the DC power supply BA and the smoothing capacitor 102. The semiconductor elements 107A, 107B, and 107C are semiconductor elements that allow a current to flow that is equal to or less than a maximum current determined by the level of an input control signal and that depends on the difference between the voltage of the DC power supply BA and the voltage (charging voltage) of the smoothing capacitor 102. In the present embodiment, the number of semiconductor elements is three, and each semiconductor element is a switching element that is an N-type Metal-Insulator-Semiconductor Field Effect Transistor (hereinafter referred to as MISFET) or the like. A gate drive circuit GD is connected to the gate terminal of the semiconductor elements 107A, 107B, and 107C.

The semiconductor elements 107A, 107B, and 107C are connected in parallel. Accordingly, the current flowing along the electric circuit connecting the DC power supply BA and the smoothing capacitor 102 corresponds to the current flowing through the semiconductor elements 107A, 107B, and 107C, i.e. the sum of the current flowing from the drain to the source (the forward current) of each semiconductor element. The forward current of each semiconductor element is determined by the level of a control signal input into the gate terminal, and by the difference between the voltage of the DC power supply BA and the voltage of the smoothing capacitor 102. Since a MISFET is used for the semiconductor elements in the present embodiment, the control signal corresponds to the gate voltage. Accordingly, the current flowing along the electric circuit connecting the DC power supply BA and the smoothing capacitor 102 is determined by the level of the control signal input into the gate terminal, and by the difference between the voltage of the DC power supply BA and the voltage of the smoothing capacitor 102. This relationship is described in detail with reference to FIG. 3.

Controller 105

The controller 105 controls the current amount variation unit 106 and the inverter 103. As an operation to control the current amount variation unit 106, the controller 105 outputs a separate control signal Vg to each of the semiconductor elements 107A, 107B, and 107C via the gate drive circuit GD. As a result, the magnitude of the maximum value of the forward current of each semiconductor element (hereinafter, the "maximum value of the forward current" being referred to simply as the "maximum current") is controlled. In FIG. 1, the control signal Vg for the semiconductor element 107A is labeled VGA, the control signal Vg for the semiconductor element 107B is labeled VGB, and the control signal Vg for the semiconductor element 107C is labeled VGC.

Figures 2A, 2B:
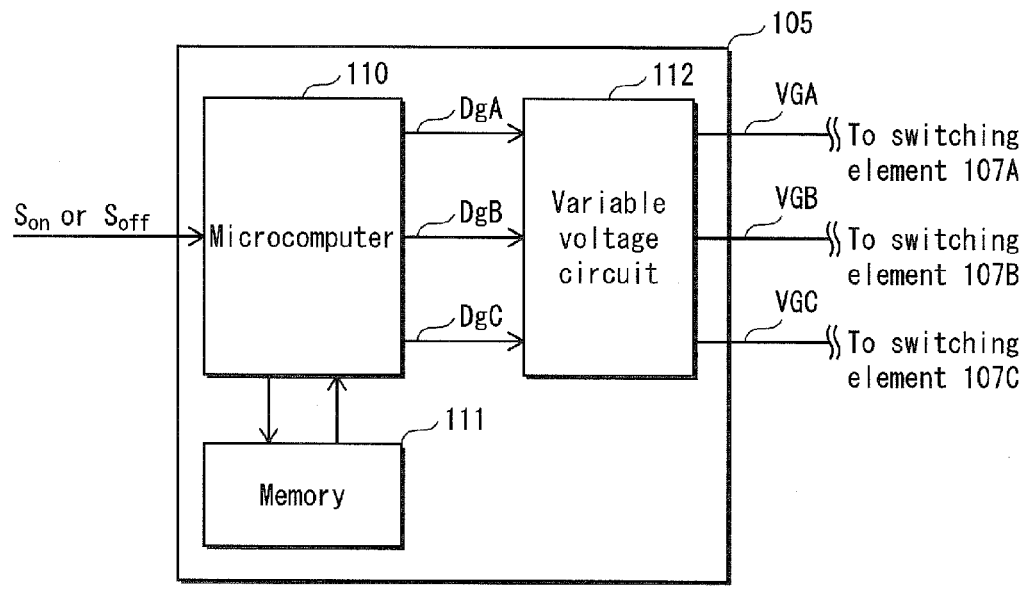
FIG. 2A is a block diagram of an example of the structure of a controller 105 according to Embodiment 1.
FIG. 2B illustrates the relationship between the level of the control command signal Dg input into the variable voltage circuit 112 and the level of the control signal Vg output by the variable voltage circuit 112.

FIG. 2A is a block diagram illustrating an example of the structure of the controller 105. FIG. 2A shows only a portion of the structure of the controller 105 for controlling the current amount variation unit 106. As shown in FIG. 2A, the controller 105 is provided with a microcomputer 110, a memory 111, and a variable voltage circuit 112.

The microcomputer 110 receives, from an external source (such as an ignition key), a command $S_{on}$ to turn on the power switching device 101 (i.e. a command to place the electric circuit connecting the DC power supply BA and the smoothing capacitor 102 in a closed state) and a command $S_{off}$ to turn off the power switching device 101 (i.e. a command to place the electric circuit connecting the DC power supply BA and the smoothing capacitor 102 in an open state). In accordance with information, such as a table, stored in the memory 111, the microcomputer 110 also varies the setting of a control command signal DgC output to the variable voltage circuit 112. In FIG. 2A, the control command signal Dg corresponding to the semiconductor elements 107A, 107B, and 107C is labeled DgA, DgB, and DgC.

The variable voltage circuit 112 is a D/A (digital/analog) converter that converts the digital control command signals DgA, DgB, and DgC into analog control signals VGA, VGB, and VGC.

FIG. 2B shows the relationship between the level of the control command signal Dg input into the variable voltage circuit 112 (output by the microcomputer 110) and the level of the control signal Vg output by the variable voltage circuit 112. For example, when given an input of a control command signal Dg3 as the control command signal DgA, the variable voltage circuit 112 outputs a control signal Vg3 to the semiconductor element 107A.

Information on the setting of the control command signal Dg output during a first period and during a second period is stored in the memory 111. The first period refers to a period from when the microcomputer 110 receives the command $S_{on}$ to turn the power switching device 101 on (i.e. the command to place the electric circuit connecting the DC power supply BA and the smoothing capacitor 102 in a closed state) until a predetermined time period elapses. The second period refers to the time from when the predetermined time period has elapsed until the command $S_{off}$ to turn the power switching device 101 off (i.e. the command to place the electric circuit in an open state) is received.

In the present embodiment, the information on settings stored in the memory 111 indicates that during the first period, DgA=Dg3, DgB=Dg0, and DgC=Dg0, and that during the second period, DgA=Dg7, DgB=Dg7, and DgC=Dg7. Ultimately, the controller 105 outputs control signals VGA=Vg3, VGB=Vg0, VGC=Vg0 during the first period and outputs control signals VGA=Vg7, VGB=Vg7, VGC=Vg7 during the second period. In this way, the controller 105 adjusts the level of the control signals output to the semiconductor elements 107A, 107B, and 107C during the first period and the second period.

I-V Characteristics of Semiconductor Elements

Figure 3:
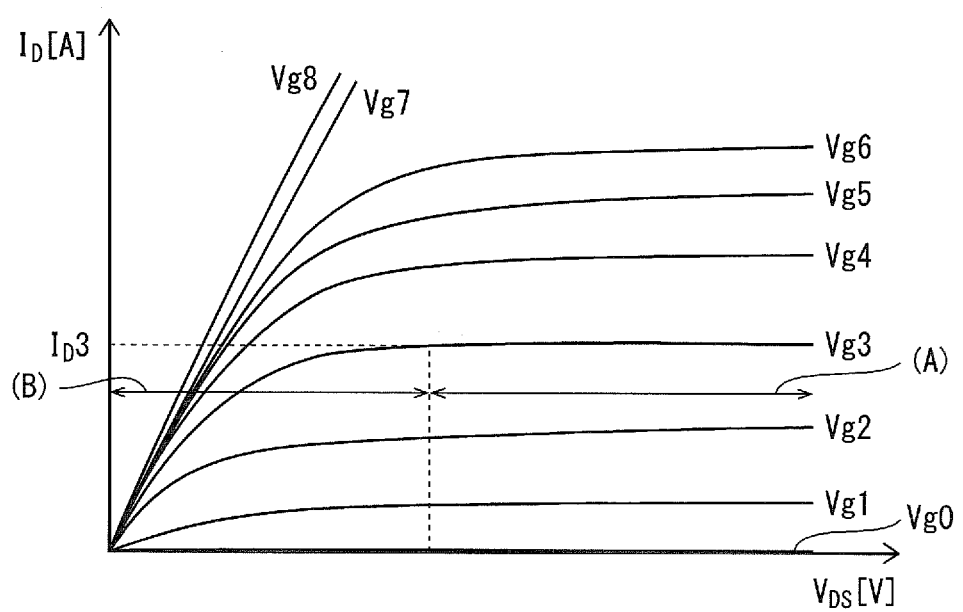
FIG. 3 schematically illustrates the I-V characteristics of a semiconductor element.

FIG. 3 schematically illustrates the I-V characteristics of the semiconductor elements 107A, 107B, and 107C. With reference to FIG. 3, the following describes the relationship between the control signals Vg0 through Vg8 input into the semiconductor elements and the maximum current of the semiconductor elements. It is assumed here that the semiconductor elements are normally off. In FIG. 3, the horizontal axis represents the drain-source voltage V ($V_{DS}$) of the semiconductor element, and the vertical axis represents the forward current A ($I_D$).

In the case of the control signal Vg0, the value of the $I_D$ is always 0 A, no matter what value the $V_{DS}$ is. Accordingly, the maximum current is 0 A. In this case, the semiconductor element is in an off state, in which no forward current flows. In the case of control signals Vg1 through Vg6, $I_D$ rises as $V_{DS}$ rises. When $V_{DS}$ exceeds a predetermined value, however, $I_D$ reaches the maximum current and subsequently indicates an approximately constant value. As shown in FIG. 3, the maximum current of $I_D$ increases in the order Vg1<Vg2< . . . <Vg5<Vg6. Furthermore, in the case of control signals Vg7 and Vg8, as $V_{DS}$ rises, $I_D$ also rises, continuing to rise until saturation due to a heat limitation or the like. A semiconductor element into which the control signal Vg7 or Vg8 is input has a small on-resistance as compared to a semiconductor element into which the control signals Vg1 through Vg6 are input, and therefore can operate with lower loss.

As shown in FIG. 3, the maximum current is determined by the level Vg0 through Vg8 of the input control signal. Accordingly, adjusting the level of the control signal Vg output by the controller 105 to the semiconductor elements 107A, 107B, and 107C allows for adjustment of the amount of current flowing along the electric circuit connecting the DC power supply BA and the smoothing capacitor 102. Furthermore, FIG. 3 also illustrates how the forward current for each level of the control signal Vg is determined by the drain-source voltage ($V_{DS}$), i.e. the difference between the voltage of the DC power supply BA and the voltage of the smoothing capacitor 102.

Summarizing operations of the controller 105 of the present embodiment, the controller 105 outputs control signals VGA=Vg3, VGB=Vg0, VGC=Vg0 during the first period and outputs control signals VGA=Vg7, VGB=Vg7, VGC=Vg7 during the second period, as described above. Accordingly, by adjusting the level of each control signal output to the semiconductor elements 107A, 107B, and 107C, the controller 105 ensures that the current flowing along the electric circuit does not exceed a predetermined current limit during the first period, and allows for the current flowing along the electric circuit to exceed the current limit during the second period.

Note that the expression "allows for" means that the controller 105 raises the maximum value of current that can flow along the electric circuit to be above the current limit. The expression "allows for" therefore does not mean actually causing a current that exceeds the current limit to flow along the electric circuit. The current actually flowing along the electric circuit is always determined by the voltage applied to the current amount variation unit 106. Details are provided below. p The desirable value for the current limit is determined by the type of DC power supply BA, the capacitance of the smoothing capacitor 102, and the difference between the voltage of the DC power supply BA and the voltage of the smoothing capacitor 102. For example, if the rated voltage of the DC power supply BA is 300 V, the rated capacity of the smoothing capacitor 102 is 888 μF, and the smoothing capacitor 102 is not charged, the current limit is approximately 20 A. The current limit can also be set to a value that is equal to or less than the maximum output current of the DC power supply BA, or to a value that is equal to or less than the sum of the maximum rated current of each element (such as fuses, wiring lines, and the like) inserted along the electric circuit that connects the DC power supply BA and the smoothing capacitor 102. The level of the control signal Vg is adjusted so that the sum of the maximum currents of the semiconductor elements 107A, 107B, and 107C during the first period is equal to or less than the current limit determined as above. In the present embodiment, the current limit is set to $I_D3$, and the control signals output during the first period are set as follows: VGA=Vg3, VGB=Vg0, and VGC=Vg0. In other words, the following describes the case when the sum of the maximum currents during the first period is equal to the current limit.

Inverter 103

The inverter 103 is inserted into the electric circuit that connects the smoothing capacitor 102 and the motor 104. In the inverter 103, a U-phase arm 108u, a V-phase arm 108v, and a W-phase arm 108w are connected in parallel. In the U-phase arm 108u, semiconductor elements 109A and 109B are connected in series. The semiconductor elements 109A and 109B allow current to flow in accordance with the level of an input control signal. The semiconductor elements 109A and 109B have a similar structure to the semiconductor elements provided in the power switching device 101. As with the power switching device 101, a gate drive circuit GD is connected to the gate terminal of the semiconductor elements 109A and 109B.

The controller 105 generates not only control signals for the semiconductor elements 107A, 107B, and 107C provided in the power switching device 101, but also pulse-width modulation signals (PWM signals), which are control signals for the semiconductor elements 109A and 109B provided in the inverter 103. In FIG. 1, the pulse-width modulation signal for the semiconductor elements 109A and 109B is labeled PWM 1. The PWM signal PWM 1 is output to the gate terminal of the semiconductor elements 109A and 109B via the gate drive circuit GD.

The V-phase arm 108v and W-phase arm 108w have the same structure as the U-phase arm 108u. The V-phase arm 108v is provided with semiconductor elements 109C and 109D controlled by a PWM signal PWM 2, and the W-phase arm 108w is provided with semiconductor elements 109E and 109F controlled by a PWM signal PWM 3.

The semiconductor elements 107A, 107B, and 107C provided in the power switching device 101 and the semiconductor elements 109A through 109F provided in the inverter 103 are housed in the same package. Housing the semiconductor elements in the same package contributes to a further reduction in size of the power system, a decrease in the operation load when manufacturing the power system 100, a reduction in the number of parts, and a lowering of costs. Furthermore, shortening the length of wiring from the semiconductor elements 109A through 109F provided in the inverter 103 to the smoothing capacitor 102 reduces wiring inductance, thereby inhibiting an excessively large surge voltage.

Since the semiconductor elements 107A through 107C and 109A through 109F generate heat while operating, it is necessary to dissipate such heat with a cooler or the like. In this case, it is desirable to mount the semiconductor elements 107A through 107C provided in the power switching device 101 and the semiconductor elements 109A through 109F provided in the inverter 103 on the same cooler (for example, on a heat sink) for cooling. With this structure, it is not necessary to provide separate coolers for the semiconductor elements 107A through 107C and the semiconductor elements 109A through 109F, which promotes a corresponding reduction in size.

Overall Operations of Power System 100

Figure 4:
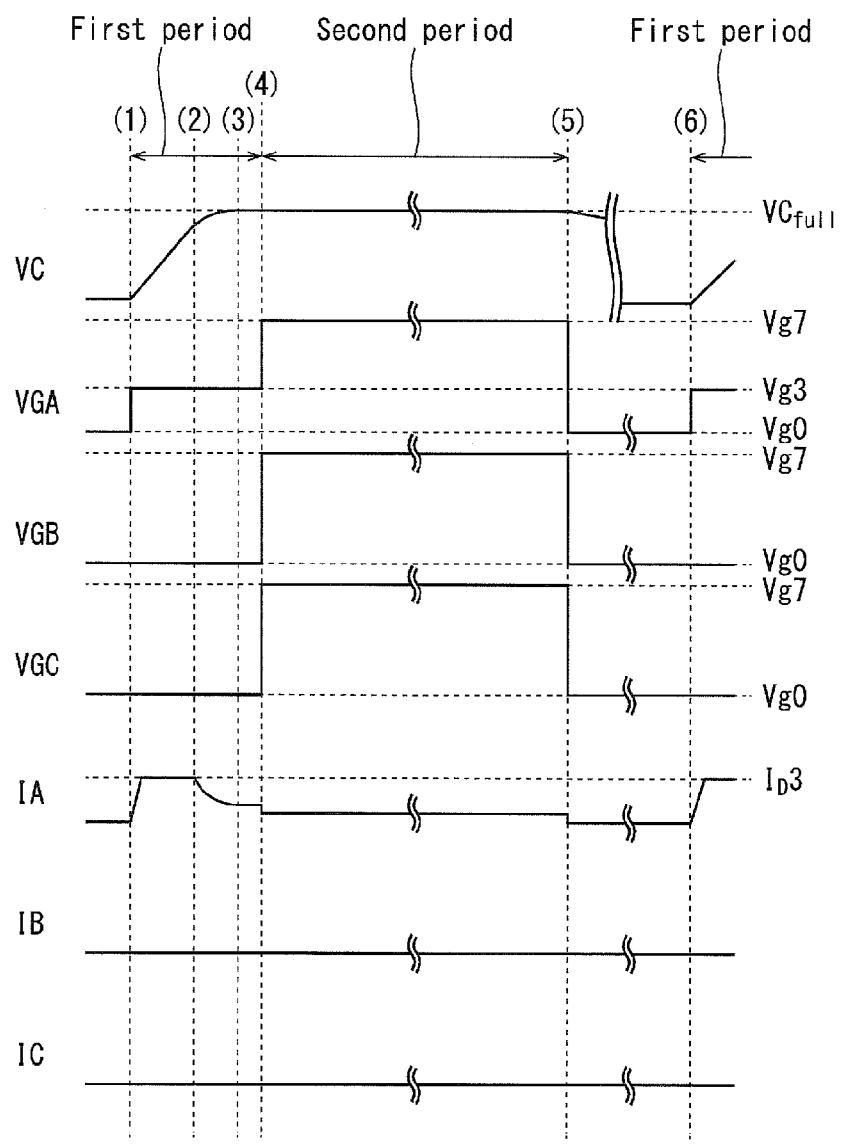
FIG. 4 illustrates an example of a timing chart according to Embodiment 1.

Next, with reference to FIG. 4, the following describes overall operations of the power system 100.

FIG. 4 illustrates an example of a timing chart in the present embodiment. In order from the top, FIG. 4 illustrates variation of the voltage VC of the smoothing capacitor 102, the waveform of the control signal VGA, the waveform of the control signal VGB, the waveform of the control signal VGC, the waveform of the forward current IA flowing through the semiconductor element 107A, the waveform of the forward current IB flowing through the semiconductor element 107B, and the waveform of the forward current IC flowing through the semiconductor element 107C.

As described above, the period of operation of the power system 100 is roughly divided into the first period (times (1) through (4)) and the second period (times (4) through (5)). During the first period, the smoothing capacitor 102 is precharged, and during the second period, operations are performed for conduction with lower loss over the electric circuit connecting the DC power supply BA and the smoothing capacitor 102.

First Period

First, at time (1) in FIG. 4, the microcomputer 110 receives the command $S_{on}$ (FIG. 2), which causes the overall operations of the power system 100 to begin. During the first period (times (1) through (4)), the controller 105 outputs Vg3 as the control signal VGA, and outputs Vg0 as the control signals VGB and VGC.

Strictly speaking, there is a time lag between when the microcomputer 110 receives the command $S_{on}$ and when the variable voltage circuit 112 outputs the control signals VGA, VGB, and VGC. However, starting with the timing chart in FIG. 4, this time lag is not taken into consideration (i.e. the time lag is considered to be zero seconds) in the present disclosure so as to simplify the explanation.

During the first time period, a control signal Vg3 (FIG. 3) that has a relatively small maximum current (a relatively large on-resistance) is output only to the semiconductor element 107A. Therefore, the current supplied to the smoothing capacitor 102 does not exceed the current limit. This allows for gradual charging of the smoothing capacitor 102 while controlling the inrush current when the electric circuit is placed in the closed state. In other words, the first period is provided as a precharging period.

The following describes operations of the semiconductor element 107A during the first period (times (1) through (4)) in slightly greater detail. Upon receipt of the control signal Vg3 (time (1)), forward current begins to flow in the semiconductor element 107A. For a short time after this forward current begins to flow, the drain-source voltage ($V_{DS}$) of the semiconductor element 107A is relatively large. Therefore, the characteristics of the semiconductor element 107A during this period are as shown by the region in section A (saturation region) of FIG. 3. Accordingly, for a short time after this forward current begins to flow (until time (2)), the current flowing through the semiconductor element 107A does not exceed the maximum current $I_D3$ corresponding to when the control signal Vg3 is input (in the first period of the present embodiment, the maximum current $I_D3$ is a value equivalent to the current limit).

As the precharging of the smoothing capacitor 102 continues, the $V_{DS}$ of the semiconductor element 107A decreases. Starting at the point in time (time (2)) at which $V_{DS}$ becomes equivalent to the voltage at the boundary between sections A and B (pinch-off voltage), the characteristics of the semiconductor element 107A are as in the region indicated by section B (linear region). Accordingly, from time (2) to time (4), the forward current flowing through the semiconductor element 107A decreases.

Second Period

Next, during the second period (times (4) through (5)), the controller 105 sets the control signals VGA, VGB, and VGC all to Vg7. During the second period, charging of the smoothing capacitor 102 is complete. Therefore, even though the current flowing along the electric circuit connecting the DC power supply BA and the smoothing capacitor 102 is allowed to exceed the current limit, a large inrush current does not occur. Therefore, until saturation due to a heat limitation or the like, there is no limit on the forward current, and a control signal Vg7 that causes forward current to flow in accordance with the drain-source voltage ($V_{DS}$) can be output to all three of the semiconductor elements. As a result, the electric circuit connecting the DC power supply BA and the smoothing capacitor 102 can be operated with a lower on-resistance.

Number of Semiconductor Elements into which the Control Signal Vg Is Input

The following is a consideration of the reasons for having a larger number of semiconductor elements through which current flows in the second period than in the first period (i.e. a larger number of semiconductor elements into which is input a control signal Vg with a level between Vg1 and Vg8).

During the first period, when the electric circuit connecting the DC power supply BA and the smoothing capacitor 102 is placed in a closed state, it is necessary to control the inrush current. Therefore, it is desirable that the on-resistance of the semiconductor elements be large. Conversely, during the second period, upon considering factors such as power consumption, it is advantageous to have the electric circuit connecting the DC power supply BA and the smoothing capacitor 102 conduct with lower loss, thus making it desirable for the semiconductor elements to have a small on-resistance. In general, to decrease the on-resistance, it is effective to expand the chip area of the semiconductor element (i.e. provide a large current), whereas to increase the on-resistance, it is effective to reduce the chip area of the semiconductor element (i.e. provide a low current). Therefore, in the present embodiment, the on-resistance is not only adjusted by adjusting the level of the input control signal, but also by changing the number of semiconductor elements through which current flows.

During the first period, it is desirable that the maximum current and the on-resistance be set precisely. In the present embodiment, current only flows to the semiconductor element 107A during the first period. This allows for the maximum current and the on-resistance to be set more precisely than when current flows through all three of the semiconductor elements.

End of Overall Operations of Power System 100, Other Notes

At time (5), the microcomputer 110 receives the command $S_{off}$ (FIG. 2), which causes the overall operations of the power system 100 to end. At time (6), the microcomputer 110 again receives the command $S_{on}$ (FIG. 2), which causes the overall operations of the power system 100 to begin. At time (6), overall operations performed for the second time correspond to the overall operations performed for the first time at time (1) and proceed in the same way.

Next, the design concept behind the present embodiment is described with reference to the variation in the voltage VC of the smoothing capacitor 102. The period required for precharging is a preparatory period for causing the power system to operate. From the user's perspective, it is desirable that this period be roughly constant, no matter what conditions the power system is experiencing. Therefore, the length of the first period (times (1) through (4)) is first determined. Next, taking into consideration factors such as the time for transitioning from the first period to the second period due to delay of the control signal Vg, the time (times (1) through (3)) for completion of charging of the smoothing capacitor 102 (in order to raise the voltage VC of the smoothing capacitor 102 to $VC_{full}$) is then determined. Finally, the maximum value of the current allowed to flow during the first period in the electric circuit connecting the DC power supply BA and the smoothing capacitor 102 is determined so that the charging time will not exceed the determined length of time. In other words, variation in the voltage VC of the smoothing capacitor 102 as shown in the top tier of FIG. 4 is determined in advance during the design stage.

Nevertheless, when determining the length of the first period, if the length is too short, the smoothing capacitor 102 will not properly precharge, making it impossible to effectively control inrush current. Therefore, the length of the first period is set within a range that causes the value of the current allowed to flow in the electric circuit to be equal to or less than a determined current limit.

Furthermore, time (3) corresponds to the time at which the smoothing capacitor 102 is 100% charged when the smoothing capacitor 102 is charged with a current that does not exceed the current limit. As described above, the time (4) at which the first period ends is set to be later than the time (3). In other words, the first period is set to be longer than the time necessary for the smoothing capacitor 102 to be charged from 0% to 100% when charging the smoothing capacitor 102 with a current that does not exceed the current limit.

The waveform shown in FIG. 4 for the forward current through the semiconductor element 107A is for a loaded state (when the smoothing capacitor 102 and the inverter 103 are connected). In the case of a loaded state, the forward current of the semiconductor element 107A is not 0 A from time (4) to time (5). At time (5), however, overall operations of the power system 100 end, and the forward current becomes 0 A. While not shown in the figures, in the case of an unloaded state (when the smoothing capacitor 102 and the inverter 103 are not connected), the forward current of the semiconductor element 107A is 0 A from time (4) through time (5) as well.

SUMMARY

As described above, in the present embodiment, an electric circuit is switched using semiconductor elements, without using a mechanical relay. Since switching with a mechanical relay produces an induced electromotive force, it is necessary to provide a bypass circuit or the like to transfer this force. By not requiring such a bypass circuit or the like to be provided, the present embodiment Apart from this problem, a mechanical relay also presents problems including maintenance issues and decreased reliability due to shortened service life caused by factors such as attrition of contacts. Other problems faced by a mechanical relay include the production of noise due to arc discharge at the contacts when switching, delays due to large hysteresis, and so forth. Since a mechanical relay is not used in the present embodiment, however, such problems unique to mechanical relays do not arise.

Furthermore, in the present embodiment, the electric circuit connecting the DC power supply and the capacitance element is switched by adjusting the level of the control signal (gate voltage) input into the semiconductor elements. When the electric circuit connecting the DC power supply and the capacitance element is in the closed state, the amount of current flowing through the electric circuit is controlled so as not to exceed a current limit by similarly adjusting the level of the control signal input into the semiconductor elements. Therefore, it is possible to have only a current amount variation unit, composed of semiconductor elements, perform the functions of the precharging path and the system main relays in Patent Literature 1. This structure allows for a further reduction in the size of the power switching device.

Embodiment 2

In Embodiment 1, the semiconductor element through which current flows during the first period is fixed as the semiconductor element 107A (FIG. 4). In the present embodiment, a structure is to switch the semiconductor element through which current flows during the first period so as to disperse the burden on the semiconductor elements.

Structure

Figure 5:
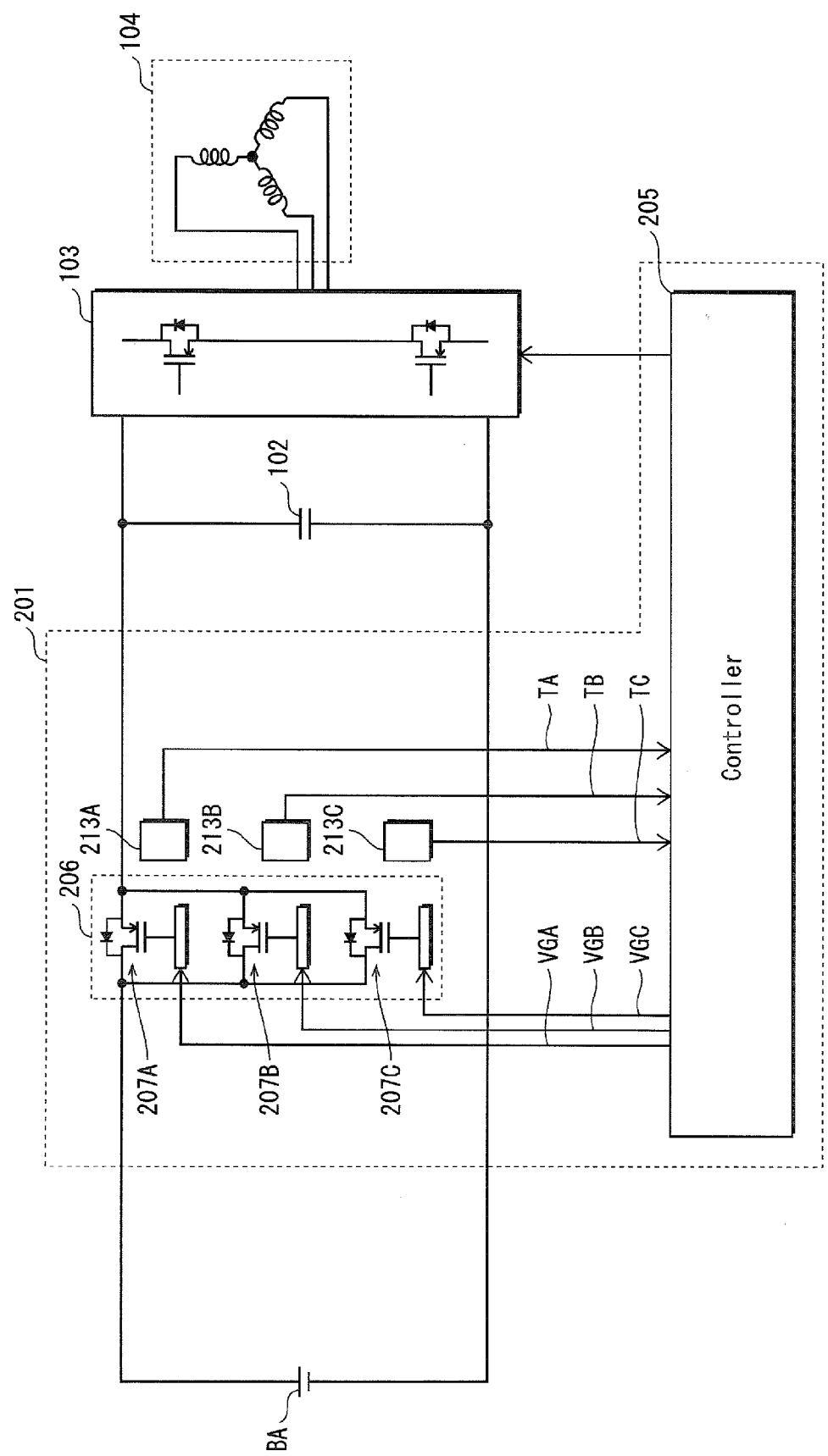
FIG. 5 illustrates the overall configuration of a power system 200 provided with a power switching device 201 according to Embodiment 2.

FIG. 5 illustrates the overall configuration of a power system 200 provided with a power switching device according to Embodiment 2. In addition to the structure of the power switching device 101 (see Embodiment 1 and FIG. 1), a power switching device 201 is provided with temperature detection circuits 213A, 213B, and 213C. Below, structural components that are the same as in Embodiment 1 are provided with the same reference signs, and a description thereof is omitted.

A current amount variation unit 206 includes semiconductor elements 207A, 207B, and 207C having a similar structure as in Embodiment 1.

The temperature detection circuits 213A, 213B, and 213C respectively detect the temperature TA in ° C. of the semiconductor element 207A, the temperature TB in ° C. of the semiconductor element 207B, and the temperature TC in ° C. of the semiconductor element 207C.

A controller 205 outputs control signals VGA, VGB, and VGC respectively to the semiconductor elements 207A, 207B, and 207C. The controller 205 also acquires information on the temperatures TA, TB, and TC detected by the temperature detection circuits 213A, 213B, and 213C, and in accordance with the detected temperatures, selects the semiconductor element through which current flows during the first period. In the present embodiment, the semiconductor element through which current flows during the first period is selected in order from the semiconductor element with the lowest temperature. Details on the operations of the controller 205, including this operation, are provided with reference to FIG. 6.

Flowchart of Operations by the Controller 205

Figure 6:
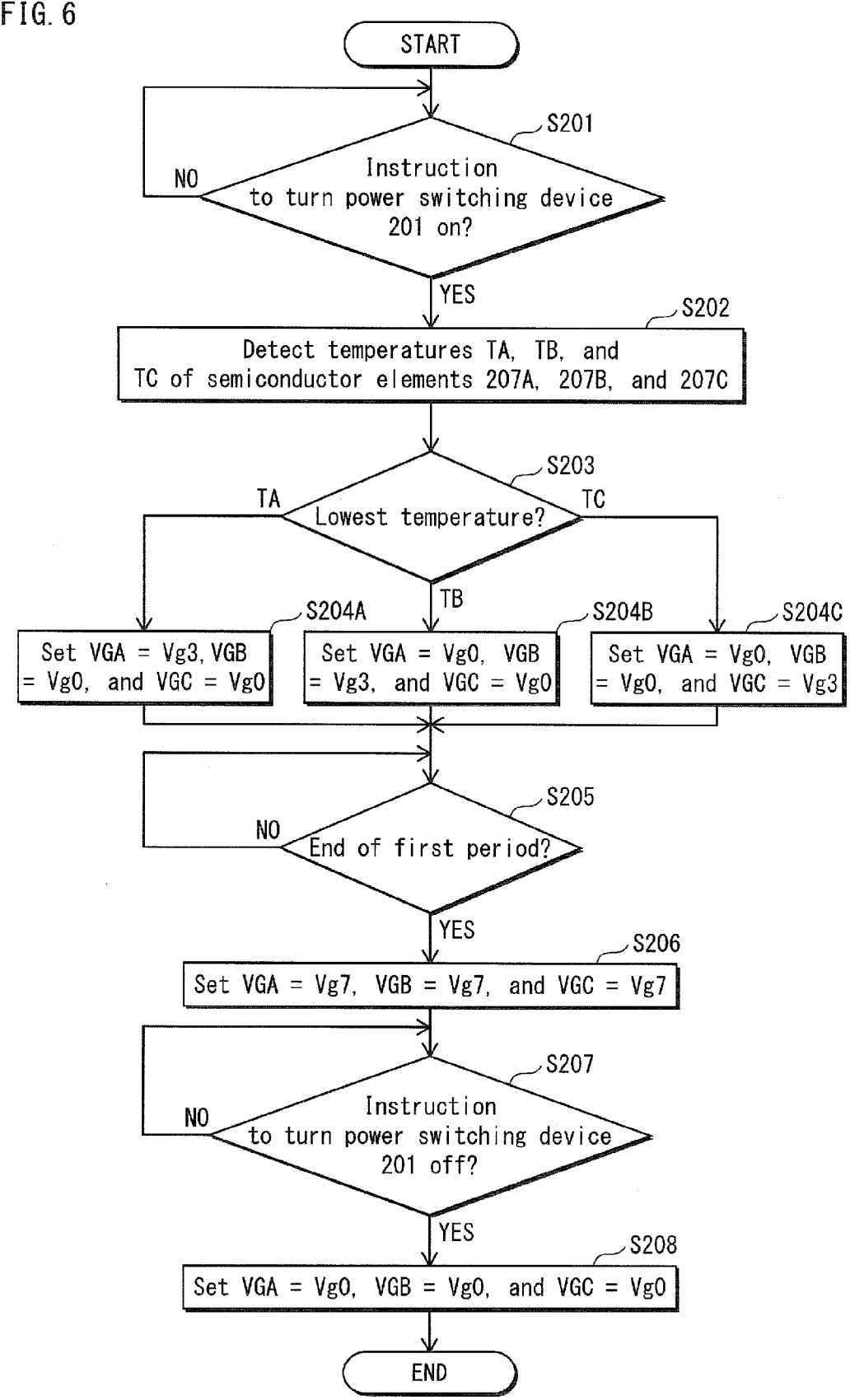
FIG. 6 is a flowchart of operations by a controller 205 according to Embodiment 2.

FIG. 6 is a flowchart of operations by the controller 205 of the present embodiment.

First, the controller 205 determines whether a command to turn the power switching device 201 on ($S_{on}$ in FIG. 2A) has been received (step S201). When determining that such a command has not been received (step S201: NO), processing returns to step S201. When determining that such a command has been received (step S201: YES), the controller 205 begins overall operations of the power system 200 and acquires information on the temperatures TA, TB, and TC detected by the temperature detection circuits 213A, 213B, and 213C (step S202).

Next, among the temperatures TA, TB, and TC, the controller 205 determines which temperature is the lowest (step S203). When determining that the temperature TA is the lowest (step S203: TA), the controller 205 outputs Vg3 as VGA, Vg0 as VGB, and Vg0 as VGC (step S204A; see FIGS. 2 and 3). When determining that the temperature TB is the lowest (step S203: TB), the controller 205 outputs Vg0 as VGA, Vg3 as VGB, and Vg0 as VGC (step S204B). When determining that the temperature TC is the lowest (step S203: TC), the controller 205 outputs Vg0 as VGA, Vg0 as VGB, and Vg3 as VGC (step S204C).

Next, the controller 205 determines whether the first period has ended (step S205). When determining that the first period has not ended (step S205: NO), processing returns to step S205. When determining that the first period has ended (step S205: YES), the controller 205 outputs Vg7 as VGA, Vg7 as VGB, and Vg7 as VGC (step S206).

The controller 205 then determines whether a command to turn the power switching device 201 off ($S_{off}$ in FIG. 2A) has been received (step S207). When determining that such a command has not been received (step S207: NO), processing returns to step S207. When determining that such a command has been received (step S207: YES), the controller 205 outputs Vg0 as VGA, VGB, and VGC in order to end overall operations of the power system 200 (step S208).

As described above, in the present embodiment, the controller selects the semiconductor element with the lowest temperature as the semiconductor element through which current flows during the first period. Compared to when selection of the same semiconductor element through which current flows during the first period is fixed, this structure disperses the burden due to heat of the semiconductor elements. As a result, this structure prevents a reduction in the service life of the semiconductor elements and improves reliability of the power switching device.

Modification to Embodiment 2

In Embodiment 2, the temperature of the semiconductor elements is detected individually. Alternatively, a structure may be adopted to detect the overall temperature of the semiconductor elements (the temperature of the current amount variation unit 206).

Structure

Figure 7:
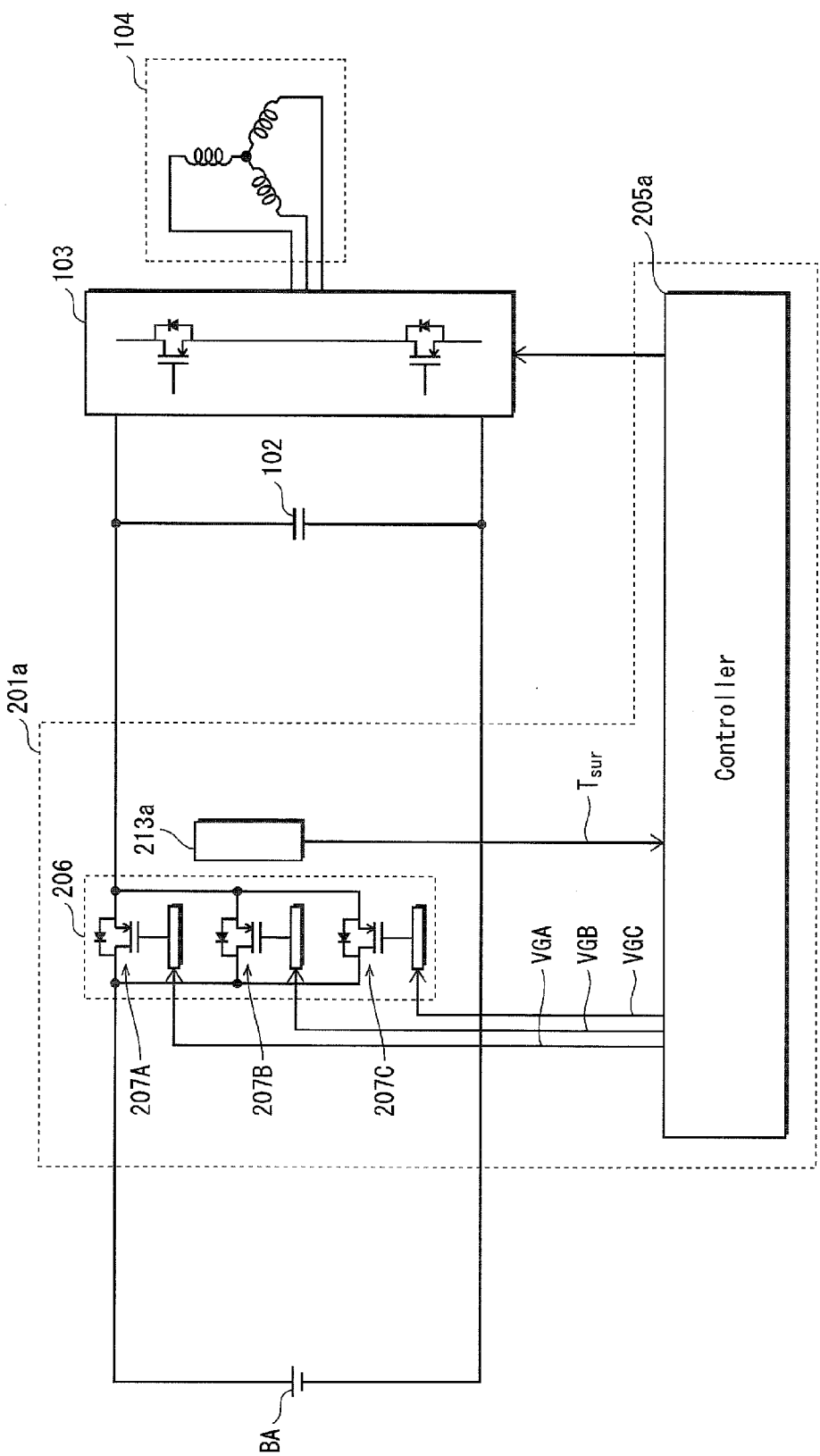
FIG. 7 illustrates the overall configuration of a power system 200a provided with a power switching device 201a according to a modification of Embodiment 2.

FIG. 7 illustrates the overall configuration of a power system 200a provided with a power switching device according to the present modification. In addition to the structure of the power switching device 101 (see Embodiment 1 and FIG. 1), a power switching device 201a is provided with a temperature detection circuit 213a. The following explanation focuses on the differences from the power switching device 201 of Embodiment 2.

The temperature detection circuit 213a detects the overall temperature $T_{sur}$ in ° C. of the semiconductor elements 207A, 207B, and 207C.

The controller 205a acquires information on the temperature $T_{sur}$ detected by the temperature detection circuit 213a and, in accordance with the detected temperature $T_{sur}$, selects the semiconductor element through which current flows during the first period. In the present embodiment, when the temperature $T_{sur}$ is less than a predetermined temperature, the controller 205a again selects the semiconductor element(s) through which current flowed during the previous first period as the semiconductor element(s) through which current flows during the first period. On the other hand, when the temperature $T_{sur}$ is equal to or greater than a predetermined temperature, the controller 205a follows a predetermined rule to select the semiconductor element(s) through which current flows during the new first period from among the plurality of semiconductor elements excluding at least one of the semiconductor element(s) through which current flowed during the previous first period. Details on the operations of the controller 205a, including this operation, are provided with reference to FIG. 8.

Flowchart of Operations by the Controller 205a

Figure 8:
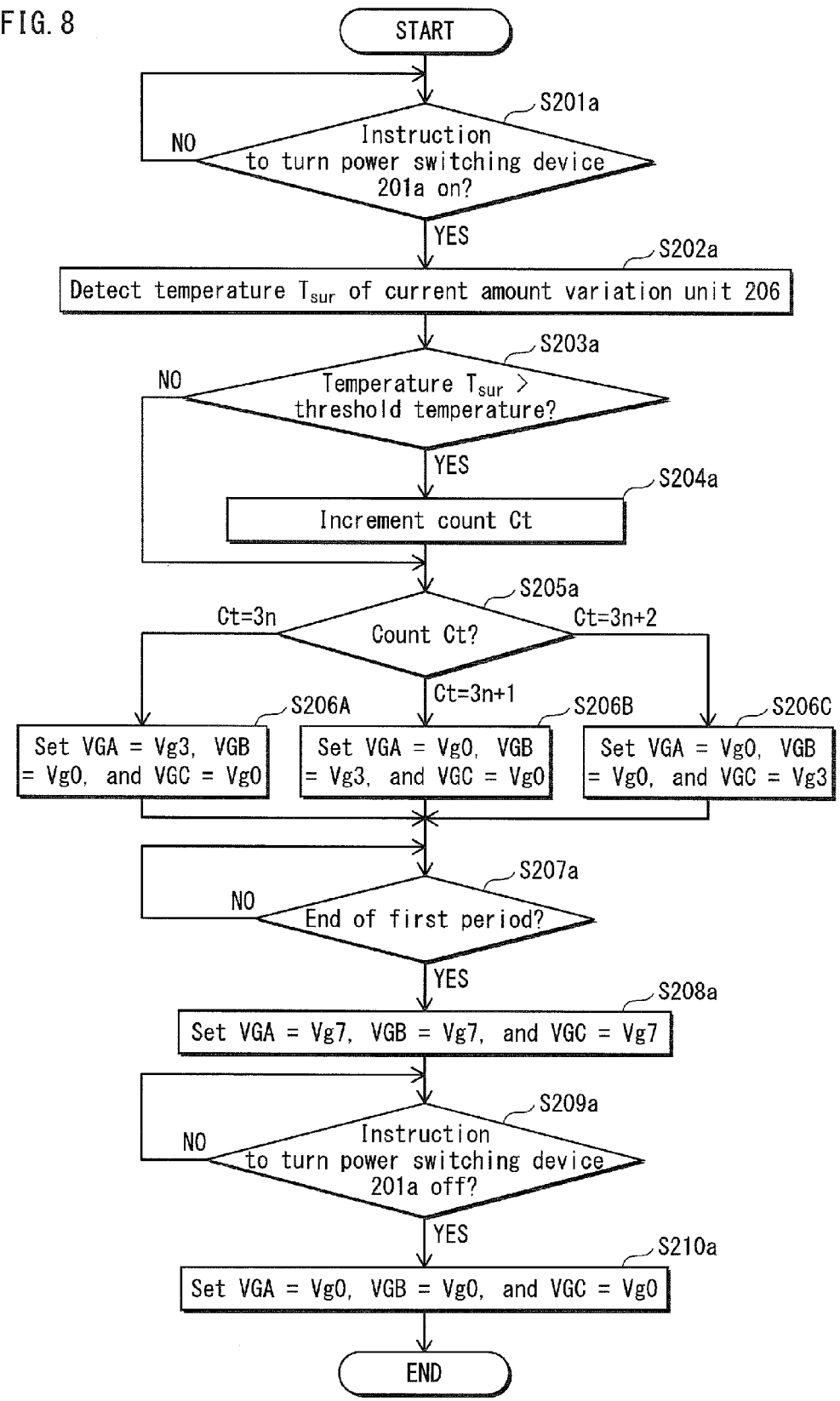
FIG. 8 is a flowchart of operations by a controller 205a according to the modification of Embodiment 2.

FIG. 8 is a flowchart of operations by the controller 205a of the present modification.

Step S201a corresponds to step S201 of Embodiment 2 (FIG. 6). Upon determining that a command to turn the power switching device 201a on has been received (step S201: YES), the controller 205a starts the overall operations of the power system 200a and acquires information on the temperature $T_{sur}$ detected by the temperature detection circuit 213a (step S202a).

Next the controller 205a determines whether the temperature $T_{sur}$ is equal to or greater than a predetermined threshold temperature (step S203a). Upon determining that the temperature $T_{sur}$ is equal to or greater than the threshold temperature (step S203a: YES), the controller 205a increments a counter Ct stored in a microcomputer or the like (step S204a), and processing proceeds to step S205a. Upon determining that the temperature $T_{sur}$ is not equal to or greater than the threshold temperature (step S203a: NO), the controller 205a does not increment the counter Ct, and processing simply proceeds to step S205a.

Next, the controller 205a determines the remainder when the count Ct is divided by three (the number of semiconductor elements included in the current amount variation unit 206; step S205a). When the remainder is zero (step S205a: Ct=3n), the controller 205a outputs Vg3 as VGA, Vg0 as VGB, and Vg0 as VGC (step S206A). When the remainder is one (step S205a: Ct=3n+1), the controller 205a outputs Vg0 as VGA, Vg3 as VGB, and Vg0 as VGC (step S206B). When the remainder is two (step S205a: Ct=3n +2), the controller 205a outputs Vg0 as VGA, Vg0 as VGB, and Vg3 as VGC (step S206C). Steps S207a through S210a correspond to steps S205 through S208 of Embodiment 2 (FIG. 6).

As described above, in the present modification, when the overall temperature of the semiconductor elements exceeds a predetermined threshold, then a different semiconductor element than the semiconductor element through which current flowed during the first period of the previous power system operations is selected as the semiconductor element through which current flows during the new first period. This structure therefore prevents overheating of semiconductor elements due to continual use and prevents a reduction in the service life of the semiconductor elements.

Embodiment 3

Figure 9:
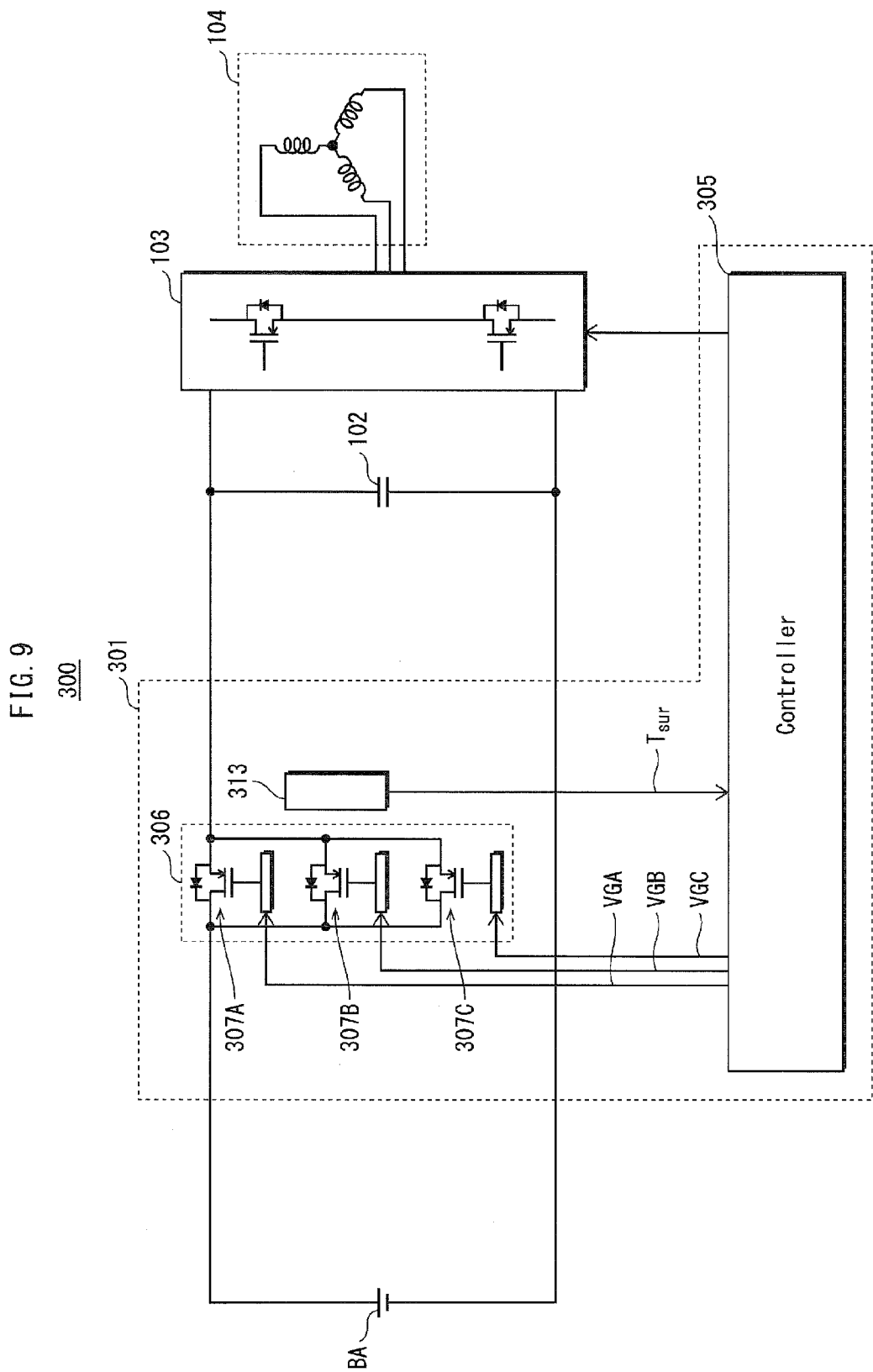
FIG. 9 illustrates the overall configuration of a power system 300 provided with a power switching device 301 according to Embodiment 3.

MISFETs or other semiconductor element are temperature dependent: the maximum current, which is determined by the level of the input control signal, varies with temperature. The structure described in the present embodiment compensates for temperature by adjusting the level of the control signal in accordance with the temperature of the semiconductor elements. Therefore, even if the temperature of the semiconductor elements changes, the length of the first period can be maintained approximately constant. p Structure FIG. 9 illustrates the overall configuration of a power system 300 provided with a power switching device according to Embodiment 3. In addition to the structure of the power switching device 101 (see Embodiment 1 and FIG. 1), a power switching device 301 is provided with a temperature detection circuit 313 that corresponds to the temperature detection circuit 213A of the modification to Embodiment 2 (FIG. 7). In FIG. 9, structural components that are the same as in Embodiment 1 are provided with the same reference signs.

A current amount variation unit 306 includes semiconductor elements 107A, 107B, and 107C having a similar structure as in Embodiment 1.

The temperature detection circuit 313a detects the overall surrounding temperature $T_{sur}$ in ° C. of the semiconductor elements 307A, 307B, and 307C (the current amount variation unit 306).

A controller 305 outputs control signals VGA, VGB, and VGC respectively to the semiconductor elements 307A, 307B, and 307C. The controller 305 also acquires information on the surrounding temperature $T_{sur}$ detected by the temperature detection circuit 313 and, in accordance with the surrounding temperature $T_{sur}$, adjusts the level of the control signal output to the semiconductor element through which current flows during the first period.

Temperature Dependency of a Semiconductor Element

Figure 10A:
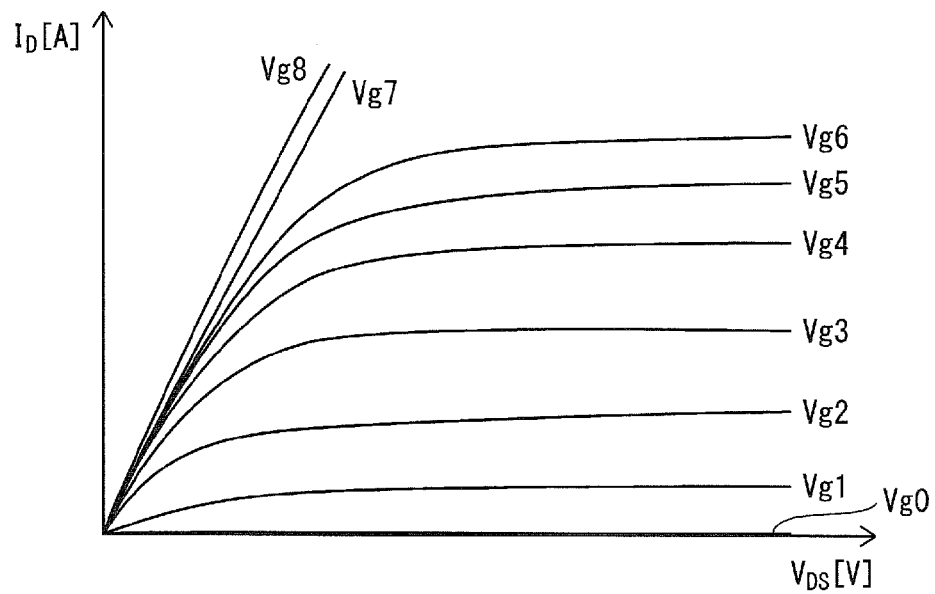
FIGS. 10A and 10B illustrate the temperature dependency of a semiconductor element.
Figure 10B:
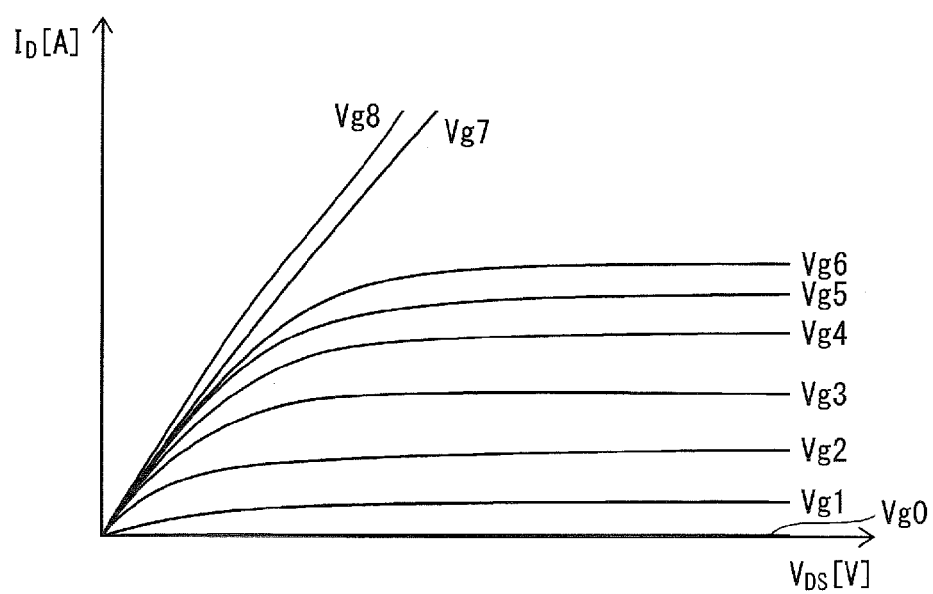

FIGS. 10A and 10B illustrate the temperature dependency of a semiconductor element. FIG. 10A schematically illustrates the I-V characteristics of a semiconductor element at a low temperature, and FIG. 10B schematically illustrates the I-V characteristics of a semiconductor element at a high temperature. In both figures, the horizontal axis represents the drain-source voltage V ($V_{DS}$) of the semiconductor element, and the vertical axis represents the forward current A ($I_D$).

Focusing on when control signals Vg1 through Vg6 are input in FIGS. 10A and 10B, it is clear that for a control signal of the same level, it is more difficult for forward current to flow when the semiconductor element is at a high temperature than at a low temperature. The maximum current is also smaller. As described above, it is desirable that the length of the first period (the precharging period) be approximately constant. For an input control signal Vg of the same level, the maximum current would be less if the semiconductor element were at a high temperature, thus requiring a longer precharging time than if the semiconductor element were at a low temperature. As a result, additional time would need to be set aside for the first period. An effective way to prevent this problem and keep the first period approximately constant is to perform temperature compensation by inputting a higher-level control signal when the semiconductor element is at a high temperature than at a low temperature.

Note that in the case of control signals Vg7 and Vg8, the forward current $I_D$ rises more slowly with respect to the $V_{DS}$ when the semiconductor element is at a high temperature than at a low temperature. This demonstrates that the loss is greater in a semiconductor element at a high temperature. Furthermore, in the case of the control signal Vg0, no change occurs when the semiconductor element is at either a high temperature or a low temperature.

Table Stored in Memory of the Controller 305

Figures 11A, 11B:
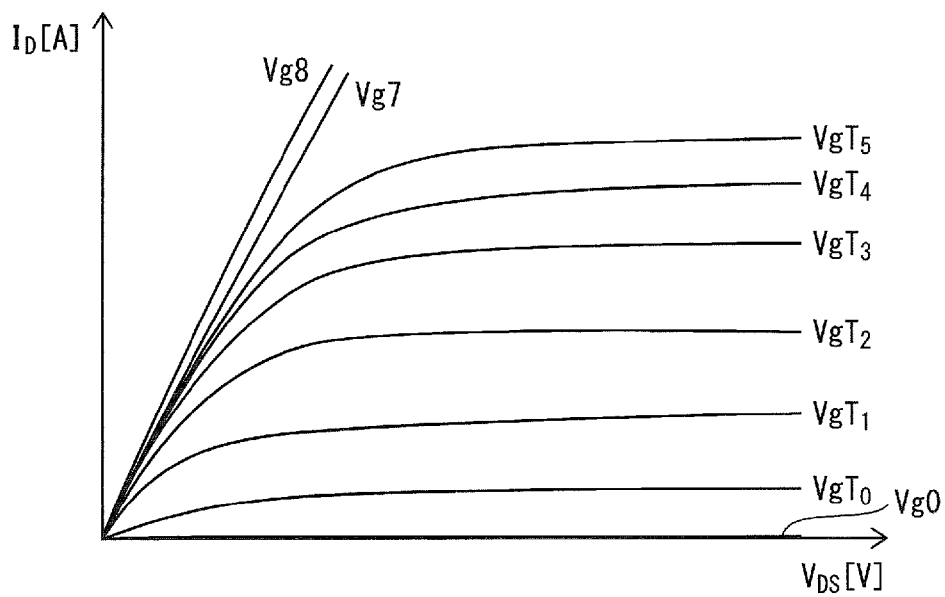
FIG. 11A illustrates a table $t_3$ stored in a memory of a controller 305, and FIG. 11B schematically illustrates the I-V characteristics of a semiconductor element.

FIG. 11A illustrates a table $t_3$ stored in a memory of the controller 305. The table $t_3$ lists temperature ranges for the surrounding temperature $T_{sur}$ in ° C., detected by the temperature detection circuit 313, and levels of the control command signal Dg output by the microcomputer (FIG. 2). In the table $t_3$, the temperature increases in the order T1<T2<T3<T4<T5. Accordingly, the surrounding temperature $T_{sur}$ increases further down the table $t_3$. The level of the control signal Vg corresponding to the level of the control command signal Dg in the table $t_3$ is indicated in parentheses, but this is simply for the sake of convenience in the present explanation. The level of the control signal Vg is not actually stored in the memory of the controller 305. The same is true for the tables in other embodiments below.

FIG. 11B illustrates the relationship between the control signals Vg0, $VgT_0$ through $VgT_5$, and Vg7 through Vg8 in FIG. 11A, and the maximum current when these control signals are input. In the case of the control signal Vg0, the value of the $I_D$ is always 0 A, no matter what value the $V_{DS}$ is, as in Embodiment 1 (FIG. 3).

Accordingly, the maximum current is 0 A. In the case of the control signals $VgT_0$ through $VgT_5$, $I_D$ rises as $V_{DS}$ rises. However, $I_D$ has a maximum current. As shown in FIG. 11B, the maximum current of $I_D$ increases in the order $VgT_0$<$VgT_1$< . . . <$VgT_4$<$VgT_5$. Like Embodiment 1 (FIG. 3), in the case of control signals Vg7 and Vg8, as $V_{DS}$ rises $I_D$ also rises, reaching no maximum value until saturation due to a heat limitation or the like.

In accordance with the table $t_3$, the controller 305 adjusts the control signal $VgT_0$ through $VgT_5$ that is output depending on the temperature range to which the surrounding temperature $T_{sur}$ belongs. Specifically, the controller 305 adjusts the control signal output to each semiconductor element so that as the temperature range to which the surrounding temperature $T_{sur}$ belongs is higher, the maximum current of the semiconductor element increases. For example, when the surrounding temperature $T_{sur}$ is in a relatively low temperature range, the controller 305 selects the control signal $VgT_1$, which sets the maximum current relatively low. On the other hand, when the surrounding temperature $T_{sur}$ is in a relatively high temperature range, the controller 305 selects the control signal $VgT_4$, which sets the maximum current relatively high.

Next, the sequence of operations by the controller 305 is described with reference to FIG. 12.

Flowchart of Operations by the Controller 305

Figure 12:
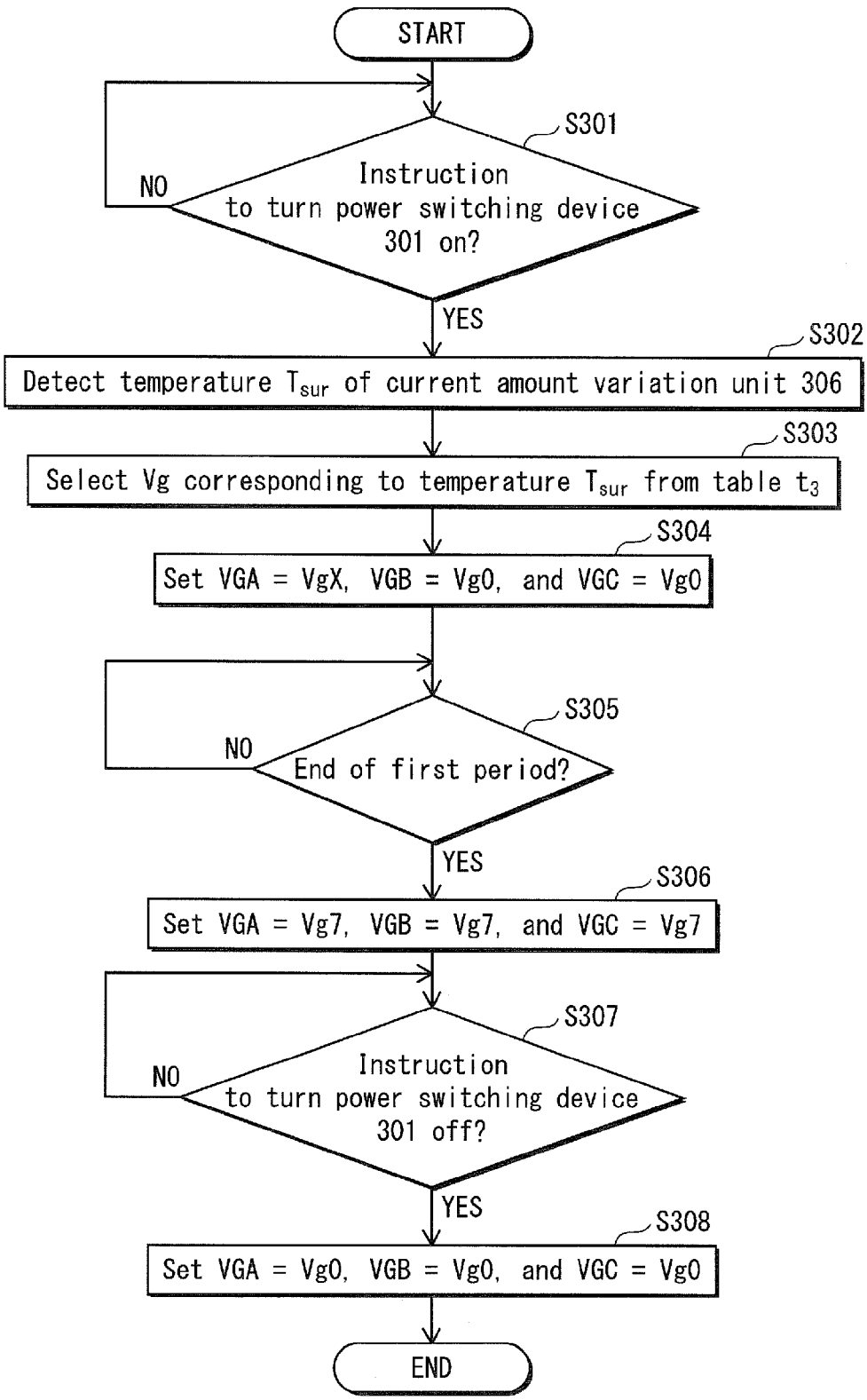
FIG. 12 is a flowchart of operations by the controller 305 according to Embodiment 3.

FIG. 12 is a flowchart of operations by the controller 305 of the present embodiment.

Steps S301 and S302 correspond to steps S201a and S202a of the modification to Embodiment 2 (FIG. 8). After acquiring information on the surrounding temperature $T_{sur}$ detected by the temperature detection circuit 313 (step S302), the controller 305 selects, from the table $t_3$ (FIG. 11A), the control signal Vg (control command signal Dg) corresponding to the temperature range to which the surrounding temperature $T_{sur}$ belongs (step S303). The controller 305 outputs VgX as VGA, Vg0 as VGB, and Vg0 as VGC (step S304). VgX in FIG. 12 represents the control signal Vg, among control signals $VgT_0$ through $VgT_5$, corresponding to the control command signal Dg selected from the table $t_3$ in step S303. Steps S305 through S308 correspond to steps S205 through S208 of Embodiment 2 (FIG. 6).

Example of Timing Chart

Figures 13A, 13B:
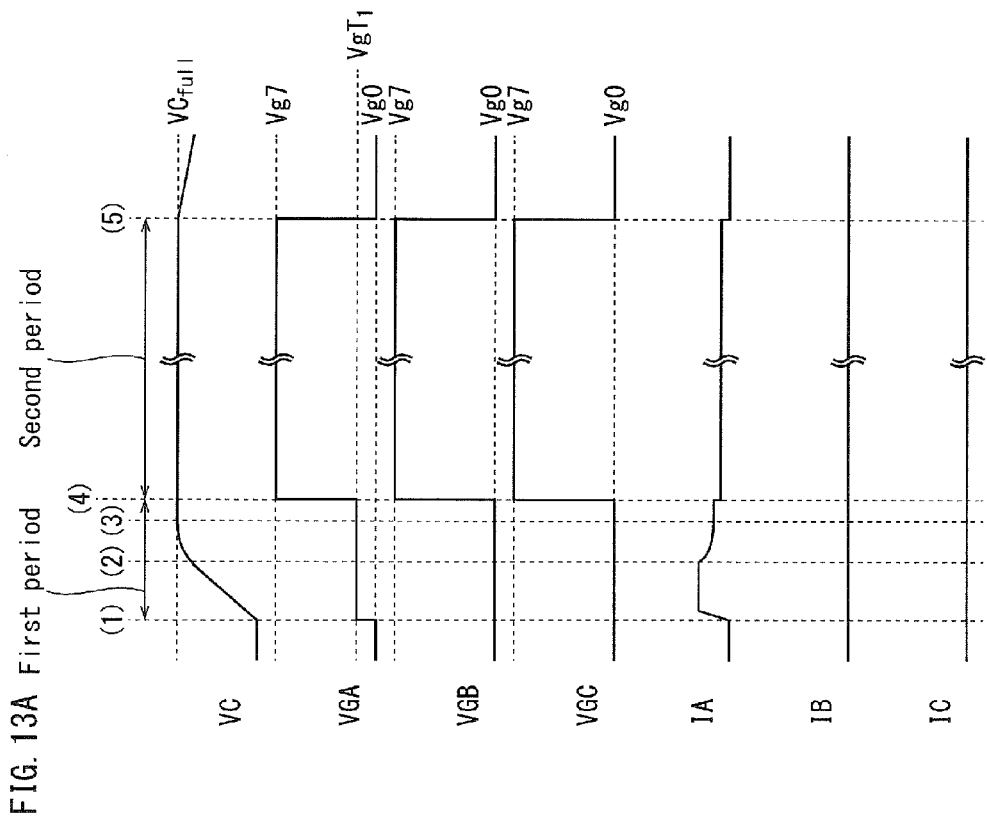
FIGS. 13A and 13B illustrate an example of a timing chart according to Embodiment 3.

FIGS. 13A and 13B illustrate an example of a timing chart in the present embodiment. In order from the top, FIGS. 13A and 13B illustrate variation of the voltage VC of the smoothing capacitor 102, the waveform of the control signal VGA, the waveform of the control signal VGB, the waveform of the control signal VGC, the waveform of the forward current IA flowing through the semiconductor element 307A, the waveform of the forward current IB flowing through the semiconductor element 307B, and the waveform of the forward current IC flowing through the semiconductor element 307C. Furthermore, time (1) through time (5) in FIGS. 13A and 13B correspond to time (1) through time (5) in the timing chart of FIG. 4 (Embodiment 1).

FIG. 13A is a timing chart for when the surrounding temperature $T_{sur}$ is in a relatively low temperature range. Specifically, the surrounding temperature $T_{sur}$ in step S303 corresponds to $T1 \leq T_{sur} < T2$ in the table $t_3$. In this case, $VgT_1$ is output as VgX in step S304. FIG. 13B is a timing chart for when the surrounding temperature $T_{sur}$ is in a relatively high temperature range. Specifically, the surrounding temperature $T_{sur}$ in step S303 corresponds to $T4 \leq T_{sur} < T5$ in the table $t_3$. In this case, $VgT_4$ is output as VgX in step S304. As shown in FIGS. 13A and 13B, when the semiconductor element is at a high temperature (FIG. 13B), the level of the control signal Vg is set higher than when the semiconductor element is at a low temperature (FIG. 13A), and the amount of the forward current IA flowing through the semiconductor element 307A is greater (time (1) through time (2)).

As described above, the structure of the present embodiment allows for appropriate temperature compensation to adjust for the above variation in the maximum current caused by temperature variations in the semiconductor elements. This allows for the time required for precharging to be kept approximately constant regardless of variations in the temperature of the semiconductor elements due to operation of the power switching device.

Embodiment 4

The amount of current flowing into a smoothing capacitor depends on the difference between the voltage of the DC power supply and the voltage of the smoothing capacitor. Therefore, the capacitance of the smoothing capacitor is determined in accordance with power system specifications and is selected so as not to vary greatly during normal operation of the power system. Accordingly, in a power system in which the electric potential of the smoothing capacitor does not vary greatly, the voltage of the DC power supply has a large effect on the amount of current flowing into the smoothing capacitor.

When a lead-acid battery, a nickel-metal-hydride battery, a lithium-ion battery, a capacitor, a fuel battery or the like is used as the DC power supply BA, the power supply voltage of the DC power supply BA varies greatly during operation of the power switching device. For example, in the case of a power switching device loaded in an electric-powered vehicle that uses a lead-acid battery as a DC power supply, the rated voltage is 240 V, yet the power supply voltage at which operation of the power switching device is possible is 180 V to 320 V.

The structure described in the present embodiment maintains the length of the first period approximately constant in a power system in which the electric potential of the smoothing capacitor does not vary greatly, but the electric potential of the DC power supply varies.

Structure

FIG. 14 illustrates the overall configuration of a power system 400 provided with a power switching device according to Embodiment 4. In addition to the structure of the power switching device 101 (see Embodiment 1 and FIG. 1), a power switching device 401 is provided with a power supply voltage detection circuit 414. In FIG. 14, structural components that are the same as in Embodiment 1 are provided with the same reference signs.

A current amount variation unit 406 includes semiconductor elements 407A, 407B, and 407C having a similar structure as in Embodiment 1.

The power supply voltage detection circuit 414 detects the voltage VB in volts of the DC power supply BA.

A controller 405 outputs control signals VGA, VGB, and VGC respectively to the semiconductor elements 407A, 407B, and 407C. The controller 405 also acquires information on the voltage VB detected by the power supply voltage detection circuit 414 and, in accordance with the detected voltage VB, adjusts the level of the control signal output to the semiconductor element through which current flows during the first period.

Table Stored in Memory of the Controller 405

FIG. 15 illustrates a table $t_4$ stored in a memory of the controller 405. The table $t_4$ lists voltage ranges for the voltage VB in volts, detected by the power supply voltage detection circuit 414, and levels of the control command signal Dg output by the microcomputer (FIG. 2). In the table $t_4$, the level of the control signal Vg that corresponds to the level of the control command signal Dg is indicated in parentheses.

As described above, when the electric circuit connecting the DC power supply BA and the smoothing capacitor 102 is placed in the closed state, the smoothing capacitor 102 must first be charged to the voltage VB of the DC power supply BA. As the voltage VB increases, a greater current must be supplied to precharge the smoothing capacitor 102. This means that the time required for completely precharging the smoothing capacitor 102 lengthens. Therefore, the controller 405 of the present embodiment adjusts the control signal output to each semiconductor element in accordance with the table $t_4$ so that as the voltage VB is in a higher voltage range, the maximum current of the semiconductor element increases.

Next, the sequence of operations by the controller 405 is described with reference to FIG. 16.

Flowchart of Operations by the Controller 405

Figure 16:
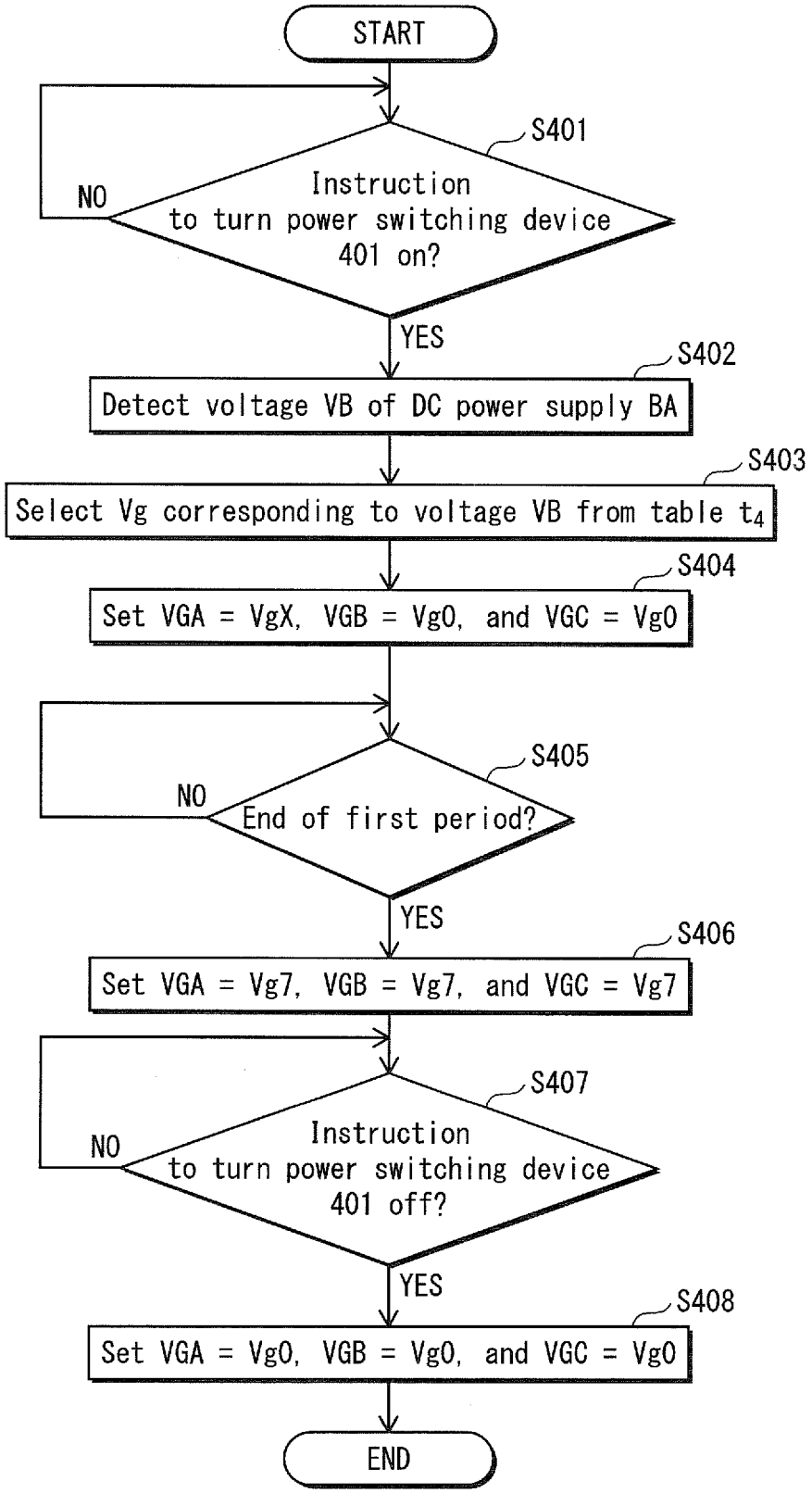
FIG. 16 is a flowchart of operations by the controller 405 according to Embodiment 4.

FIG. 16 is a flowchart of operations by the controller 405 of the present embodiment.

Step S401 corresponds to step S201 of Embodiment 2 (FIG. 6). After acquiring information on the voltage VB detected by the power supply voltage detection circuit 414 (step S402), the controller 405 selects, from the table $t_4$, the control signal Vg (control command signal Dg) corresponding to the voltage range to which the voltage VB belongs (step S403). Next, the controller 405 outputs VgX as VGA, Vg0 as VGB, and Vg0 as VGC (step S404). VgX represents the control signal Vg, among control signals Vg1 through Vg6, corresponding to the control command signal Dg selected from the table $t_4$ in step S403. Steps S405 through S408 correspond to steps S205 through S208 of Embodiment 2 (FIG. 6).

As described above, even if the voltage of the DC power supply varies, the structure of the present embodiment allows for the time required for precharging to be kept approximately constant by appropriately adjusting the level of the control signal.

Embodiment 5

In Embodiment 4, a structure was described for keeping the length of the first period approximately constant in a power system in which the electric potential of the smoothing capacitor does not vary greatly yet the electric potential of the DC power supply varies. In the present embodiment, a structure is described for a power system in which, contrary to Embodiment 4, the electric potential of the smoothing capacitor varies, whereas the electric potential of the DC power supply does not vary greatly.

Structure

Figure 17:
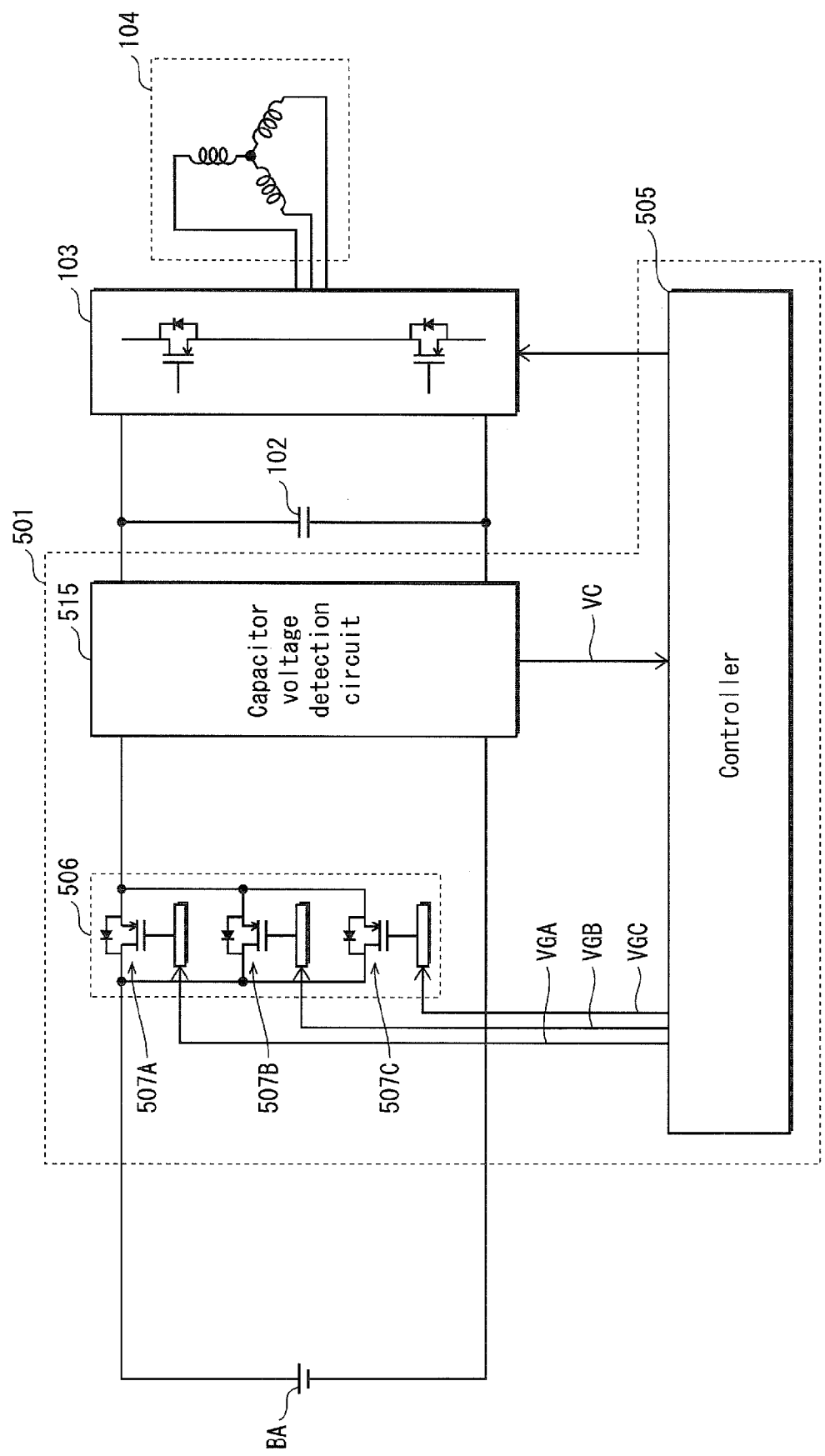
FIG. 17 illustrates the overall configuration of a power system 500 provided with a power switching device 501 according to Embodiment 5.

FIG. 17 illustrates the overall configuration of a power system 500 provided with a power switching device according to Embodiment 5. In addition to the structure of the power switching device 101 (see Embodiment 1 and FIG. 1), a power switching device 501 is provided with a capacitor voltage detection circuit 515. In FIG. 17, structural components that are the same as in Embodiment 1 are provided with the same reference signs.

A current amount variation unit 506 includes semiconductor elements 507A, 507B, and 507C having a similar structure as in Embodiment 1.

The capacitor voltage detection circuit 515 detects the voltage VC in volts of the smoothing capacitor 102.

A controller 505 outputs control signals VGA, VGB, and VGC respectively to the semiconductor elements 507A, 507B, and 507C. The controller 505 also acquires information on the voltage VC detected by the capacitor voltage detection circuit 515 and, in accordance with the detected voltage VC, adjusts the level of the control signal output to the semiconductor element through which current flows during the first period.

Table Stored in Memory of the Controller 505

FIG. 18 illustrates a table $t_5$ stored in a memory of the controller 505. The table $t_5$ lists voltage ranges for the voltage VC in volts, detected by the capacitor voltage detection circuit 515, and levels of the control command signal Dg output by the microcomputer (FIG. 2). In the table $t_5$, the level of the control signal Vg that corresponds to the level of the control command signal Dg is indicated in parentheses.

As the value of the voltage VC decreases, the charge amount of the smoothing capacitor 102 is lower, and the time required to completely precharge the smoothing capacitor 102 increases. Therefore, the controller 505 of the present embodiment adjusts the control signal output to each semiconductor element in accordance with the table $t_5$ so that as the voltage VC is in a lower voltage range, the maximum current of the semiconductor element increases.

Flowchart of Operations by the Controller 505

The sequence of operations by the controller 505 is the same as in the flowchart shown in FIG. 16, with the exception of steps S402 through S404. In the step corresponding to step S402, the controller 505 acquires information on the voltage VC detected by the capacitor voltage detection circuit 515. In the step corresponding to step S403, the controller 505 selects, from the table $t_5$, the control signal Vg (control command signal Dg) corresponding to the voltage range to which the voltage VC belongs. In the step corresponding to step S404, the controller 505 outputs VgX as VGA, Vg0 as VGB, and Vg0 as VGC. VgX represents the control signal Vg, among control signals Vg1 through Vg6, corresponding to the control command signal Dg selected from the table $t_5$ in the step corresponding to step S403.

As described above, even if the voltage of the smoothing capacitor varies greatly, the structure of the present embodiment allows for the time required for precharging to be kept approximately constant by appropriately adjusting the level of the control signal.

Embodiment 6

In the present embodiment, a structure is described for keeping the length of the first period approximately constant in a power system in which the electric potential of both the smoothing capacitor and the DC power supply varies.

Structure

Figure 19:
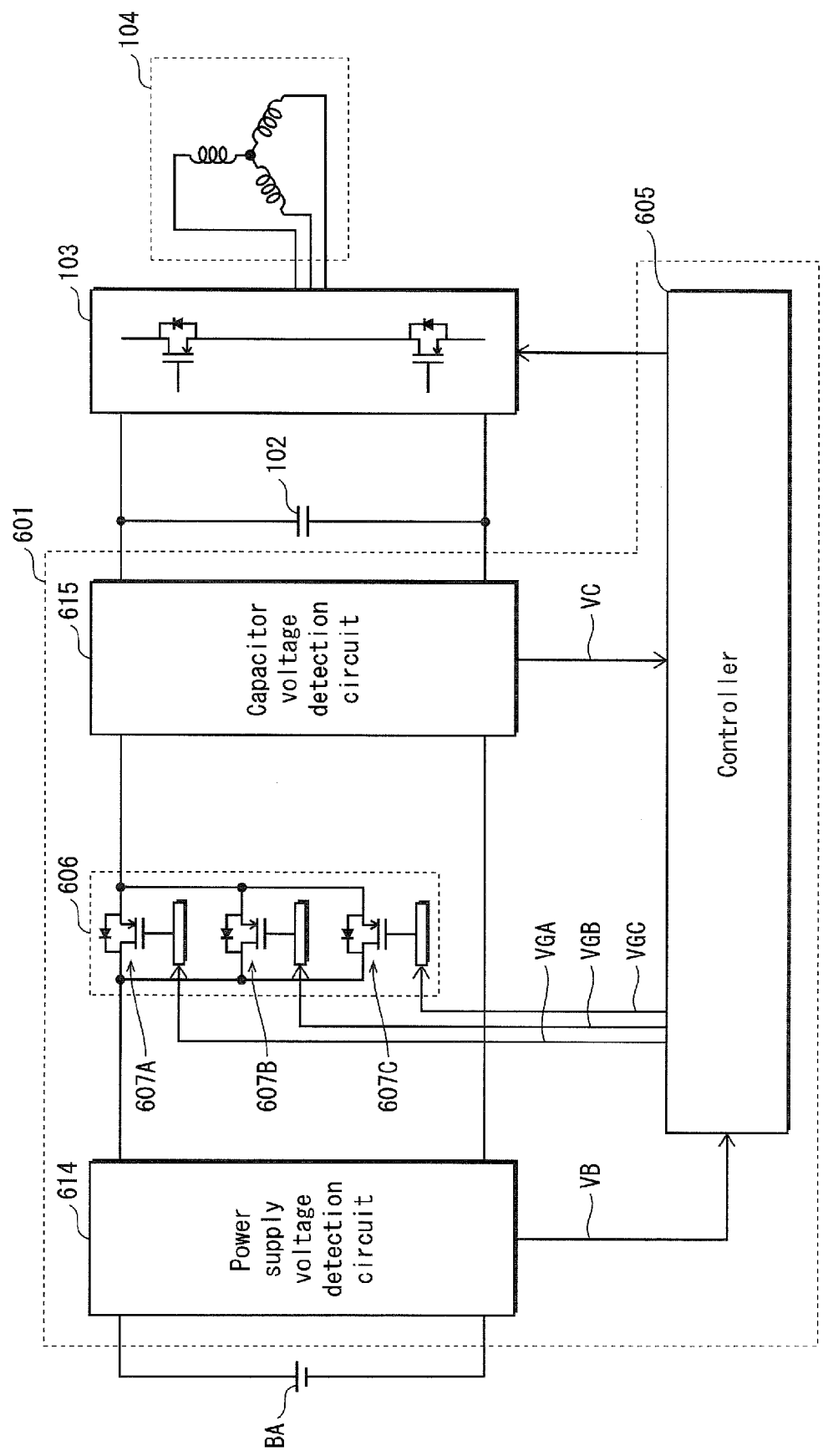
FIG. 19 illustrates the overall configuration of a power system 600 provided with a power switching device 601 according to Embodiment 6.

FIG. 19 illustrates the overall configuration of a power system 600 provided with a power switching device according to Embodiment 6. In addition to the structure of the power switching device 101 (see Embodiment 1 and FIG. 1), a power switching device 601 is provided with a power supply voltage detection circuit 614 that corresponds to the power supply voltage detection circuit 414 of Embodiment 4 (FIG. 14) and with a capacitor voltage detection circuit 615 that corresponds to the capacitor voltage detection circuit 515 of Embodiment 5 (FIG. 17). In FIG. 19, structural components that are the same as in Embodiment 1 are provided with the same reference signs.

A current amount variation unit 606 includes semiconductor elements 607A, 607B, and 607C having a similar structure as in Embodiment 1.

The power supply voltage detection circuit 614 detects the voltage VB in volts of the DC power supply BA.

The capacitor voltage detection circuit 515 detects the voltage VC in volts of the smoothing capacitor 102.

A controller 605 outputs control signals VGA, VGB, and VGC respectively to the semiconductor elements 607A, 607B, and 607C. The controller 605 also acquires information on the voltage VC detected by the capacitor voltage detection circuit 615 and on the voltage VB detected by the power supply voltage detection circuit 614. In accordance with the difference Dif between the detected voltages VB and VC, the controller 605 adjusts the level of the control signal output to the semiconductor element through which current flows during the first period.

Table Stored in Memory of the Controller 605

FIG. 20 illustrates a table $t_6$ stored in a memory of the controller 605. The table $t_6$ lists ranges for the difference Dif between the voltages VB and VC and levels of the control command signal Dg output by the microcomputer (FIG. 2). In the table $t_6$, the level of the control signal Vg that corresponds to the level of the control command signal Dg is indicated in parentheses. In the table $t_6$, the values increase in the order Dif1<Dif2<Dif3<Dif4<Dif5. Accordingly, the difference Dif between the voltage VB and the voltage VC increases further down the table $t_6$.

As the value of the difference Dif increases, the charge amount of the smoothing capacitor 102 is lower, and the time required to completely precharge the smoothing capacitor 102 increases. Therefore, the controller 605 of the present embodiment adjusts the control signal output to each semiconductor element in accordance with the table $t_6$ so that as the difference Dif is in a larger range, the maximum current of the semiconductor element increases.

Flowchart of Operations by the Controller 605

The sequence of operations by the controller 605 is the same as in the flowchart shown in FIG. 16, with the exception of steps S402 through S404. In the step corresponding to step S402, the controller 605 acquires information on the voltage VB detected by the power supply voltage detection circuit 614 and on the voltage VC detected by the capacitor voltage detection circuit 615. In the step corresponding to step S403, the controller 605 selects, from the table $t_6$, the control signal Vg (control command signal Dg) corresponding to the range to which the difference Dif between the voltage VB and the voltage VC belongs. In the step corresponding to step S404, the controller 605 outputs VgX as VGA, Vg0 as VGB, and Vg0 as VGC. VgX represents the control signal Vg, among control signals Vg1 through Vg6, corresponding to the control command signal Dg selected from the table $t_6$ in the step corresponding to step S403.

As described above, even if the voltage of both the power supply and the smoothing capacitor varies greatly, the structure of the present embodiment allows for the time required for precharging to be kept approximately constant by appropriately adjusting the level of the control signal.

Embodiment 7

In the present embodiment, an example of combining Embodiment 2 with Embodiment 4 is described. In other words, a structure is described to switch the semiconductor element through which current flows during the first period so as to disperse the burden on the semiconductor elements, while maintaining the length of the first period approximately constant even if the electric potential of the DC power supply varies.

Structure

Figure 21:
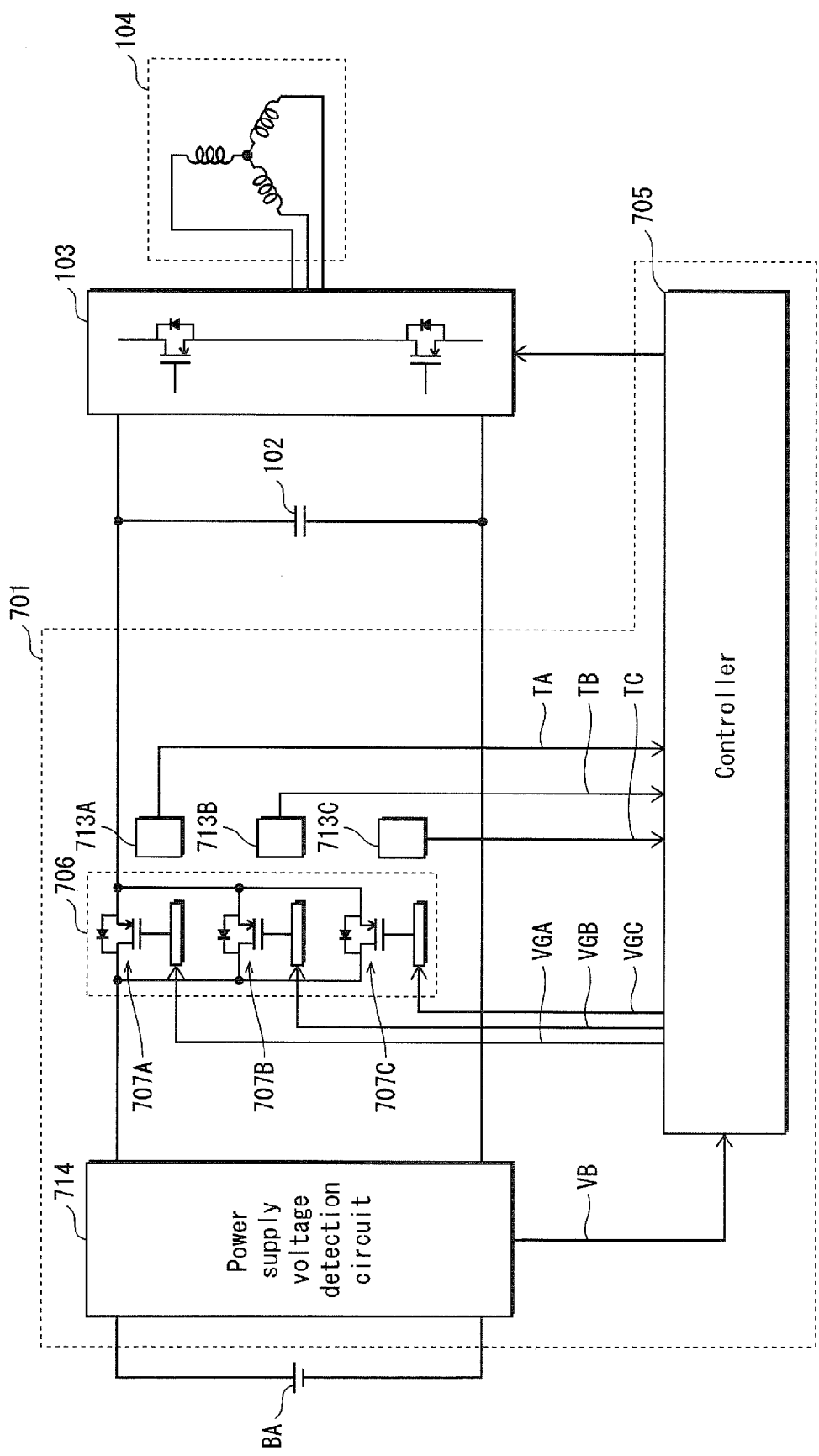
FIG. 21 illustrates the overall configuration of a power system 700 provided with a power switching device 701 according to Embodiment 7.

FIG. 21 illustrates the overall configuration of a power system 700 provided with a power switching device according to Embodiment 7. In addition to the structure of the power switching device 101 (see Embodiment 1 and FIG. 1), a power switching device 701 is provided with temperature detection circuits 713A, 713B, and 713C corresponding to the temperature detection circuits 213A, 213B, and 213C of Embodiment 2 (FIG. 5), and with a power supply voltage detection circuit 714 corresponding to the power supply voltage detection circuit 414 of Embodiment 4 (FIG. 14).

A current amount variation unit 706 includes semiconductor elements 707A, 707B, and 707C having a similar structure as in Embodiment 1.

The temperature detection circuits 713A, 713B, and 713C respectively detect the temperature TA in ° C. of the semiconductor element 707A, the temperature TB in ° C. of the semiconductor element 707B, and the temperature TC in ° C. of the semiconductor element 707C.

The power supply voltage detection circuit 714 detects the voltage VB of the DC power supply BA.

A controller 705 outputs control signals VGA, VGB, and VGC respectively to the semiconductor elements 707A, 707B, and 707C. The controller 705 also acquires information on the temperatures TA, TB, and TC detected by the temperature detection circuits 713A, 713B, and 713C, and based on this information, selects the semiconductor element through which current flows during the first period in order from the semiconductor element with the lowest temperature. The controller 705 also acquires information on the voltage VB detected by the power supply voltage detection circuit 714 and, in accordance with the voltage VB, adjusts the level of the control signal output to the semiconductor element through which current flows during the first period. A table similar to the table $t_4$ in Embodiment 4 (FIG. 15) is stored in a memory of the controller 705.

Flowchart of Operations by the Controller 705

Figure 22:
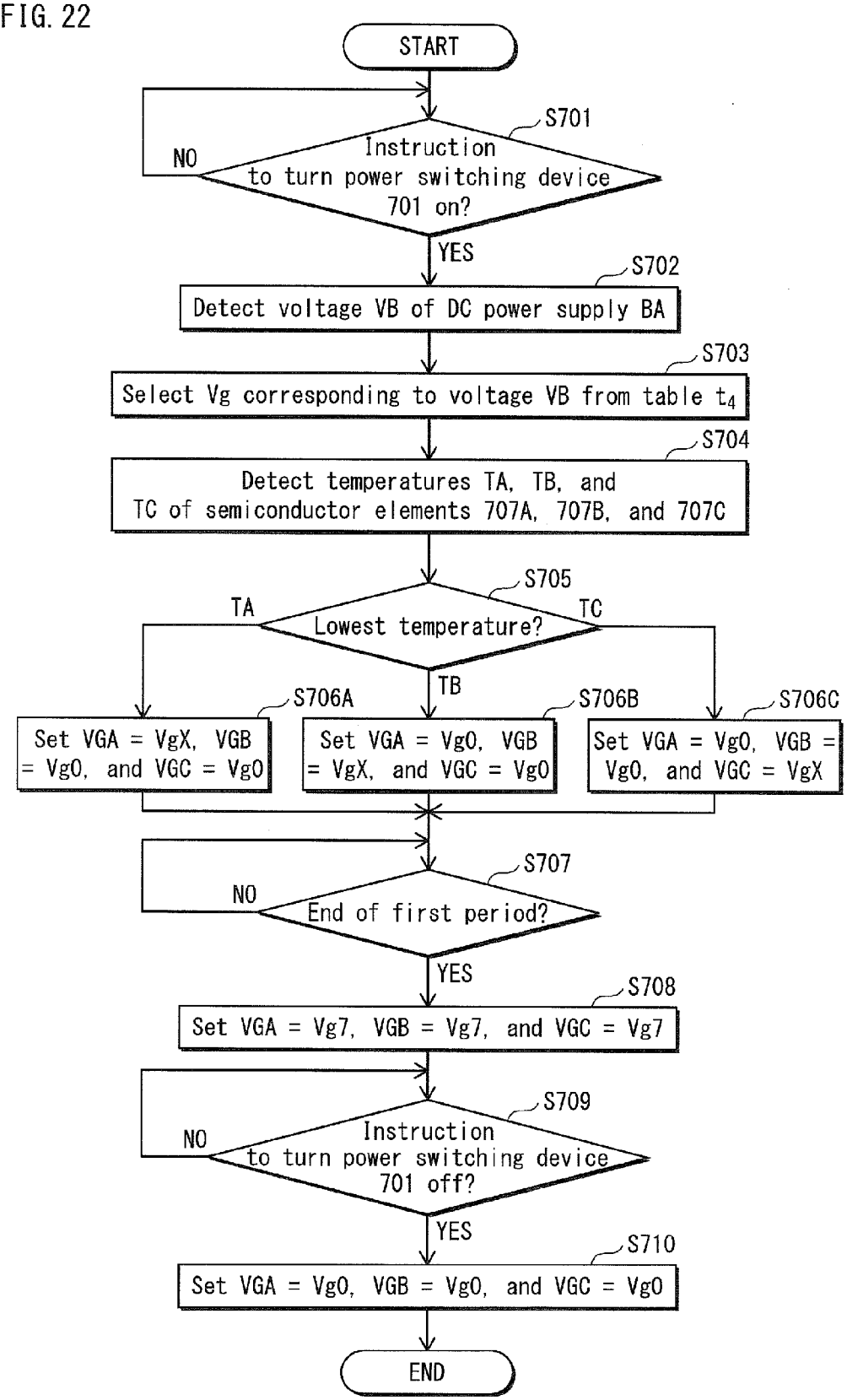
FIG. 22 is a flowchart of operations by the controller 705 according to Embodiment 7.

FIG. 22 is a flowchart of operations by the controller 705 of the present embodiment. Steps S701 through S703 correspond to steps S401 through S403 of Embodiment 4 (FIG. 16). Steps S704 and S705 correspond to steps S202 and S203.

Next, when determining that the temperature TA is the lowest (step S705: TA), the controller 705 outputs VgX as VGA, Vg0 as VGB, and Vg0 as VGC (step S706A). VgX represents the control signal Vg, among control signals Vg1 through Vg6, corresponding to the control command signal Dg selected from the table $t_4$ in step S703. When determining that the temperature TB is the lowest (step S705: TB), the controller 705 outputs Vg0 as VGA, VgX as VGB, and Vg0 as VGC (step S706B). When determining that the temperature TC is the lowest (step S705: TC), the controller 705 outputs Vg0 as VGA, Vg0 as VGB, and VgX as VGC (step S706C).

Steps S707 through S710 correspond to steps S205 through S208 of Embodiment 2 (FIG. 6).

Example of Timing Chart

Figure 23A:
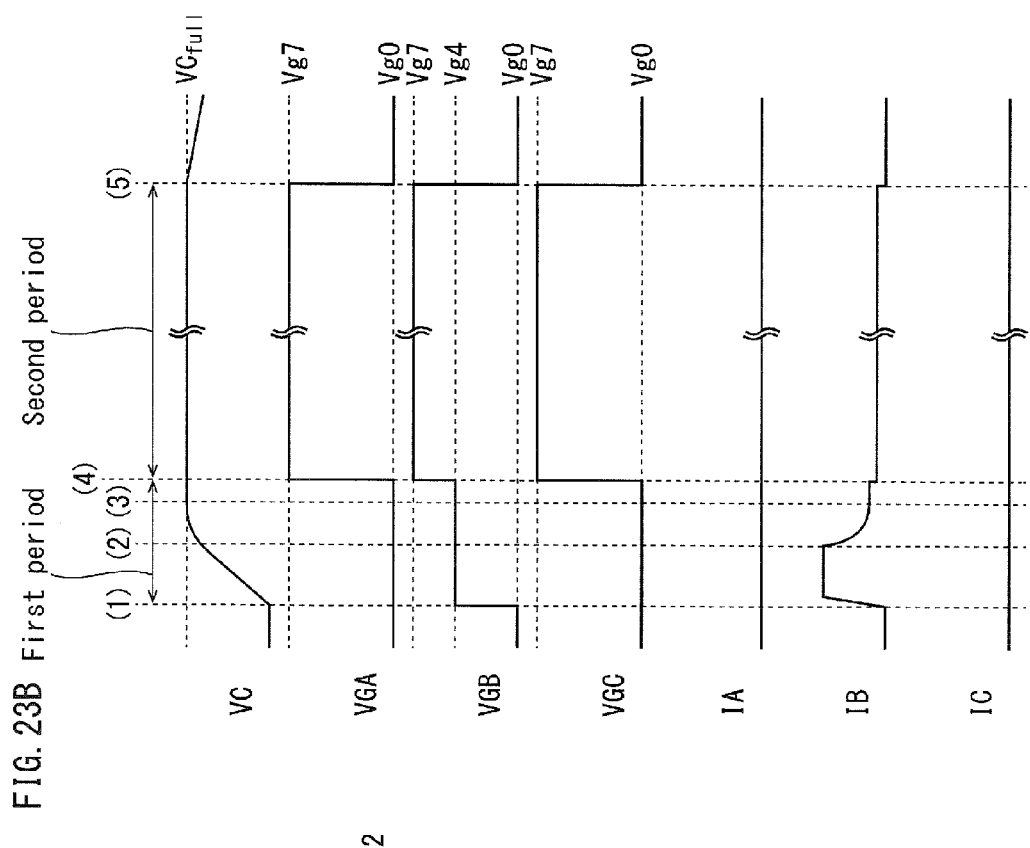
FIGS. 23A and 23B illustrate an example of a timing chart according to Embodiment 7.
Figure 23B:
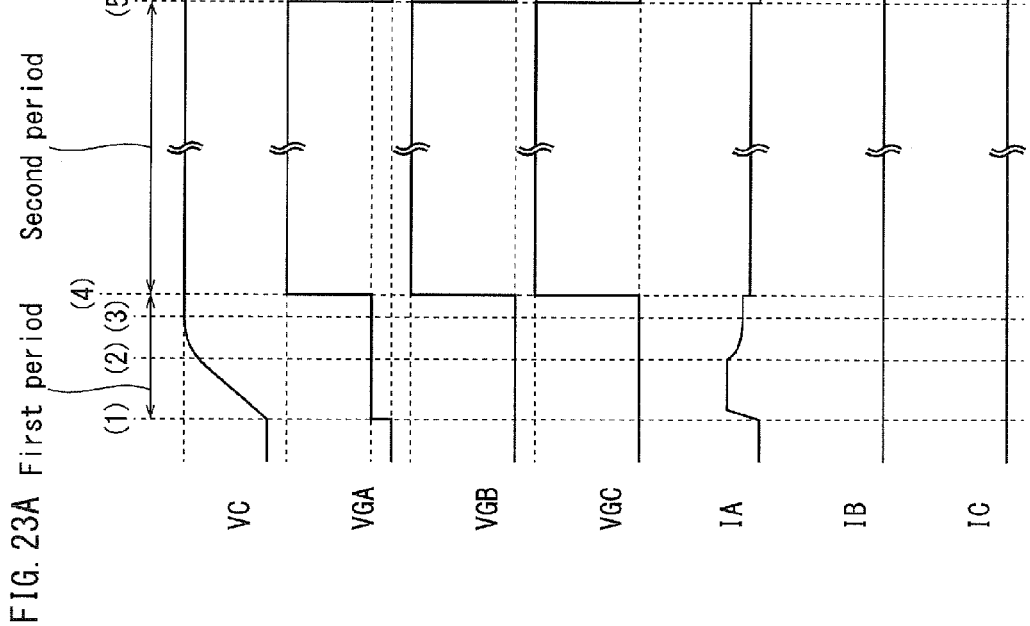

FIG. 23 illustrates an example of a timing chart in the present embodiment. In order from the top, FIGS. 23A and 23B illustrate variation of the voltage VC of the smoothing capacitor 102, the waveform of the control signal VGA, the waveform of the control signal VGB, the waveform of the control signal VGC, the waveform of the forward current IA flowing through the semiconductor element 707A, the waveform of the forward current IB flowing through the semiconductor element 707B, and the waveform of the forward current IC flowing through the semiconductor element 707C. Furthermore, time (1) through time (5) in FIGS. 23A and 23B correspond to time (1) through time (5) in the timing chart of FIG. 4 (Embodiment 1).

FIG. 23A shows the case when the control signal Vg2 is selected from the table $t_4$ in step S703, and the temperature TA is determined to be the lowest temperature in step S705. In other words, in step S706A, the controller 705 outputs Vg2 as VGA, Vg0 as VGB, and Vg0 as VGC. FIG. 23B shows the case when the control signal Vg4 is selected from the table $t_4$ in step S703, and the temperature TB is determined to be the lowest temperature in step S705. In other words, in step S706A, the controller 705 outputs Vg0 as VGA, Vg4 as VGB, and Vg0 as VGC.

As described above, the present embodiment solves the problem of variation in the precharging period due to variation in the electric potential of the DC power source. Furthermore, the present embodiment disperses the burden on the semiconductor elements, thus controlling a reduction in the service life of the semiconductor elements due to overheating.

Embodiment 8

In the present embodiment, an example of combining Embodiment 3 with Embodiment 4 is described. In other words, a structure is to maintain the length of the first period approximately constant even if the electric potential of the DC power supply varies, while also performing temperature compensation to adjust for variations in the maximum current due to temperature dependency of the semiconductor elements.

Structure

Figure 24:
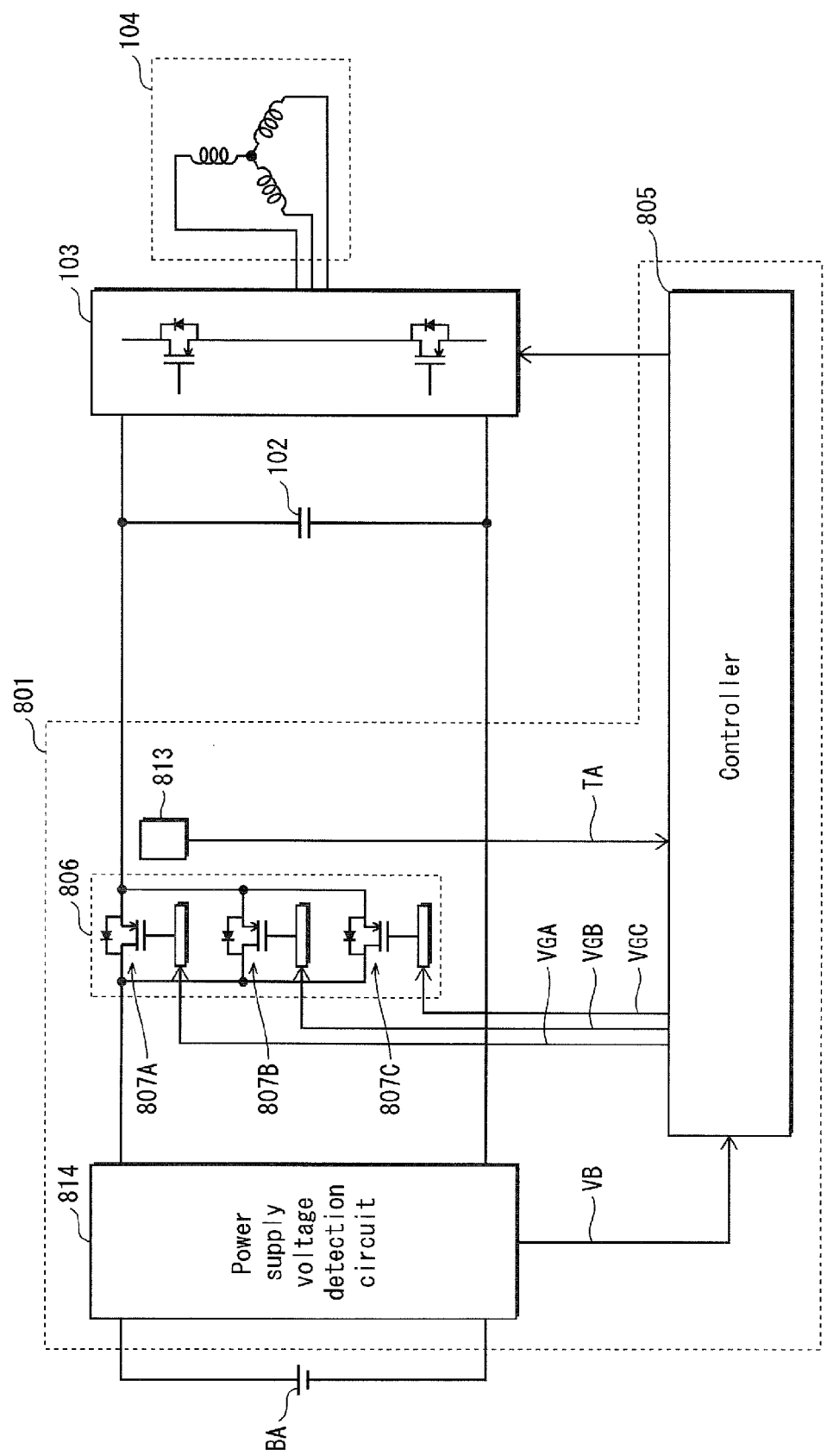
FIG. 24 illustrates the overall configuration of a power system 800 provided with a power switching device 801 according to Embodiment 8.

FIG. 24 illustrates the overall configuration of a power system 800 provided with a power switching device according to Embodiment 8. In addition to the structure of the power switching device 101 (see Embodiment 1 and FIG. 1), a power switching device 801 is provided with a temperature detection circuit 813 corresponding to the temperature detection circuit 313 of Embodiment 3 (FIG. 9), and with a power supply voltage detection circuit 814 corresponding to the power supply voltage detection circuit 414 of Embodiment 4 (FIG. 14).

A current amount variation unit 806 includes semiconductor elements 807A, 807B, and 807C having a similar structure as in Embodiment 1.

The temperature detection circuit 813 detects the temperature TA in ° C. of the semiconductor element 807A. In the present embodiment, the semiconductor element through which current is caused to flow during the first period is only the semiconductor element 807A. Therefore, the temperature detection circuit 813 only detects the temperature of the semiconductor element 807A.

The power supply voltage detection circuit 814 detects the voltage VB in volts of the DC power supply BA.

A controller 805 outputs control signals VGA, VGB, and VGC respectively to the semiconductor elements 807A, 807B, and 807C. The controller 805 also acquires information on the temperature TA detected by the temperature detection circuit 813 and information on the voltage VB detected by the power supply voltage detection circuit 814. Furthermore, in accordance with the temperature TA and the voltage VB, and based on a table stored in memory, the controller 805 adjusts the level of the control signal output to the semiconductor element 807A during the first period.

Table Stored in Memory of the Controller 805

FIG. 25 illustrates a table $t_8$ stored in a memory of the controller 805. The left-most column of the table $t_8$ shows the voltage ranges of the voltage VB, in volts, detected by the power supply voltage detection circuit 814. The uppermost row of the table $t_8$ shows the temperature ranges of the temperature TA detected by the temperature detection circuit 813. The portion to the lower right of the table $t_8$, surrounded by double lines (the portion of table $t_8$ excluding the leftmost column and the uppermost row) lists the level of the control command signal Dg output by the controller 805 as VGA, VGB, and VGC (FIG. 2A), as well as the level of the corresponding control signal Vg in parentheses.

The controller 805 selects the control signal Vg having the level indicated by the intersection of the column for the temperature range to which the temperature TA belongs and the row for the voltage range to which the voltage VB belongs. For example, if the temperature TA is at least T2 and less than T3 (T2≦TA<T3), and the voltage VB is 275 V (250-299), the controller 805 outputs Vg3-$T_2$ as VGA.

In the leftmost column of the table $t_8$, the voltage VB increases progressively towards the bottom row. In the uppermost row, the temperature TA increases progressively towards the right in the order T1<T2< . . . <T5. With regards to the level of the control signal Vg (or the control command signal Dg), when the number immediately after "Vg" (or "Dg") is the same (i.e. for signals within the same row of the table $t_8$), the level of the control signal increases as the number in subscript immediately after the "T" increases, thus indicating that the maximum current of the semiconductor element increases. When the number in subscript immediately after the "T" is the same (i.e. for signals within the same column of the table $t_8$), the level of the control signal increases as the number in subscript immediately after "Vg" (or "Dg") increases.

As described in Embodiment 4, as the voltage VB increases, the time required to completely precharge the smoothing capacitor 102 grows longer. Therefore, as in the table $t_4$ in Embodiment 4 (FIG. 15), the level of the control signal increases progressively towards the bottom of the table $t_8$. Furthermore, as described in Embodiment 3, due to the temperature dependency of a semiconductor element, the maximum current when the semiconductor element is at a high temperature is smaller than when the semiconductor element is at a low temperature for an input control signal of the same level, causing the time required for precharging to lengthen. Therefore, the level of the control signal increases progressively towards the right side of the table $t_8$. In other words, the controller 805 of the present embodiment adjusts the control signal in accordance with the table $t_8$ so that the maximum current of the semiconductor element will increase as the voltage VB is in a higher voltage range and as the temperature TA is in a higher temperature range. Flowchart of Operations by the Controller 805

Figure 26:
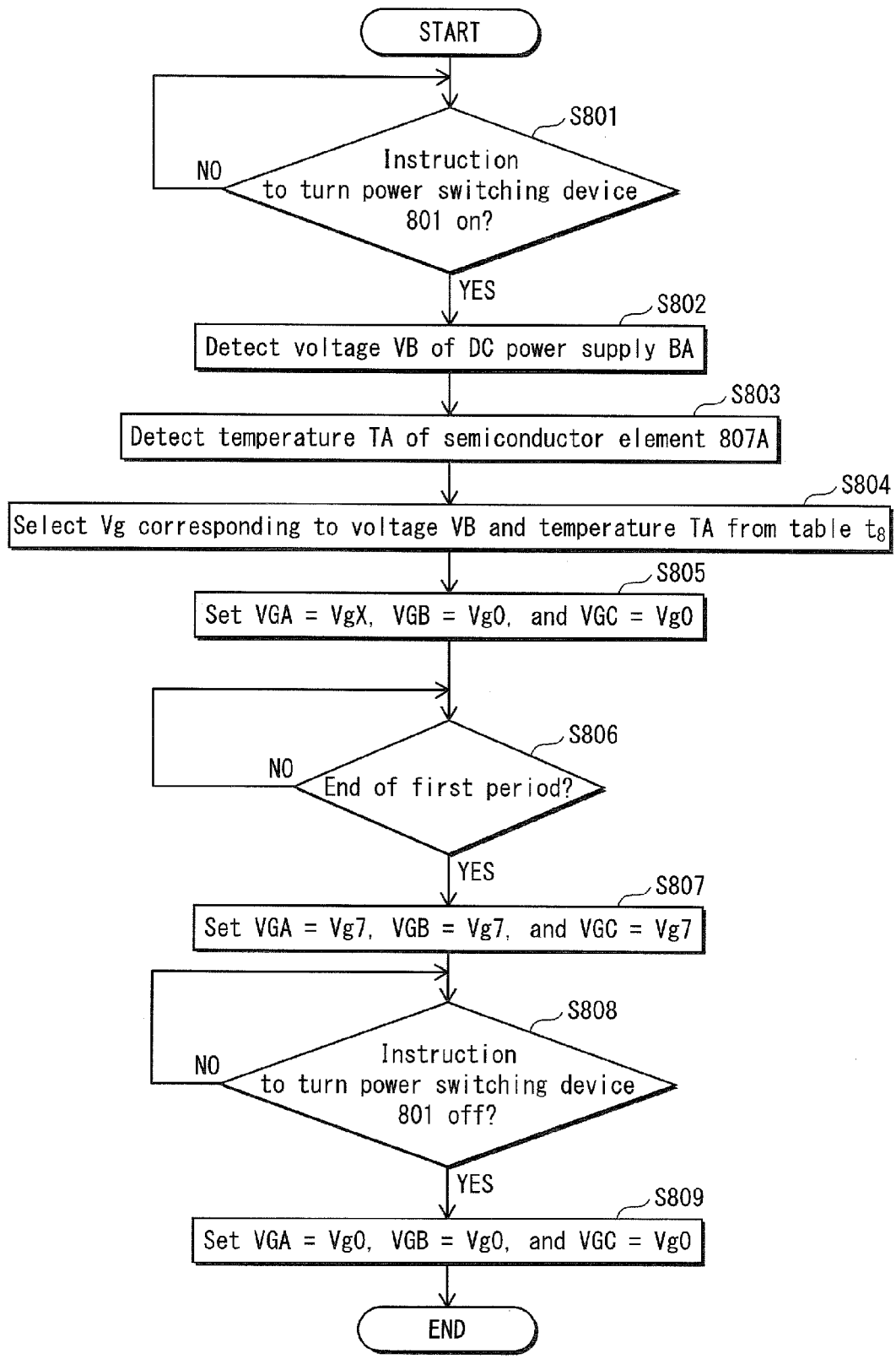
FIG. 26 is a flowchart of operations by the controller 805 according to Embodiment 8.

FIG. 26 is a flowchart of operations by the controller 805 of the present embodiment. Steps S801 and S802 correspond to steps S401 and S402 of Embodiment 4 (FIG. 16). After acquiring information on the temperature TA detected by the temperature detection circuit 813 (step S803), the controller 805 selects, from the table $t_8$, the control signal Vg (control command signal Dg) corresponding to the voltage VB and the temperature TA (step S804).

Next, the controller 805 outputs VgX as VGA, Vg0 as VGB, and Vg0 as VGC (step S805). VgX in FIG. 26 represents the control signal Vg, among the control signals in table $t_8$, corresponding to the control command signal Dg selected from the table $t_8$ in step S804. Steps S806 through S809 correspond to steps S205 through S208 of Embodiment 2 (FIG. 6).

As described above, the present embodiment solves the problem of variation in the precharging period due to variation in the electric potential of the DC power source, while also performing temperature compensation to adjust for variations in the maximum current due to temperature dependency of the semiconductor elements.

Embodiment 9

In the present embodiment, an example of combining Embodiments 2, 3, and 4 is described. Specifically, the semiconductor element through which current flows during the first period is switched so as to disperse the burden on the semiconductor elements, while maintaining the length of the first period approximately constant even if the electric potential of the DC power supply varies. In addition, temperature compensation is performed to adjust for variations in the maximum current due to temperature dependency of the semiconductor elements.

Structure

Figure 27:
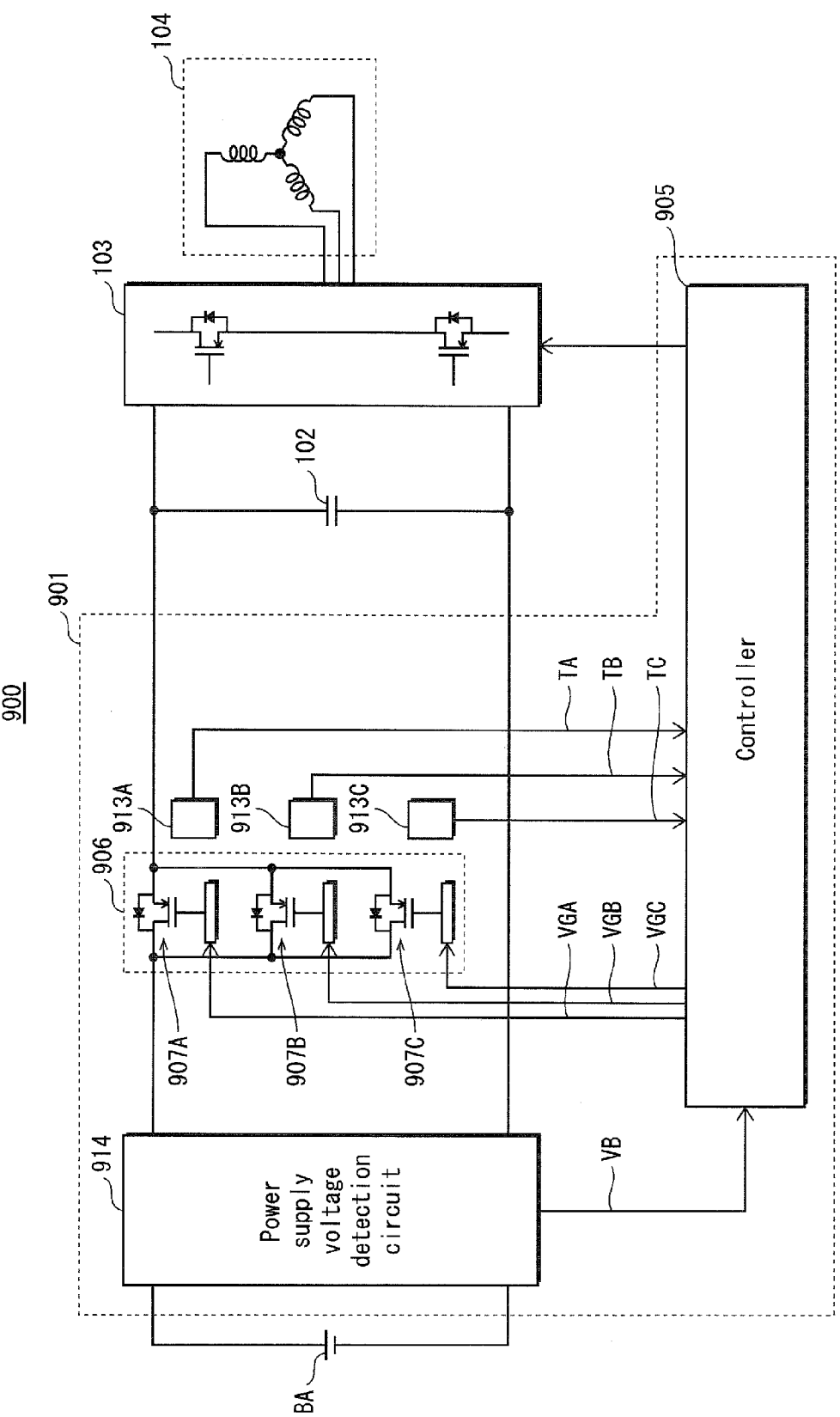
FIG. 27 illustrates the overall configuration of a power system 900 provided with a power switching device 901 according to Embodiment 9.

FIG. 27 illustrates the overall configuration of a power system 900 provided with a power switching device according to Embodiment 9. In addition to the structure of the power switching device 101 (see Embodiment 1 and FIG. 1), a power switching device 901 is provided with temperature detection circuits 913A, 913B, and 913C corresponding to the temperature detection circuits 213A, 213B, and 213C of Embodiment 2 (FIG. 5), and with a power supply voltage detection circuit 914 corresponding to the power supply voltage detection circuit 414 of Embodiment 4 (FIG. 14).

A current amount variation unit 906 includes semiconductor elements 907A, 907B, and 907C having a similar structure as in Embodiment 1.

The temperature detection circuits 913A, 913B, and 913C respectively detect the temperature TA in ° C. of the semiconductor element 907A, the temperature TB in ° C. of the semiconductor element 907B, and the temperature TC in ° C. of the semiconductor element 907C.

The power supply voltage detection circuit 914 detects the voltage VB of the DC power supply BA.

A controller 905 outputs control signals VGA, VGB, and VGC respectively to the semiconductor elements 907A, 907B, and 907C. The controller 705 acquires information on the temperatures TA, TB, and TC detected by the temperature detection circuits 713A, 713B, and 713C, and based on this information, selects the semiconductor element through which current flows during the first period in order from the semiconductor element with the lowest temperature. The controller 905 also acquires information on the voltage VB detected by the power supply voltage detection circuit 914. As in Embodiment 8, the controller 905 adjusts the level of the control signal output to the semiconductor element through which current flows during the first period based on the information on the temperatures TA, TB, and TC and on the voltage VB. Accordingly, a table similar to the table $t_8$ in Embodiment 8 (FIG. 25) is stored in a memory of the controller 905. The "TA" in table $t_8$, however, is replaced with the lowest temperature among the temperatures TA, TB, and TC.

Flowchart of Operations by the Controller 905

Figure 28:
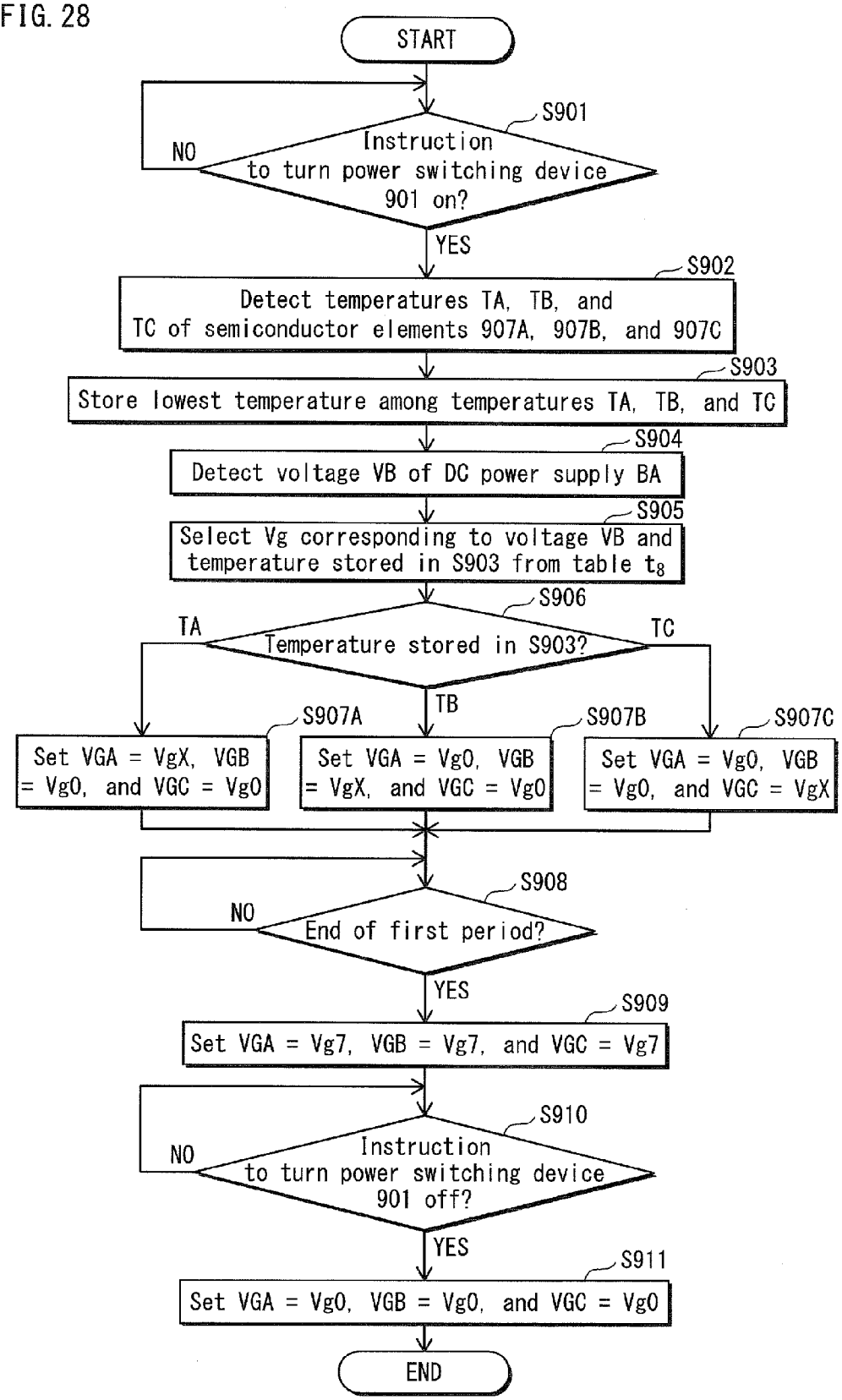
FIG. 28 is a flowchart of operations by the controller 905 according to Embodiment 9.

FIG. 28 is a flowchart of operations by the controller 905 of the present embodiment. Steps S901 and S902 correspond to steps S201 and S202 of Embodiment 2 (FIG. 6). Next, the controller 905 stores the lowest temperature among the temperatures TA, TB, and TC in the memory (step S903). Next, after acquiring information on the voltage VB detected by the power supply voltage detection circuit 914 (step S904), the controller 905 selects, from the table $t_8$, the control signal Vg (control command signal Dg) corresponding to the temperature stored in step S903 (step S905).

Next, when the temperature stored in step S903 is TA (step S906: TA), the controller 905 outputs VgX as VGA, Vg0 as VGB, and Vg0 as VGC (step S907A). VgX represents the control signal Vg corresponding to the control command signal Dg selected from the table $t_8$ in step S905. When the temperature stored in step S903 is TB (step S906: TB), the controller 905 outputs Vg0 as VGA, VgX as VGB, and Vg0 as VGC (step S907B). When the temperature stored in step S903 is TC (step S906: TC), the controller 905 outputs Vg0 as VGA, Vg0 as VGB, and VgX as VGC (step S907C).

Steps S908 through S911 correspond to steps S205 through S208 of Embodiment 2 (FIG. 6).

As described above, the present embodiment solves the problem of variation in the precharging period due to variation in the electric potential of the DC power source, while also performing temperature compensation to adjust for variations in the maximum current due to temperature dependency of the semiconductor elements. Additionally, since current flows through the semiconductor element with the lowest temperature during the first period, the present embodiment disperses the burden on the semiconductor elements, thus controlling a reduction in the service life of the semiconductor elements due to overheating.

While Embodiments 1 through 9 have been described above, the present invention is not limited to these embodiments. For example, the following modifications and the like are possible.

Modifications (1) In Embodiment 3 (FIG. 9), the overall surrounding temperature $T_{sur}$ of the semiconductor elements 307A, 307B, and 307C is detected, but alternatively the temperature of each semiconductor element may be detected individually. Detecting temperatures individually reveals the temperature of the semiconductor element through which current flows during the first period, thereby allowing for more accurate temperature compensation when adjusting the level of the control signal. The same is true for Embodiment 9 (FIG. 27) as well.

(2) In the timing chart illustrated in FIG. 4 in Embodiment 1, the semiconductor element through which current flows during the first period is fixed as the semiconductor element 107A. Alternatively, each time the power switching device operates, the semiconductor element through which current flows during the first period may alternate in order. Doing so evenly disperses the burden on the semiconductor elements, thereby controlling a reduction in the service life of the semiconductor elements.

(3) In Embodiment 8, the semiconductor element through which current flows during the first period is only 807A, and therefore the temperature of only the semiconductor element 807A is detected. The present invention, however, is not limited in this way. For example, the surrounding temperature of the semiconductor elements 807A, 807B, and 807C may be detected, and the control signals may be adjusted based on the surrounding temperature. Furthermore, each time the power switching device operates, the semiconductor element through which current flows during the first period may alternate in order. In this case, it is desirable to provide one or more circuits that individually detect the temperature of each semiconductor element.

(4) In Embodiments 1, 3, 4, 5, 6, and 8, the number of semiconductor elements through which current flows during the first period is only one, but current may flow through all three semiconductor elements (i.e. all of the semiconductor elements provided in the power switching device). In other words, the number of the semiconductor elements through which current flows during the first period may be the same as the number of semiconductor elements through which current flows during the second period. For example, during the first period, Vg3 may be output as VGA, Vg3 as VGB, and Vg3 as VGC, and during the second period, Vg7 may be output as VGA, Vg7 as VGB, and Vg7 as VGC. In this way, the control signals output to the semiconductor elements through which current flows during the first period all have the same level, as do the control signals output to the semiconductor elements through which current flows in the second period. This simplifies control by the controller.

(5) In the above embodiments, both the number of semiconductor elements through which current flows and the level of the control signals output to the semiconductor elements through which current flows differ between the first period and the second period, but the present invention is not limited in this way. For example, it is possible for only the number of semiconductor elements through which current flows to differ between the first period and the second period. Specifically, during the first period, Vg7 may be output as VGA, Vg0 as VGB, and Vg0 as VGC, and during the second period, Vg7 may be output as VGA, Vg7 as VGB, and Vg7 as VGC. Furthermore, the number of semiconductor elements in the first period and the number in the second period are not restricted, but as described in Embodiment 1, it is desirable that the number in the first period be smaller than the number in the second period.

(6) The modification to Embodiment 2 may be applied to Embodiment 7 (FIG. 21) and to Embodiment 9 (FIG. 27) as well.

(7) The modification to Embodiment 2 may be combined with Modification (3). Furthermore, the modification to Embodiment 7 described in Modification (4) may be combined with Modification (3), and the modification to Embodiment 9 described in Modification (4) may be combined with Modification (3).

(8) In Embodiment 7, Embodiments 2 and 4 are combined, but it is also possible to combine Embodiment 2 with either Embodiment 5 or Embodiment 6, which both include the same voltage detection circuit as Embodiment 4.

(9) In Embodiment 8, Embodiments 3 and 4 are combined, but it is also possible to combine Embodiment 3 with either Embodiment 5 or Embodiment 6, which both include the same voltage detection circuit as Embodiment 4.

(10) In Embodiment 9, Embodiments 2, 3, and 4 are combined, but it is also possible to combine Embodiment 2 and Embodiment 3 with either Embodiment 5 or Embodiment 6, which both include the same voltage detection circuit as Embodiment 4.

(11) The modifications listed here may be further modified. For example, the combination of Embodiments 3 and 5 in Modification (7) may be modified by the addition of Modification (1) to the structure corresponding to Embodiment 3.

(12) In the modification of Embodiment 2 (FIGS. 7 and 8), when the temperature $T_{sur}$ is equal to or greater than a threshold temperature, the controller 205*a* follows a predetermined rule to select the semiconductor element(s) through which current flows during the new first period from among the plurality of semiconductor elements excluding at least one of the semiconductor element(s) through which current flowed during the previous first period. In FIGS. 7 and 8, since the number of semiconductor elements through which current flows during the first period is one, saying that the controller 205*a* follows a "predetermined rule" to select the semiconductor element(s) means that the controller 205*a* selects, in order, a different semiconductor element than the semiconductor element through which current flowed during the previous first period.

As described in Embodiment (5), however, the number of semiconductor elements through which current flows during the first period is not limited to one, and may instead be two. For example, in FIG. 7, the semiconductor elements through which current flows during the first period may be selected in order as follows: the semiconductor element 207A and the semiconductor element 207B, then the semiconductor element 207B and the semiconductor element 207C, then the semiconductor element 207C and the semiconductor element 207A, and then the semiconductor element 207A and the semiconductor element 207B. In other words, selecting the semiconductor elements by following a "predetermined rule" means selection of a semiconductor element through which current did not flow during the previous first period as a semiconductor element through which current flows during the next first period.

Furthermore, as described above, in the modification to Embodiment 2, when the temperature $T_{sur}$ is equal to or greater than the threshold temperature, the controller 205*a* selects the semiconductor element(s) through which current flows during the new first period from among the plurality of semiconductor elements excluding at least one of the semiconductor element(s) through which current flowed during the previous first period. If the temperature $T_{sur}$ greatly exceeds the threshold temperature, however, operations by the power switching device 201*a* may be suspended, and after waiting until the temperature $T_{sur}$ falls below a predetermined temperature, operations of the power switching device 201*a* may be restarted. Doing so avoids malfunction due to overheating of the semiconductor elements. The same may be applied to the modification to Embodiments 7 and 9 described in Modification (4).

(13) The values for the voltage VB in table $t_4$ shown in FIG. 15 and the values for the voltage VC in table $t_5$ shown in FIG. 18 are merely examples. Furthermore, the levels of the control signals Vg have the same reference numbers between embodiments, but the same reference numbers are only provided for the sake of convenience. In other words, even if two control signals have the same reference number in different embodiments, the two control signals do not necessarily have the same value. Specifically, the control signal Vg3 in Embodiment 1 and the control signal Vg3 in Embodiment 2 are not necessarily the same value.

Furthermore, the value of the control signal Vg may be zero. For example, when the semiconductor elements illustrated in FIG. 3 are normally-off MISFETs, Vg0 may be set to zero volts. Conversely, in a normally-on MISFET, Vg8 may be set to zero volts.

(14) In the above embodiments, the control signals output to the semiconductor element through which current flows during the first period are Vg2, Vg3, and Vg4, but this is only an example. Levels other than those shown above may be used as long as the control signal is such that when $V_{DS}$ exceeds a predetermined value, $I_D$ reaches a maximum value (maximum current), like the control signals Vg1 through Vg6 illustrated in FIG. 3. For example, while the level of the control signal output during the second period has been described as being Vg7, this is also only an example. Like the control signals Vg7 and Vg8 illustrated in FIG. 3, any control signal may be used as long as $I_D$ increases until saturation due to a heat limitation or the like. Furthermore, it is desirable that the control signal output during the second period be the maximum rated voltage that can be applied to the gate terminal of the semiconductor elements. By doing so, the power switching device can be caused to operate with a smaller on-resistance.

(15) In the above Embodiments, the number of semiconductor elements provided in the current amount variation unit is three, but this number is simply an example. The number of semiconductor elements in the present invention is not particularly limited, but it is desirable that the sum of the current amount for each semiconductor element be equal to or greater than the maximum rated current of the DC power supply.

(16) In the structure described in the above embodiments, during the second period, current is caused to flow through all of the semiconductor elements provided in the current amount variation unit. Alternatively, a semiconductor element may exist through which current does not flow at all during overall operations.

(17) As a method of changing the on-resistance during the first period and the second period, a method to change the number of semiconductor elements in use has been adopted, but the method of changing the on-resistance is not limited in this way. In the present invention, it suffices to adopt a structure that adjusts the level of the control signal output to each semiconductor element so that, during the first period, the current flowing through the electric circuit does not exceed the current limit, and during the second period, the current flowing through the electric circuit is allowed to exceed the current limit. For example, during the first period, Vg1 may be output as VGA, Vg1 as VGB, and Vg1 as VGC, and during the second period, Vg8 may be output as VGA, Vg8 as VGB, and Vg0 as VGC. In this case, during the first period, the on-resistance of all of the semiconductor elements is made high, whereas during the second period, although the number of semiconductor elements through which current flows is lower than during the first period, the on-resistance is made low, thereby satisfying the above condition.

(18) The order of the steps illustrated in the flowcharts of the above embodiments is only an example and may be modified as necessary. For example, in Embodiment 7 (FIG. 22), Embodiment 8 (FIG. 26), and Embodiment 9 (FIG. 28), the order of temperature detection and of voltage detection may be reversed. Furthermore, well-known methods may be incorporated as necessary, and other steps may be inserted or performed in parallel.

(19) In the above embodiments, operations are performed so that the first period is longer than the time required for the smoothing capacitor to charge from 0% to 100% when charged by current that does not exceed the current limit. The present invention is not, however, limited in this way. Operations may be performed so that the first period is longer than the time required for the smoothing capacitor to charge from 0% to 80% when charged by current that does not exceed the current limit. This structure as well restricts inrush current to be within a tolerable range for the smoothing capacitor.

(20) In the above embodiments, the semiconductor elements are described as being MISFETs. The gate insulating film may, for example, be a silicon oxide film such as $SiO_2$; a silicon oxynitride film; alumina ($Al_2O_3$ or the like); hafnium oxide such as HfO; an oxide of a transition metal such as Ti, Zr, Nb, Ta; or the like. Note that among MISFETs, a MISFET that adopts an oxide as the gate insulating film is also referred to as a Metal-Oxide-Semiconductor Field Effect Transistor (MOSFET).

In the above embodiments, the semiconductor elements have been described as N-type MISFETs, but alternatively the semiconductor elements may be P-type MISFETs. If a semiconductor element is a P-type MISFET, the definitions of "source" and "drain" are reversed with respect to the direction of current. Therefore, in this case the "source" and "drain" in the above description are replaced by "drain" and "source" respectively.

(21) In addition to the MISFET of the embodiments, each of the semiconductor elements provided in the power switching device and the inverter may be a Metal-Semiconductor Field Effect Transistor (MESFET), a Junction Field Effect Transistor (JFET), a Static Induction Transistor (SIT), a Gate Injection Transistor (GIT), an Insulated Gate Bipolar Transistor (IGBT), an Si bipolar transistor, or the like. Note that when the semiconductor elements are IGBTs, the terms "source" and "drain" in the above explanation are replaced by "emitter" and "collector". Furthermore, when the semiconductor elements are bipolar transistors, the terms "source", "drain", and "gate" in the above explanation are replaced by "emitter", "collector", and "base".

In the above embodiments, the semiconductor elements have been described as being normally off, but they may instead be normally on. In the case of normally-on semiconductor elements, FIG. 3 for example would be changed to Vg0>Vg1>Vg2> . . . Vg7>Vg8=0 V. From the standpoint of fail-safety, however, it is desirable to use normally-off semiconductor elements.

(22) The semiconductor elements provided in the power switching device and in the inverter may be wide bandgap semiconductors, such as SiC, GaN, or the like, which have been attracting attention in recent years. In this case, since the on-resistance is low as compared to a semiconductor element constituted by a conventional Si semiconductor, operations can be performed at a lower resistance during the second period. Moreover, such wide bandgap semiconductors have the advantages that switching operations are rapid and can be performed stably even at a high temperature. Note that the MISFETs used in the above embodiments are already elements with a fast switching speed. Adopting wide bandgap semiconductors in the MISFETs yields an even faster switching speed.

(23) In the above embodiments, an example has been described in which the semiconductor elements provided in the power switching device and in the inverter are housed in the same package. The present invention is not, however, limited to this example. The semiconductor elements provided in the power switching device and the semiconductor elements provided in the inverter may be housed in separate packages.

(24) In Embodiment 2 and in the modification thereto, the temperature is detected during each operation of the power switching device. Alternatively, the temperature may be detected once every predetermined number of operations. In the case of a power switching device for which the temperature of the semiconductor elements does not vary greatly, this structure may be adopted with the aim of shortening the startup time.

(25) In the above embodiments, the number of semiconductor elements through which current flows during the first period is set to be less than the number of semiconductor elements through which current flows during the second period, thereby allowing for precise setting of the maximum current and the on-resistance of the semiconductor elements in the first period. The present invention is not, however, limited in this way. For example, using semiconductor elements each having a different transconductance also achieves the above effect. In a MISFET, transconductance is a value defined by the ratio of the change in forward current to the change in gate voltage ($\Delta I_D/\Delta Vg$). In a MISFET with a small transconductance, the change in forward current is smaller when the gate voltage is changed than in a MISFET with a large transconductance, thus allowing for precise control of the value of the drain current. Conversely, in a MISFET with a large transconductance, the change in forward current is large when the gate voltage is changed, thus allowing a large forward current to flow even when the gate voltage is small.

Figure 29A:
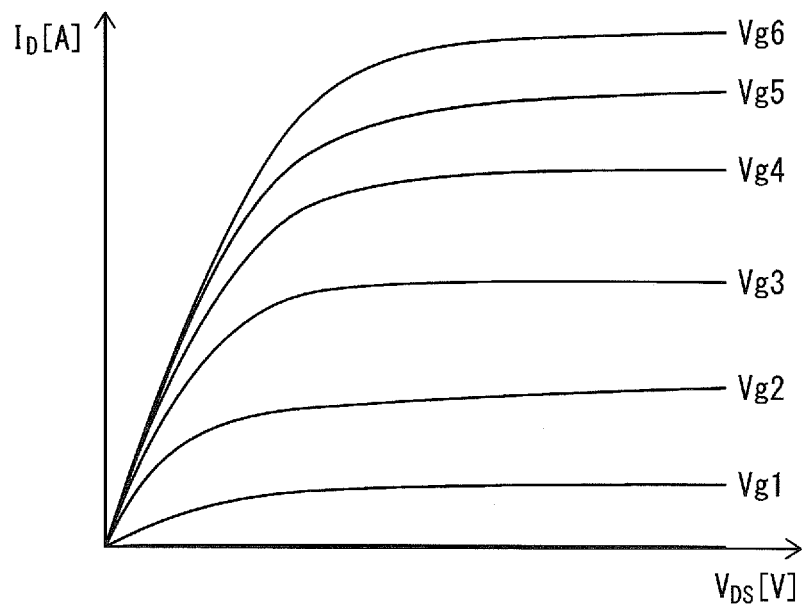
FIG. 29A schematically illustrates the I-V characteristics of a semiconductor element with a large transconductance, and FIG. 29B schematically illustrates the I-V characteristics of a semiconductor element with a small transconductance.
Figure 29B:
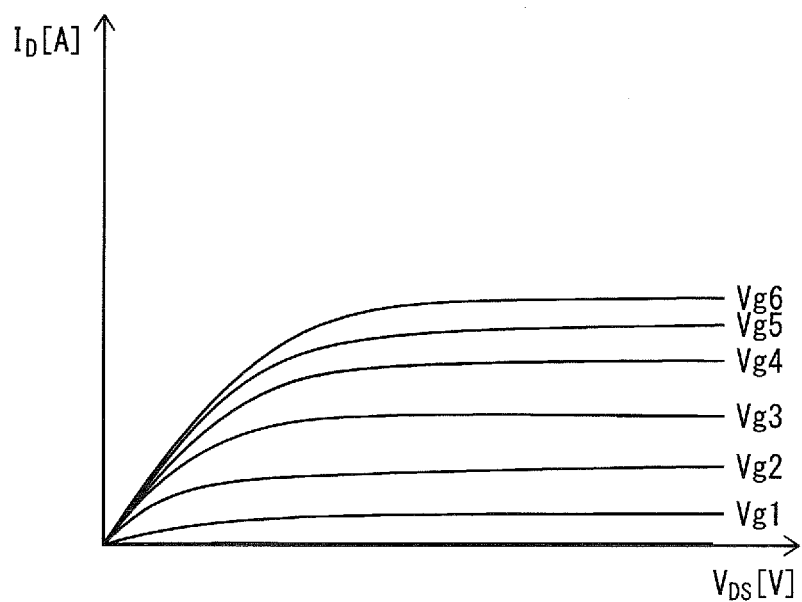

FIGS. 29A and 29B schematically illustrate the I-V characteristics of a semiconductor element. FIG. 29A illustrates semiconductor elements with a large transconductance, and FIG. 29B illustrates semiconductor elements with a small transconductance. As a comparison of FIGS. 29A and 29B shows, when a control signal of the same level is input, the semiconductor elements with a small transconductance allow for more precise control of the maximum current in the saturation region. On the other hand, it is clear that the semiconductor elements with a large transconductance allow for setting of a larger maximum current in the saturation region for a control signal of the same level. Therefore, in Embodiment 1, the controllability of the maximum current during the first period can be increased while reducing the gate voltage in the second period by allowing current to flow through semiconductor elements with a small transconductance during the first period and through semiconductor elements with a large transconductance during the second period.

Note that the I-V characteristics illustrated in FIGS. 29A and 29B are similar to those in FIGS. 10A and 10B. Specifically, the case of the semiconductor elements being at a low temperature (FIG. 10A) corresponds to when the transconductance is large (FIG. 29A), whereas the case of the semiconductor elements being at a high temperature (FIG. 10B) corresponds to when the transconductance is small (FIG. 29B). Therefore, similar effects can be achieved as when selectively using semiconductor elements with different temperatures.

(26) It is desirable that the specifications for withstanding voltage, for current capacity, etc. be the same for all of the semiconductor elements provided in the power switching device. Adopting semiconductor elements with the same specifications allows for simplification of control by the controller when switching the semiconductor element through which current flows during the first period upon each operation of the power switching device. Such simplification of control contributes to reducing the cost of the power switching device. Note, however, that this is not the case when using semiconductor elements with different threshold voltages, as in Modification (25).

(27) Embodiments 3 through 9 are designed so that precharging can be completed within a first period of a predetermined length, since as described in Embodiment 1, it is desirable that the time for precharging be approximately constant. Specifically, when determining that the charge of the smoothing capacitor is low based on the temperature of the semiconductor elements and on the difference between the voltage of the DC power supply and the voltage of the smoothing capcitor, the controller has been described as adjusting control signals in order to increase the maximum current of the semiconductor elements. The present invention may also be embodied based on a different design concept. The following describes the application, to the structure of Embodiment 5, of a modification based on a design concept that aims to shorten the precharging period.

The structure is the same as that shown in FIG. 17, yet the table stored in the memory of the controller 505 differs.

FIG. 30A illustrates a table $t_{10}$ stored in the memory of the controller 505 of the present modification. The portion that differs from table $t_5$ in Embodiment 5 is the list of voltage ranges for the voltage VC in volts. In table $t_5$ of Embodiment 5, as the voltage VC is in a lower voltage range, the maximum current of the semiconductor element rises. In the present modification, on the other hand, this relationship is reversed.

As the value of the voltage VC increases, the charge amount of the smoothing capacitor 102 increases, which means that it is more difficult for inrush current to flow. In this case, even if a control signal that causes the maximum current of the semiconductor element to become large is provided, inrush current will not grow excessively large. Accordingly, in the present modification, the current that is allowed to flow through the electric circuit (the sum of the maximum current of each semiconductor element) is increased as the value of the voltage VC increases by increasing the level of the control signal that is provided. In this way, the present modification aims to shorten the precharging period.

Of course, the precharge period cannot actually be shortened unless the end time of the first period is changed (a step corresponding to step S405 in FIG. 16). Therefore, table $t_{11}$ illustrated in FIG. 30B is further stored in the memory of the controller 505 in the present modification. The table $t_{11}$ lists the level of the control signal Vg input into the semiconductor element through which current flows during the first period and the length Prd of the first period. In the table $t_{11}$, the length of the period grows longer in the order Prd1<Prd2< . . . <Prd5<Prd6. As shown in table $t_{11}$, since the time required for precharging grows shorter as the level of the control signal that is provided increases, the length Prd of the first period grows shorter.

FIG. 31 is a flowchart of operations by the controller 505 of the present modification. Step S1001 corresponds to step S201 of Embodiment 2 (FIG. 6). Next, after acquiring information on the voltage VC detected by the capacitor voltage detection circuit 515 (step S1002), the controller 505 selects, from the table $t_{10}$, the control signal Vg (control command signal Dg) corresponding to the voltage VC (step S1003). The controller 505 then selects, from the table $t_{11}$, the length Prd of the first period corresponding to the control signal Vg selected in step S1003 (step S1004). Next, the controller 505 outputs VgX as VGA, Vg0 as VGB, and Vg0 as VGC (step S1005). VgX represents the control signal Vg corresponding to the control command signal Dg selected from the table $t_{10}$ in step S1003.

If the controller 505 determines that the length Prd of the first period selected from the table $t_{11}$ in step S1004 has not elapsed (step S1006: NO), processing returns to step S1006. Upon determining that the length Prd of the first period has ended (step S1006: YES), the controller 505 outputs Vg7 as VGA, Vg7 as VGB, and Vg7 as VGC (step S1007). Steps S1008 and S1009 correspond to steps S207 and S208 of Embodiment 2 (FIG. 6).

As described above, the present modification increases the level of the control signal for a larger charge amount of the smoothing capacitor in order to shorten the length of the first period. On the other hand, when the charge amount of the smoothing capacitor is small, it can be expected that a large inrush current will flow when power is supplied. In this case, the level of the control signal is lowered in order to carefully control inrush current.

Note that while a modification applied to Embodiment 5 has been described, the same modification may be applied to any other embodiment, and modification thereto, that has a voltage detection circuit, such as Embodiments 4, 6, 7, 8, or 9.

(28) The following describes the application, to the structure of Embodiment 5, of a modification based on a design concept that aims to simplify the structure of the controller. In Embodiment 5, the level of the control signal provided to the semiconductor element though which current flows during the first period is changed in accordance with the size of the voltage VC. By contrast, in the present modification, the length of the first period is changed instead of the level of the control signal.

The structure is the same as that shown in FIG. 17, yet the table stored in the memory of the controller 505 differs.

FIG. 32 illustrates a table $t_{12}$ stored in the memory of the controller 505 of the present modification. The difference from the table $t_5$ in Embodiment 5 is that instead of the level of the control signal Vg and the control command signal Dg, the table $t_{12}$ lists the length Prd of the first period. In the table $t_{12}$, the length of the period grows longer in the order Prd1<Prd2< . . . <Prd5<Prd6.

As the value of the voltage VC is lower, the charge amount of the smoothing capacitor 102 is lower. This means that a longer time is required for precharging. Accordingly, in the present modification, instead of fixing the level of the control signal provided to the semiconductor element through which current flows during the first period, the length Prd of the first period is extended.

Figure 33:
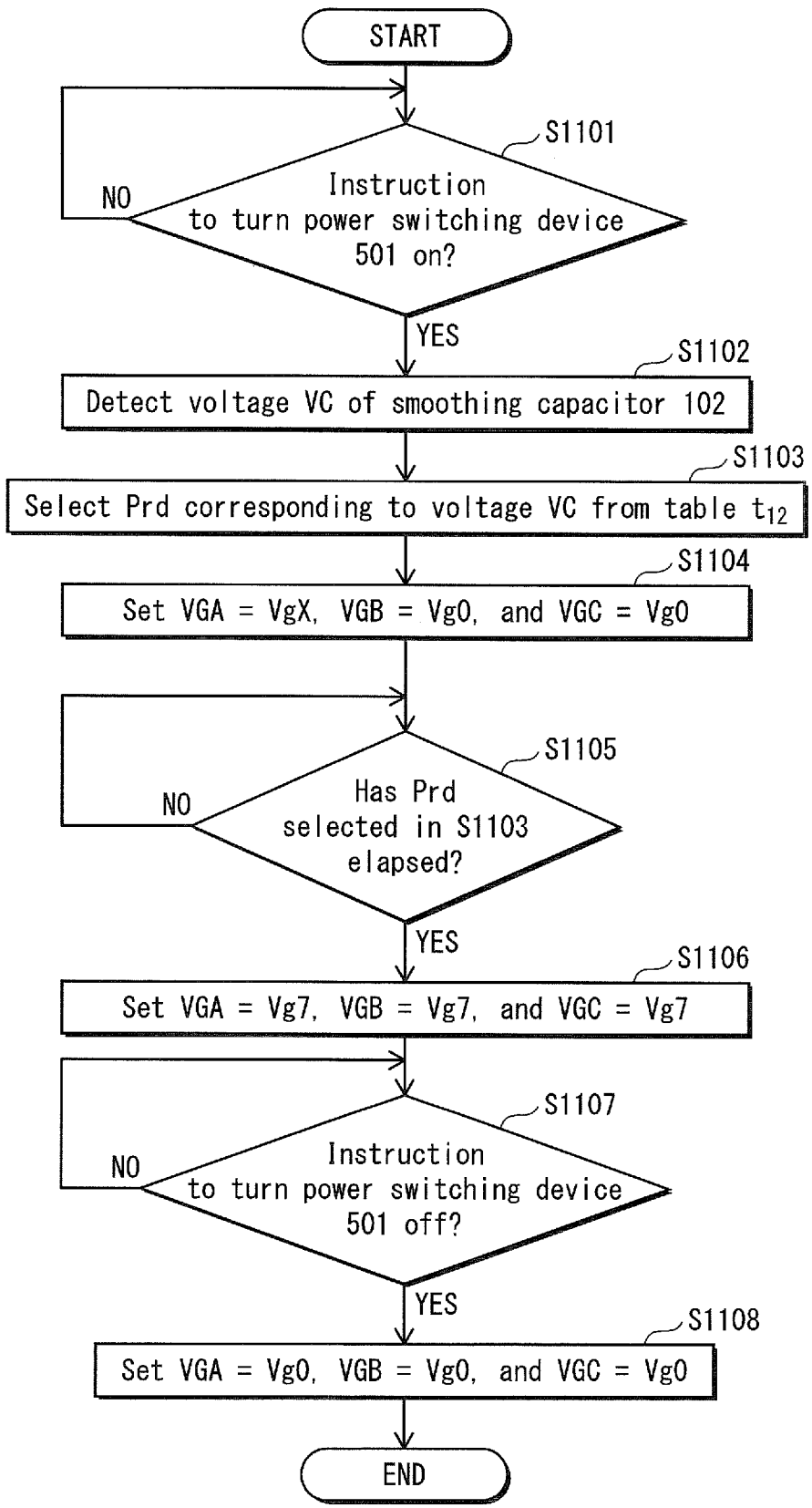
FIG. 33 is a flowchart of operations by the controller 505 according to Modification (28).
Figure 34:
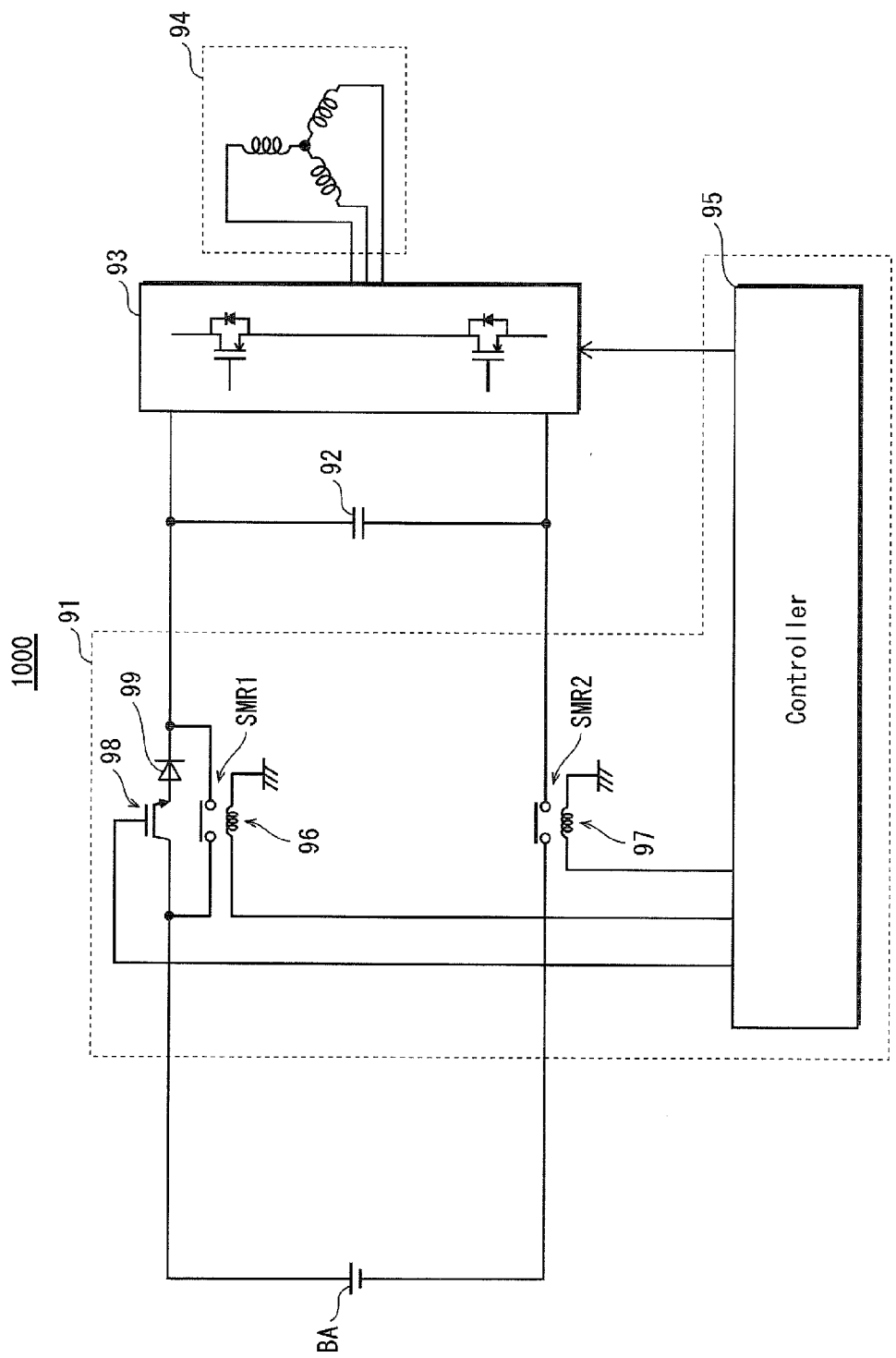
FIG. 34 illustrates the overall configuration of a power system 1000 provided with a power switching device 91 according to Patent Literature 1.

FIG. 33 is a flowchart of operations by the controller 505 of the present modification. Steps S1101 and S1102 correspond to Modification (27), steps S1001 and S1002 (FIG. 31). Next, the controller 505 selects the length Prd of the first period corresponding to the voltage VC from the table $t_{12}$ (step S1103) and outputs Vg3 as VGA, Vg0 as VGB, and Vg0 as VGC (step S1005). Note that setting VGA=Vg3 here is merely an example.

Next, if the controller 505 determines that the length Prd of the first period selected from the table $t_{12}$ in step S1103 has not elapsed (step S1105: NO), processing returns to step S1105. Upon determining that the length Prd of the first period has ended (step S1105: YES), the controller 505 outputs Vg7 as VGA, Vg7 as VGB, and Vg7 as VGC (step S1106). Steps S1107 and S1108 correspond to Modification (27), steps S1008 and S1009 (FIG. 31).

As described above, the structure of the present modification shortens the precharging period by shortening the length of the first period when the charge amount of the smoothing capacitor 102 is high. Furthermore, the level of the control signal provided to the semiconductor element through which current flows in the first period can be fixed regardless of the charge amount of the smoothing capacitor 102. This simplifies the controller and reduces costs.

Note that while a modification applied to Embodiment 5 has been described, the same modification may be applied to any other embodiment, and modification thereto, that has a voltage detection circuit, such as Embodiments 4, 6, 7, 8, or 9.

(29) In Embodiment 3, a semiconductor element in which it is more difficult for forward current to flow when the semiconductor element is at a high temperature has been described, as shown in FIGS. 10A and 10B, but the present invention is not limited in this way. For example, even when using a semiconductor element in which it is more difficult for forward current to flow when the semiconductor element is at a high temperature, table $t_3$ may be appropriately changed to allow for temperature compensation.

Figure 35:
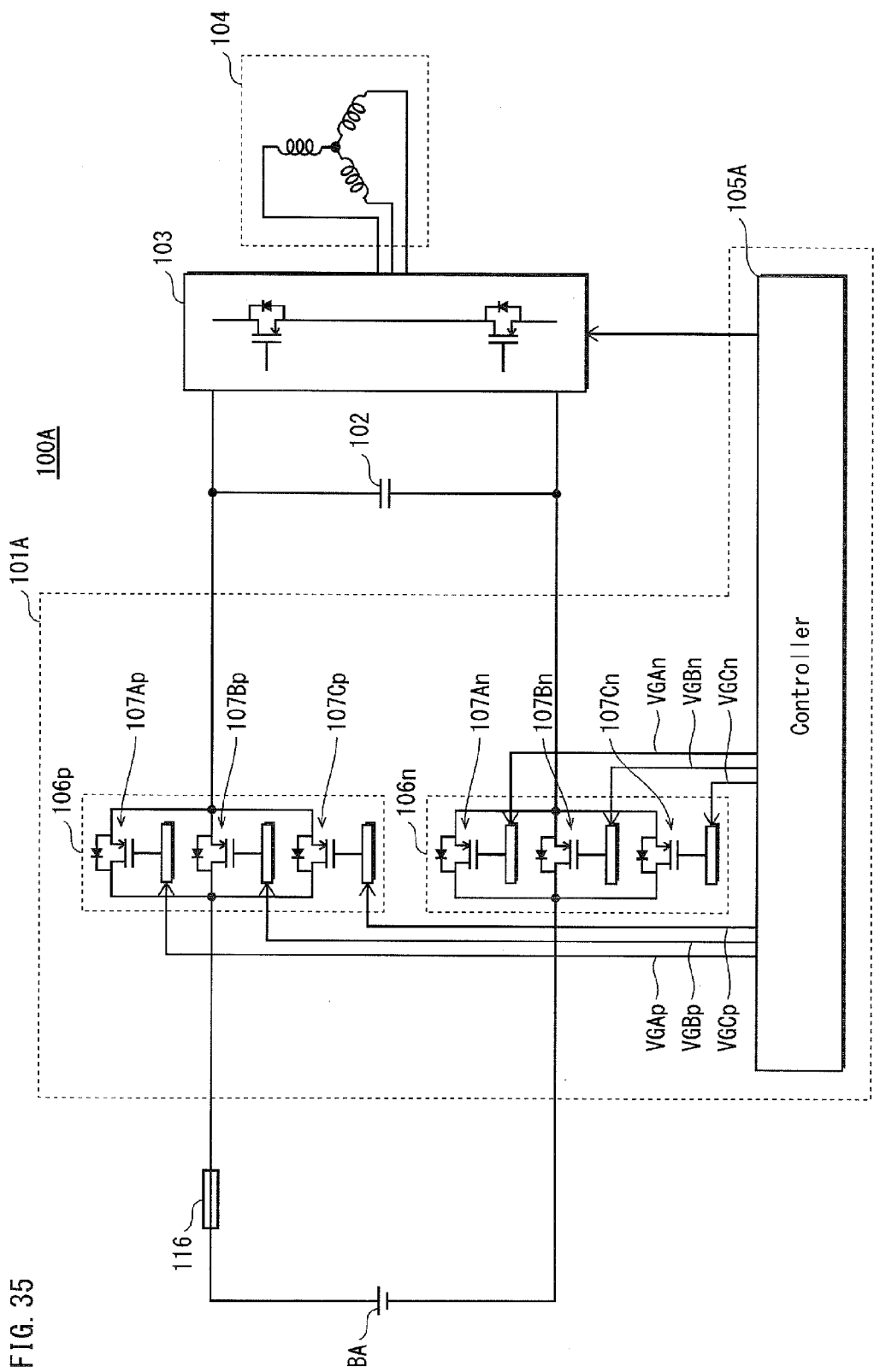
FIG. 35 illustrates the overall configuration of a power system 100A provided with a power switching device according to Modification (30).

(30) In the above embodiments, the power switching device has been described as only switching the electric circuit on the positive side, but the present invention is not limited in this way. FIG. 35 illustrates the overall configuration of a power system 100A provided with a power switching device according to Modification (30).

A power switching device 101A shown in FIG. 35 includes a current amount variation unit 106p, inserted along the positive side of the electric circuit connecting the DC power supply BA and the smoothing capacitor 102, and a current amount variation unit 106n, inserted along the negative side of the electric circuit connecting the DC power supply BA and the smoothing capacitor 102. The current amount variation unit 106p is provided with semiconductor elements 107Ap, 107Bp, and 107Cp, and the current amount variation unit 106n is provided with semiconductor elements 107An, 107Bn, and 107Cn. These semiconductor elements have a similar structure to the semiconductor elements used in Embodiment 1. Operations of the semiconductor elements 107Ap, 107Bp, and 107Cp are controlled by control signals VGAp, VGBp, and VGCp output by the controller 105A. Operations of the semiconductor elements 107Ap, 107Bp, and 107Cp are similarly controlled by control signals VGAn, VGBn, and VGCn output by the controller 105A. A fuse 116 is also inserted in the power system 100A between the DC power supply BA and the power switching device 101A.

The power switching device according to the present modification can perform switching of both the positive side and the negative side of the electric circuit. With the present modification, even if either the current amount variation unit 106p or the current amount variation unit 106n malfunctions, the current amount variation unit that still operates normally can continue power switching operations. This ensures a high degree of reliability in the power switching device.

Note that while an example of modifying Embodiment 1 is shown in FIG. 35, other embodiments or modification may of course be modified in the same way.

Furthermore, in addition to the above embodiments and modifications, a power switching device that only switches the negative side of the electric circuit connecting the DC power supply BA and the smoothing capacitor 102 may be adopted.

(31) In a mechanical relay, as typified by Patent Literature 1, the electric circuit into which the mechanical relay is inserted always enters a closed state when a contact fails due to contact welding. Accordingly, the electric circuit remains in a conducting state once a contact fails, which is problematic. In the above embodiments, however, since semiconductor elements are used to switch the electric circuit, the semiconductor elements may be caused to fail while in an open state. For example, when the temperature detection circuit or the like detects a risk of failure due to overheating of the semiconductor elements or the like, the semiconductor elements can be caused to fail after waiting for the semiconductor elements to enter an open state. Accordingly, in the above embodiments, the problem of the semiconductor elements failing while the electric circuit is in a conducting state does not arise.

(32) The figures only show an outline of positional relationships in order to illustrate the present invention. The present invention is not, therefore, limited to the content of the figures. Furthermore, to simplify the figures, portions thereof have been omitted.

(33) The above embodiments and modifications are merely preferred examples, and the present invention is in no way limited thereto. Furthermore, the structures described in these embodiments and modifications can be combined as necessary.

(34) Even when characteristic differences and the like between structural components are the same, such as when the specifications of the semiconductor elements provided in the power switching device are the same, differences that are within the range of manufacturing tolerance or the like are of course allowed. Note that the symbol "~", as well as the word "through", used when expressing a numerical range indicates inclusion of the numbers on either side.

[Industrial Applicability]

The present invention is useful in power switching devices used, for example, in hybrid electric vehicles, electric vehicles, electric compressors, electric power steering, elevators, wind-generated power systems, and the like, for which there is a demand for a reduction in size.

[Reference Signs List]

100, 100A, 200, 200a, 300, 400, 500, 600, 700, 800, 900, 1000 power system 91, 101, 101A, 201, 301, 401, 501, 601, 701, 801, 901 power switching device 92, 102 capacitor (capacitor element)

93, 103 inverter (power converter)

94, 104 3-phase AC motor (load)

95, 105, 105A, 205, 205a, 305, 405, 505, 605, 705, 805, 905 controller 106, 106p, 106n, 206, 306, 406, 506, 606, 706, 806, 906 current amount variation unit 107A, 107Ap, 107An, 107B, 107Bp, 107Bn, 107C, 107Cp, 107Cn, 207A, 207B, 207C, 307A, 307B, 307C, 407A, 407B, 407C, 507A, 507B, 507C, 607A, 607B, 607C, 707A, 707B, 707C, 807A, 807B, 807C, 907A, 907B, 907C semiconductor element 108u U-phase arm 108v V-phase arm 108w W-phase arm 109A, 109B, 109C, 109D, 109E, 109F semiconductor element 110 microcomputer 111 memory 112 variable voltage circuit 213A, 213B, 213C, 213a, 313, 713A, 713B, 713C, 813, 913A, 913B, 913C temperature detection circuit 414, 614, 714, 814, 914 power supply voltage detection circuit 515, 615 capacitor voltage detection circuit
116 fuse
96, 97 excitation circuit
98 semiconductor element
99 diode
BA DC power supply
GD gate drive circuit
SMR1, SMR2 system main relay

The invention claimed is:

1. A power switching device for switching an electric circuit connecting a DC power supply and a capacitance element in response to a command from an external source, the power switching device comprising:
one or more semiconductor elements, inserted along the electric circuit, each allowing current to flow at or below a maximum current determined according to a level of an input control signal, the current corresponding to a difference between a voltage of the DC power supply and a charging voltage of the capacitance element;
a controller outputting a control signal individually to each of the one or more semiconductor elements; and
a temperature detection circuit detecting a temperature of the one or more semiconductor elements, wherein
until a predetermined time period elapses after receipt of a command to place the electric circuit into a closed state, the controller adjusts the level of each control signal in accordance with the temperature detected by the temperature detection circuit so that current flowing through the electric circuit does not exceed a current limit, and
after the predetermined time period elapses, the controller adjusts the level of each control signal so that the current flowing through the electric circuit is allowed to exceed the current limit.

2. The power switching device of claim 1, wherein
the one or more semiconductor elements exhibit temperature dependence, the maximum current that is determined according to the level of the input control signal being dependent on temperature, and
until the predetermined time period elapses, the controller compensates for temperature by adjusting the level of each control signal in accordance with the temperature detected by the temperature detection circuit.

3. The power switching device of claim 1, wherein
the one or more semiconductor elements comprise a plurality of semiconductor elements connected in parallel,
until the predetermined time period elapses, the controller adjusts the level of each control signal output to first semiconductor elements, the first semiconductor elements being fewer in number than the plurality of semiconductor elements, so that a sum of the maximum current of each of the first semiconductor elements does not exceed the current limit, and
after the predetermined time period elapses, the controller adjusts the level of each control signal output to second semiconductor elements, the second semiconductor elements being equal to or greater in number than the first semiconductor elements, so that a sum of the maximum current of each of the second semiconductor elements exceeds the current limit.

4. The power switching device of claim 3, wherein the second semiconductor elements are greater in number than the first semiconductor elements.

5. The power switching device of claim 3, wherein
the maximum current of each of the second semiconductor elements is greater than the maximum current of each of the first semiconductor elements.

6. The power switching device of claim 3, wherein the controller selects which of the plurality of semiconductor elements constitute the first semiconductor elements in accordance with the temperature detected by the temperature detection circuit.

7. The power switching device of claim 6, wherein
the temperature detection circuit detects the temperature of each of the plurality of semiconductor elements, and
the controller selects the first semiconductor elements in ascending order of temperature starting from the semiconductor element with a lowest temperature among the plurality of semiconductor elements.

8. The power switching device of claim 6, wherein
the temperature detection circuit detects the temperature as an overall temperature of the plurality of semiconductor elements, and
the controller
acquires the temperature detected by the temperature detection circuit once every predetermined number of times the command to place the electric circuit into a closed state is received,
when the temperature detected by the temperature detection circuit is less than a predetermined temperature, selects the same semiconductor elements to be the first semiconductor elements as when semiconductor elements were selected upon an immediately prior reception of the command to place the electric circuit into a closed state, and
when the temperature detected by the temperature detection circuit is equal to or greater than the predetermined temperature, selects new first semiconductor elements from among semiconductor elements excluding at least one of the semiconductor elements that were selected upon the immediately prior reception of the command to place the electric circuit into a closed state.

9. The power switching device of claim 1, wherein
the controller adjusts the level of each control signal output to the one or more semiconductor elements so that, as the difference between the voltage of the DC power supply and the charging voltage of the capacitance element increases, a sum of the maximum current of each of the one or more semiconductor elements increases.

10. The power switching device of claim 9, further comprising
a power supply voltage detection circuit detecting the voltage of the DC power supply, wherein
the controller adjusts the level of each control signal output to the one or more semiconductor elements so that, as the voltage detected by the power supply voltage detection circuit increases, a sum of the maximum current of each of the one or more semiconductor elements increases.

11. The power switching device of claim 9, further comprising
a capacitor voltage detection circuit detecting the charging voltage of the capacitance element, wherein
the controller adjusts the level of each control signal output to the one or more semiconductor elements so that, as the charging voltage detected by the capacitor voltage detection circuit decreases, a sum of the maximum current of each of the one or more semiconductor elements increases.

12. The power switching device of claim 9, further comprising
a power supply voltage detection circuit detecting the voltage of the DC power supply; and a capacitor voltage detection circuit detecting the charging voltage of the capacitance element, wherein the controller adjusts the level of each control signal output to the one or more semiconductor elements so that, as the difference between the voltage detected by the power supply voltage detection circuit and the charging voltage detected by the capacitor voltage detection circuit increases, a sum of the maximum current of each of the one or more semiconductor elements increases.

13. The power switching device of claim 1, wherein the number of semiconductor elements through which current flows until the predetermined time period elapses equals the number of semiconductor elements through which current flows after the predetermined time period elapses, and the level of each control signal output to the semiconductor elements through which current flows until the predetermined time period elapses is the same, and the level of each control signal output to the semiconductor elements through which current flows after the predetermined time period elapses is the same.

14. The power switching device of claim 1, wherein when the capacitance element is charged by current that does not exceed the current limit, the predetermined time period is longer than a time period required for the capacitance element to charge from 0% to 80%.

15. The power switching device of claim 1, wherein the current limit is set to be equal to or less than a maximum output current of the DC power supply.

16. The power switching device of claim 1, wherein the current limit is set to be equal to or less than a sum of a maximum rated current of each element inserted along the electric circuit that connects the DC power supply and the capacitance element.

17. The power switching device of claim 1, wherein at least one of the one or more semiconductor elements is constituted by a wide bandgap semiconductor.

18. The power switching device of claim 17, wherein at least one of the one or more semiconductor elements is a Metal-Insulator-Semiconductor Field Effect Transistor, the control signal is a gate voltage input into a gate of the Metal-Insulator-Semiconductor Field Effect Transistor, and the maximum current for current flowing between a drain and a source of the Metal-Insulator-Semiconductor Field Effect Transistor is determined by a magnitude of the gate voltage.

19. The power switching device of claim 18, wherein the one or more semiconductor elements comprise a plurality of Metal-Insulator-Semiconductor Field Effect Transistors connected in parallel, until the predetermined time period elapses, the controller outputs the gate voltage to first Metal-Insulator-Semiconductor Field Effect Transistors, the first Metal-Insulator-Semiconductor Field Effect Transistors being fewer in number than the plurality of Metal-Insulator-Semiconductor Field Effect Transistors, and after the predetermined time period elapses, the controller outputs the gate voltage to second Metal-Insulator-Semiconductor Field Effect Transistors, the second Metal-Insulator-Semiconductor Field Effect Transistors being equal to or greater than the first Metal-Insulator-Semiconductor Field Effect Transistors in number, and a transconductance of the first Metal-Insulator-Semiconductor Field Effect Transistors is less than a transconductance of the second Metal-Insulator-Semiconductor Field Effect Transistors.

20. A power system for supplying power from a DC power supply to a load, comprising:

a capacitance element;

a power switching device switching an electric circuit connecting the DC power supply and the capacitance element in response to a command from an external source; and a power converter inserted along the electric circuit connecting the capacitance element and the load and including one or more semiconductor elements each allowing current to flow in accordance with a level of an input control signal, the power switching device comprising:

one or more semiconductor elements, inserted along the electric circuit, each allowing current to flow at or below a maximum current determined according to a level of an input control signal, the current corresponding to a difference between a voltage of the DC power supply and a charging voltage of the capacitance element;

a controller outputting a control signal individually to each of the one or more semiconductor elements provided in the power switching device; and a temperature detection circuit detecting a temperature of the one or more semiconductor elements, wherein until a predetermined time period elapses after receipt of a command to place the electric circuit into a closed state, the controller adjusts the level of each control signal in accordance with the temperature detected by the temperature detection circuit so that current flowing through the electric circuit does not exceed a predetermined current limit, and after the predetermined time period elapses, the controller adjusts the level of each control signal so that the current flowing through the electric circuit is allowed to exceed the current limit.

21. The power system of claim 20, wherein the one or more semiconductor elements provided in the power switching device and the one or more semiconductor elements provided in the power converter are housed in a same package.

* * * * *